United States Patent
Morovati Lopez et al.

(10) Patent No.: US 11,645,673 B2
(45) Date of Patent: May 9, 2023

(54) METHODS AND APPARATUS TO GENERATE CORRECTED ONLINE AUDIENCE MEASUREMENT DATA

(71) Applicant: The Nielsen Company (US), LLC, New York, NY (US)

(72) Inventors: Diane Morovati Lopez, Los Angeles, CA (US); Jie Cao, Fremont, CA (US); Dipti Umesh Shah, Pleasanton, CA (US); Neeraj Chachra, Streamwood, IL (US)

(73) Assignee: The Nielsen Company (US), LLC, New York, NY (US)

( * ) Notice: Subject to any disclaimer, the term of this patent is extended or adjusted under 35 U.S.C. 154(b) by 279 days.

(21) Appl. No.: 16/538,345

(22) Filed: Aug. 12, 2019

(65) Prior Publication Data

US 2019/0370860 A1    Dec. 5, 2019

Related U.S. Application Data

(63) Continuation of application No. 14/984,690, filed on Dec. 30, 2015, now Pat. No. 10,380,633.

(Continued)

(51) Int. Cl.
*G06Q 30/00* (2012.01)
*G06Q 30/0251* (2023.01)
(Continued)

(52) U.S. Cl.
CPC ..... *G06Q 30/0254* (2013.01); *G06Q 30/0242* (2013.01); *H04N 21/25866* (2013.01); *H04N 21/44226* (2020.08); *H04N 21/6582* (2013.01)

(58) Field of Classification Search
None
See application file for complete search history.

(56) References Cited

U.S. PATENT DOCUMENTS 4,621,325 A    11/1986   Naftzger et al.
4,658,290 A    4/1987    McKenna et al.
(Continued)

FOREIGN PATENT DOCUMENTS

AU    2013205736    5/2013
CN    1898662       1/2007
(Continued)

OTHER PUBLICATIONS

Adam et al., "Privacy Preserving Integration of Health Care Data," AMIA 2007 Symposium Proceedings, 6 pages.

(Continued)

*Primary Examiner* — Luis A Brown
(74) *Attorney, Agent, or Firm* — Hanley, Flight and Zimmerman, LLC

(57) ABSTRACT

Methods and apparatus to generate corrected online audience measurement data are disclosed. An example apparatus includes an impressions collector to receive a first audience count indicative of first impressions attributed to a first media category for a demographic group, a second audience count indicative of second impressions attributed to a second media category accessed by the demographic group, and a third audience count indicative of third impressions attributed to the first media category and the second media category accessed by the demographic group, the first audience count including a duplicated audience count; a factor generator to calculate a deduplication factor using the first audience count, the second audience count, and the third audience count; an audience calculator to determine a corrected audience count of the first media category to correct the duplicated audience count; and a ratings data generator to generate ratings information for the first media category.

22 Claims, 16 Drawing Sheets

Related U.S. Application Data

(60) Provisional application No. 62/188,482, filed on Jul. 2, 2015.

(51) Int. Cl.
*G06Q 30/0242* (2023.01)
*H04N 21/258* (2011.01)
*H04N 21/658* (2011.01)
*H04N 21/442* (2011.01)

(56) References Cited

U.S. PATENT DOCUMENTS

| | | | |
|---|---|---|---|
| 5,113,518 A | 5/1992 | Durst, Jr. et al. | |
| 5,214,780 A | 5/1993 | Ingoglia et al. | |
| 5,584,050 A | 12/1996 | Lyons | |
| 5,594,934 A | 1/1997 | Lu et al. | |
| 5,675,510 A | 10/1997 | Coffey et al. | |
| 5,793,409 A | 8/1998 | Tetsumura | |
| 5,796,952 A | 8/1998 | Davis et al. | |
| 5,832,520 A | 11/1998 | Miller | |
| 5,848,396 A | 12/1998 | Gerace | |
| 5,870,740 A | 2/1999 | Rose et al. | |
| 5,948,061 A | 9/1999 | Merriman et al. | |
| 6,035,339 A | 3/2000 | Agraharam et al. | |
| 6,052,730 A | 4/2000 | Feliciano et al. | |
| 6,055,573 A | 4/2000 | Gardenswartz et al. | |
| 6,098,093 A | 8/2000 | Bayeh et al. | |
| 6,102,406 A | 8/2000 | Miles et al. | |
| 6,108,637 A | 8/2000 | Blumenau | |
| 6,138,155 A | 10/2000 | Davis et al. | |
| 6,141,694 A | 10/2000 | Gardner | |
| 6,223,215 B1 | 4/2001 | Hunt et al. | |
| 6,279,036 B1 | 8/2001 | Himmel et al. | |
| 6,286,140 B1 | 9/2001 | Ivanyi | |
| 6,415,323 B1 | 7/2002 | McCanne et al. | |
| 6,434,614 B1 | 8/2002 | Blumenau | |
| 6,457,010 B1 | 9/2002 | Eldering et al. | |
| 6,460,079 B1 | 10/2002 | Blumenau | |
| 6,529,952 B1 | 3/2003 | Blumenau | |
| 6,606,657 B1 | 8/2003 | Zilberstein et al. | |
| 6,637,029 B1 | 10/2003 | Maissel et al. | |
| 6,658,410 B1 | 12/2003 | Sakamaki et al. | |
| 6,698,020 B1 | 2/2004 | Zigmond et al. | |
| 6,704,787 B1 | 3/2004 | Umbreit | |
| 6,714,917 B1 | 3/2004 | Eldering et al. | |
| 6,839,680 B1 | 1/2005 | Liu et al. | |
| 6,877,007 B1 | 4/2005 | Hentzel et al. | |
| 6,993,590 B1 | 1/2006 | Gauthier et al. | |
| 7,039,699 B1 | 5/2006 | Narin et al. | |
| 7,092,926 B2 | 8/2006 | Cerrato | |
| 7,139,723 B2 | 11/2006 | Conkwright et al. | |
| 7,146,329 B2 | 12/2006 | Conkwright et al. | |
| 7,150,030 B1 | 12/2006 | Eldering et al. | |
| 7,152,074 B2 | 12/2006 | Dertinger et al. | |
| 7,159,023 B2 | 1/2007 | Tufts | |
| 7,181,412 B1 | 2/2007 | Fulgoni et al. | |
| 7,260,837 B2 | 8/2007 | Abraham et al. | |
| 7,272,617 B1 | 9/2007 | Bayer et al. | |
| 7,302,447 B2 | 11/2007 | Dettinger et al. | |
| 7,343,417 B2 | 3/2008 | Baum | |
| 7,363,643 B2 | 4/2008 | Drake et al. | |
| 7,386,473 B2 | 6/2008 | Blumenau | |
| 7,406,516 B2 | 7/2008 | Davis et al. | |
| 7,546,370 B1 | 6/2009 | Acharya et al. | |
| 7,590,568 B2 | 9/2009 | Blumenau | |
| 7,613,635 B2 | 11/2009 | Blumenau | |
| 7,634,786 B2 | 12/2009 | Knee et al. | |
| 7,644,156 B2 | 1/2010 | Blumenau | |
| 7,647,418 B2 | 1/2010 | Ash et al. | |
| 7,650,407 B2 | 1/2010 | Blumenau | |
| 7,653,724 B2 | 1/2010 | Blumenau | |
| 7,716,326 B2 | 5/2010 | Blumenau | |
| 7,720,963 B2 | 5/2010 | Blumenau | |
| 7,720,964 B2 | 5/2010 | Blumenau | |
| 7,743,394 B2 | 6/2010 | Smith et al. | |
| 7,756,974 B2 | 7/2010 | Blumenau | |
| 7,788,216 B2 | 8/2010 | Li et al. | |
| 7,805,332 B2 | 9/2010 | Wilson | |
| 7,853,969 B2 | 12/2010 | Smith et al. | |
| 7,882,054 B2 | 2/2011 | Levitan | |
| 7,882,242 B2 | 2/2011 | Chen | |
| 7,890,451 B2 | 2/2011 | Cancel et al. | |
| 7,925,694 B2 | 4/2011 | Harris | |
| 7,941,525 B1 | 5/2011 | Yavilevich | |
| 7,949,565 B1 | 5/2011 | Eldering et al. | |
| 7,949,639 B2 | 5/2011 | Hunt et al. | |
| 7,958,234 B2 | 6/2011 | Thomas et al. | |
| 7,962,603 B1 | 6/2011 | Morimoto | |
| 8,006,259 B2 | 8/2011 | Drake et al. | |
| 8,046,255 B2 | 10/2011 | Bistriceanu et al. | |
| 8,060,601 B1 | 11/2011 | Brown et al. | |
| 8,087,041 B2 | 12/2011 | Fu et al. | |
| 8,091,101 B2 | 1/2012 | Smith et al. | |
| 8,131,763 B2 | 3/2012 | Tuscano et al. | |
| 8,131,861 B2 | 3/2012 | Butler et al. | |
| 8,151,194 B1 | 4/2012 | Chan et al. | |
| 8,151,291 B2 | 4/2012 | Ramaswamy | |
| 8,156,519 B1* | 4/2012 | Kleinmann | H04N 21/2547 725/32 |
| 8,180,112 B2 | 5/2012 | Kurtz et al. | |
| 8,229,780 B2 | 7/2012 | Davidow et al. | |
| 8,235,814 B2 | 8/2012 | Willis et al. | |
| 8,266,687 B2 | 9/2012 | Baldry | |
| 8,271,886 B2 | 9/2012 | Lee et al. | |
| 8,280,683 B2 | 10/2012 | Finkler | |
| 8,302,120 B2 | 10/2012 | Ramaswamy | |
| 8,306,992 B2* | 11/2012 | Oami | G06Q 30/02 707/771 |
| 8,307,006 B2 | 11/2012 | Hannan et al. | |
| 8,307,458 B2 | 11/2012 | Kasahara et al. | |
| 8,370,489 B2 | 2/2013 | Mazumdar et al. | |
| 8,412,648 B2 | 4/2013 | Karypis et al. | |
| 8,453,173 B1 | 5/2013 | Anderson et al. | |
| 8,484,511 B2 | 7/2013 | Tidwell | |
| 8,494,897 B1 | 7/2013 | Dawson | |
| 8,495,198 B2 | 7/2013 | Sim et al. | |
| 8,504,411 B1 | 8/2013 | Subasic et al. | |
| 8,504,507 B1 | 8/2013 | Srinivasaiah | |
| 8,514,907 B2 | 8/2013 | Wright et al. | |
| 8,527,544 B1* | 9/2013 | Colgrove | G06F 16/1748 707/791 |
| 8,543,454 B2 | 9/2013 | Fleischman et al. | |
| 8,549,552 B2 | 10/2013 | Ramaswamy et al. | |
| 8,560,683 B2 | 10/2013 | Funk et al. | |
| 8,600,796 B1 | 12/2013 | Sterne et al. | |
| 8,626,901 B2* | 1/2014 | Pugh | H04L 67/535 709/224 |
| 8,631,122 B2 | 1/2014 | Kadam et al. | |
| 8,660,895 B1 | 2/2014 | Saurabh et al. | |
| 8,676,740 B2 | 3/2014 | Ueki | |
| 8,683,504 B2 | 3/2014 | Ramaswamy | |
| 8,688,524 B1 | 4/2014 | Ramalingam et al. | |
| 8,699,855 B2 | 4/2014 | Harper et al. | |
| 8,700,457 B2 | 4/2014 | Craft | |
| 8,713,168 B2 | 4/2014 | Heffernan et al. | |
| 8,751,461 B2 | 6/2014 | Abraham et al. | |
| 8,775,332 B1 | 7/2014 | Morris et al. | |
| 8,831,362 B1 | 9/2014 | Steffens | |
| 8,843,626 B2 | 9/2014 | Mazumdar et al. | |
| 8,843,951 B1 | 9/2014 | Sherrets et al. | |
| 8,856,235 B2 | 10/2014 | Zhou et al. | |
| 8,898,689 B2 | 11/2014 | Georgakis | |
| 8,909,638 B2 | 12/2014 | Lin et al. | |
| 8,909,771 B2 | 12/2014 | Heath | |
| 8,910,195 B1 | 12/2014 | Barney et al. | |
| 8,930,701 B2 | 1/2015 | Burbank et al. | |
| 8,935,713 B1* | 1/2015 | Gabel | G06F 16/7867 705/14.66 |
| 8,954,536 B2 | 2/2015 | Kalus et al. | |
| 8,973,023 B1* | 3/2015 | Rao | G06Q 30/0242 705/14.44 |
| 8,984,547 B2 | 3/2015 | Lambert et al. | |
| 9,055,122 B2 | 6/2015 | Grecco et al. | |

(56) References Cited

U.S. PATENT DOCUMENTS

| | | | |
|---|---|---|---|
| 9,071,886 B2 | 6/2015 | Shkedi | |
| 9,075,865 B2 | 7/2015 | Lin et al. | |
| 9,083,853 B2 | 7/2015 | Shkedi | |
| 9,084,013 B1 | 7/2015 | Arini et al. | |
| 9,092,797 B2 | 7/2015 | Perez et al. | |
| 9,105,053 B2 | 8/2015 | Cao et al. | |
| 9,117,217 B2 | 8/2015 | Wilson et al. | |
| 9,208,086 B1* | 12/2015 | Shalev | G06F 12/123 |
| 9,210,208 B2 | 12/2015 | Ramaswamy et al. | |
| 9,215,288 B2 | 12/2015 | Seth et al. | |
| 9,215,489 B2 | 12/2015 | Williams et al. | |
| 9,215,502 B1 | 12/2015 | Sherrets et al. | |
| 9,237,138 B2 | 1/2016 | Bosworth et al. | |
| 9,239,869 B1* | 1/2016 | Zhang | G06F 16/27 |
| 9,269,049 B2 | 2/2016 | McCann et al. | |
| 9,313,294 B2 | 4/2016 | Perez et al. | |
| 9,405,709 B1* | 8/2016 | Salpekar | G06F 3/067 |
| 9,491,090 B1 | 11/2016 | Kumar et al. | |
| 9,582,809 B2 | 2/2017 | Perez et al. | |
| 9,727,485 B1* | 8/2017 | Sanvido | G06F 12/121 |
| 10,045,057 B2* | 8/2018 | Shah | H04H 60/66 |
| 10,045,082 B2 | 8/2018 | Nagaraja Rao et al. | |
| 10,187,675 B2 | 1/2019 | Sheppard et al. | |
| 10,368,130 B2 | 7/2019 | Nagaraja Rao et al. | |
| 10,380,633 B2 | 8/2019 | Morovati et al. | |
| 2002/0099609 A1 | 7/2002 | Nascenzi et al. | |
| 2002/0129368 A1 | 9/2002 | Schlack et al. | |
| 2003/0006911 A1 | 1/2003 | Smith et al. | |
| 2003/0037131 A1 | 2/2003 | Verma | |
| 2003/0046385 A1 | 3/2003 | Vincent | |
| 2003/0065770 A1 | 4/2003 | Davis et al. | |
| 2003/0074252 A1 | 4/2003 | Chandler-Pepelnjak et al. | |
| 2003/0105604 A1 | 6/2003 | Ash et al. | |
| 2003/0177488 A1* | 9/2003 | Smith | H04H 60/45 725/112 |
| 2003/0220901 A1 | 11/2003 | Carr et al. | |
| 2003/0229900 A1 | 12/2003 | Reisman | |
| 2004/0003394 A1 | 1/2004 | Ramaswamy | |
| 2004/0088212 A1 | 5/2004 | Hill | |
| 2004/0107125 A1 | 6/2004 | Guheen et al. | |
| 2004/0167763 A1 | 8/2004 | Liebman | |
| 2004/0167928 A1 | 8/2004 | Anderson et al. | |
| 2004/0186840 A1 | 9/2004 | Dettinger et al. | |
| 2005/0106550 A1 | 5/2005 | Hayashi et al. | |
| 2005/0144069 A1 | 6/2005 | Wiseman et al. | |
| 2005/0166233 A1 | 7/2005 | Beyda et al. | |
| 2005/0223093 A1 | 10/2005 | Hanson et al. | |
| 2005/0257141 A1 | 11/2005 | Brandrud et al. | |
| 2005/0267799 A1 | 12/2005 | Chan et al. | |
| 2006/0074953 A1 | 4/2006 | Dettinger et al. | |
| 2006/0089754 A1 | 4/2006 | Mortenson | |
| 2006/0178996 A1 | 8/2006 | Matsushima et al. | |
| 2006/0271641 A1 | 11/2006 | Stavrakos et al. | |
| 2006/0294259 A1 | 12/2006 | Matefi et al. | |
| 2007/0043769 A1 | 2/2007 | Kasahara et al. | |
| 2007/0106787 A1 | 5/2007 | Blumenau | |
| 2007/0106792 A1 | 5/2007 | Blumenau | |
| 2007/0112714 A1 | 5/2007 | Fairweather | |
| 2007/0156532 A1 | 7/2007 | Nyhan et al. | |
| 2007/0180469 A1 | 8/2007 | Finley et al. | |
| 2007/0198327 A1 | 8/2007 | Yazdani et al. | |
| 2007/0208640 A1 | 9/2007 | Banasiak et al. | |
| 2007/0260603 A1 | 11/2007 | Tuscano et al. | |
| 2007/0271518 A1 | 11/2007 | Tischer et al. | |
| 2007/0271580 A1 | 11/2007 | Tischer et al. | |
| 2008/0004958 A1 | 1/2008 | Ralph et al. | |
| 2008/0086356 A1 | 4/2008 | Glassman et al. | |
| 2008/0091639 A1 | 4/2008 | Davis et al. | |
| 2008/0097806 A1 | 4/2008 | Hoover et al. | |
| 2008/0126420 A1 | 5/2008 | Wright et al. | |
| 2008/0201427 A1 | 8/2008 | Chen | |
| 2008/0201472 A1 | 8/2008 | Bistriceanu et al. | |
| 2008/0222201 A1 | 9/2008 | Chen et al. | |
| 2008/0235243 A1 | 9/2008 | Lee et al. | |
| 2008/0248815 A1 | 10/2008 | Busch | |
| 2008/0276179 A1 | 11/2008 | Borenstein et al. | |
| 2008/0300965 A1 | 12/2008 | Doe | |
| 2009/0030780 A1 | 1/2009 | York et al. | |
| 2009/0055241 A1 | 2/2009 | Chen et al. | |
| 2009/0070443 A1 | 3/2009 | Vanderhook et al. | |
| 2009/0070797 A1 | 3/2009 | Ramaswamy et al. | |
| 2009/0076899 A1 | 3/2009 | Gbodimowo | |
| 2009/0157512 A1 | 6/2009 | King | |
| 2009/0171762 A1 | 7/2009 | Alkove et al. | |
| 2009/0217315 A1 | 8/2009 | Malik et al. | |
| 2009/0234795 A1* | 9/2009 | Haas | G06F 16/24564 |
| 2009/0292587 A1 | 11/2009 | Fitzgerald | |
| 2009/0300675 A1 | 12/2009 | Shkedi | |
| 2009/0307084 A1 | 12/2009 | Monighetti et al. | |
| 2009/0327026 A1 | 12/2009 | Bistriceanu et al. | |
| 2010/0004977 A1 | 1/2010 | Marci et al. | |
| 2010/0010866 A1 | 1/2010 | Bal et al. | |
| 2010/0017049 A1 | 1/2010 | Swearingen et al. | |
| 2010/0046553 A1 | 2/2010 | Daigle et al. | |
| 2010/0076814 A1 | 3/2010 | Manning | |
| 2010/0088152 A1* | 4/2010 | Bennett | G06Q 30/0601 705/26.1 |
| 2010/0088373 A1 | 4/2010 | Pinkham | |
| 2010/0070621 A1 | 5/2010 | Urdan et al. | |
| 2010/0121676 A1 | 5/2010 | Jackson | |
| 2010/0153175 A1 | 6/2010 | Pearson et al. | |
| 2010/0153544 A1 | 6/2010 | Krassner et al. | |
| 2010/0161385 A1 | 6/2010 | Karypis et al. | |
| 2010/0191689 A1 | 7/2010 | Cortes et al. | |
| 2010/0191723 A1 | 7/2010 | Perez et al. | |
| 2010/0205057 A1 | 8/2010 | Hook et al. | |
| 2010/0235219 A1* | 9/2010 | Merrick | G06Q 10/0639 705/7.38 |
| 2010/0241745 A1 | 9/2010 | Offen et al. | |
| 2010/0262498 A1 | 10/2010 | Nolet et al. | |
| 2010/0268540 A1 | 10/2010 | Arshi et al. | |
| 2010/0268573 A1 | 10/2010 | Jain et al. | |
| 2010/0281178 A1 | 11/2010 | Sullivan | |
| 2010/0299604 A1 | 11/2010 | Blumenau | |
| 2010/0312854 A1 | 12/2010 | Hyman | |
| 2010/0313009 A1 | 12/2010 | Combet et al. | |
| 2010/0325051 A1 | 12/2010 | Etchegoven | |
| 2011/0016482 A1 | 1/2011 | Tidwell et al. | |
| 2011/0041062 A1 | 2/2011 | Singer et al. | |
| 2011/0087519 A1 | 4/2011 | Fordyce, III et al. | |
| 2011/0093327 A1 | 4/2011 | Fordyce, III et al. | |
| 2011/0106620 A1 | 5/2011 | Setiawan et al. | |
| 2011/0125551 A1* | 5/2011 | Reiser | G06Q 30/02 705/7.31 |
| 2011/0131596 A1 | 6/2011 | Amsterdam et al. | |
| 2011/0137733 A1 | 6/2011 | Baird et al. | |
| 2011/0153391 A1 | 6/2011 | Tenbrock | |
| 2011/0157475 A1 | 6/2011 | Wright et al. | |
| 2011/0191184 A1 | 8/2011 | Blackhurst et al. | |
| 2011/0191664 A1 | 8/2011 | Sheleheda et al. | |
| 2011/0191831 A1 | 8/2011 | Chan et al. | |
| 2011/0196735 A1 | 8/2011 | von Sydow et al. | |
| 2011/0202500 A1 | 8/2011 | Warn et al. | |
| 2011/0208860 A1 | 8/2011 | Sim et al. | |
| 2011/0231240 A1 | 9/2011 | Schoen et al. | |
| 2011/0246297 A1 | 10/2011 | Buchalter et al. | |
| 2011/0246306 A1 | 10/2011 | Blackhurst et al. | |
| 2011/0246641 A1 | 10/2011 | Pugh et al. | |
| 2011/0282730 A1 | 11/2011 | Taimas | |
| 2011/0288907 A1 | 11/2011 | Harvey et al. | |
| 2012/0005213 A1 | 1/2012 | Hannan et al. | |
| 2012/0030037 A1 | 2/2012 | Carriero | |
| 2012/0042005 A1 | 2/2012 | Papakostas et al. | |
| 2012/0072469 A1* | 3/2012 | Perez | G06Q 30/0201 707/810 |
| 2012/0078725 A1 | 3/2012 | Maitra et al. | |
| 2012/0109709 A1 | 5/2012 | Fordyce, III et al. | |
| 2012/0109882 A1 | 5/2012 | Bouse et al. | |
| 2012/0110027 A1 | 5/2012 | Falcon | |
| 2012/0110071 A1 | 5/2012 | Zhou et al. | |
| 2012/0151079 A1 | 6/2012 | Besehanic et al. | |
| 2012/0151322 A1 | 6/2012 | Lindsay et al. | |
| 2012/0158490 A1 | 6/2012 | Naumeyer et al. | |

(56) References Cited

U.S. PATENT DOCUMENTS

| | | | |
|---|---|---|---|
| 2012/0158954 A1* | 6/2012 | Heffernan | G06Q 30/0241 709/224 |
| 2012/0166520 A1 | 6/2012 | Lindsay et al. | |
| 2012/0143713 A1 | 7/2012 | Dittus et al. | |
| 2012/0173701 A1 | 7/2012 | Tenbrock | |
| 2012/0185274 A1 | 7/2012 | Hu | |
| 2012/0192214 A1 | 7/2012 | Hunn et al. | |
| 2012/0206331 A1 | 8/2012 | Gandhi | |
| 2012/0209920 A1 | 8/2012 | Neystadt et al. | |
| 2012/0212188 A1 | 8/2012 | Li | |
| 2012/0215621 A1* | 8/2012 | Heffernan | G06Q 30/0251 705/14.41 |
| 2012/0239407 A1 | 9/2012 | Lynch et al. | |
| 2012/0239809 A1 | 9/2012 | Mazumdar et al. | |
| 2012/0265606 A1 | 10/2012 | Patnode | |
| 2012/0302222 A1 | 11/2012 | Williamson et al. | |
| 2012/0310729 A1 | 12/2012 | Daito et al. | |
| 2012/0311017 A1 | 12/2012 | Sze et al. | |
| 2012/0323675 A1* | 12/2012 | Paparo | G06Q 30/0243 705/14.42 |
| 2012/0331137 A1 | 12/2012 | Olsen et al. | |
| 2013/0007794 A1 | 1/2013 | Besehanic et al. | |
| 2013/0013308 A1 | 1/2013 | Cao et al. | |
| 2013/0014136 A1* | 1/2013 | Bhatia | H04N 21/47815 725/9 |
| 2013/0014144 A1 | 1/2013 | Bhatia et al. | |
| 2013/0019262 A1 | 1/2013 | Bhatia et al. | |
| 2013/0042052 A1* | 2/2013 | Colgrove | G06F 3/0665 711/E12.016 |
| 2013/0046615 A1 | 2/2013 | Liyanage | |
| 2013/0046949 A1* | 2/2013 | Colgrove | G06F 3/064 711/170 |
| 2013/0060629 A1 | 3/2013 | Rangsikitpho et al. | |
| 2013/0066713 A1 | 3/2013 | Umeda | |
| 2013/0080263 A1 | 3/2013 | Goldman et al. | |
| 2013/0086006 A1* | 4/2013 | Colgrove | G06F 16/137 707/E17.005 |
| 2013/0086353 A1* | 4/2013 | Colgrove | G06F 3/0688 711/E12.059 |
| 2013/0097311 A1 | 4/2013 | Mazumdar et al. | |
| 2013/0097312 A1 | 4/2013 | Mazumdar et al. | |
| 2013/0097380 A1* | 4/2013 | Colgrove | G06F 16/1752 711/E12.017 |
| 2013/0117103 A1 | 5/2013 | Shimizu et al. | |
| 2013/0124628 A1 | 5/2013 | Weerasinghe | |
| 2013/0138506 A1 | 5/2013 | Zhu et al. | |
| 2013/0138743 A1 | 5/2013 | Amento et al. | |
| 2013/0145022 A1 | 6/2013 | Srivastava et al. | |
| 2013/0159499 A1 | 6/2013 | Besehanic | |
| 2013/0198125 A1 | 8/2013 | Oliver et al. | |
| 2013/0204694 A1 | 8/2013 | Banister et al. | |
| 2013/0210455 A1 | 8/2013 | Carlsson et al. | |
| 2013/0212188 A1 | 8/2013 | Duterque et al. | |
| 2013/0246389 A1 | 9/2013 | Osann, Jr. | |
| 2013/0246609 A1 | 9/2013 | Topchy et al. | |
| 2013/0254143 A1 | 9/2013 | Ueki et al. | |
| 2013/0254787 A1* | 9/2013 | Cox | H04N 21/252 725/13 |
| 2013/0262181 A1 | 10/2013 | Topchy et al. | |
| 2013/0262386 A1* | 10/2013 | Kottomtharayil | G06F 1/3234 707/635 |
| 2013/0262392 A1* | 10/2013 | Vibhor | G06F 16/178 707/654 |
| 2013/0262394 A1* | 10/2013 | Kumarasamy | G06F 16/113 707/673 |
| 2013/0262410 A1* | 10/2013 | Liu | G06F 16/116 707/693 |
| 2013/0262615 A1* | 10/2013 | Ankireddypalle | G06F 3/0635 709/213 |
| 2013/0262638 A1* | 10/2013 | Kumarasamy | H04L 41/0816 709/221 |
| 2013/0262801 A1* | 10/2013 | Sancheti | G06F 3/0619 711/162 |
| 2013/0263289 A1* | 10/2013 | Vijayan | G06F 16/13 726/31 |
| 2013/0282898 A1 | 10/2013 | Kalus et al. | |
| 2013/0290070 A1 | 10/2013 | Abraham et al. | |
| 2013/0297411 A1 | 11/2013 | Van Datta et al. | |
| 2013/0325588 A1 | 12/2013 | Kalyanam et al. | |
| 2013/0326115 A1* | 12/2013 | Goss | G06F 3/0641 711/E12.008 |
| 2013/0331971 A1 | 12/2013 | Bida et al. | |
| 2013/0332604 A1* | 12/2013 | Seth | G06Q 30/02 709/224 |
| 2013/0339991 A1* | 12/2013 | Ricci | H04N 21/4758 725/25 |
| 2014/0025644 A1* | 1/2014 | Taylor | G06F 16/17 707/690 |
| 2014/0033317 A1 | 1/2014 | Barber | |
| 2014/0040171 A1 | 2/2014 | Segalov et al. | |
| 2014/0058763 A1 | 2/2014 | Zizzamia et al. | |
| 2014/0067950 A1 | 3/2014 | Winograd | |
| 2014/0075004 A1 | 3/2014 | Van Dusen et al. | |
| 2014/0108130 A1* | 4/2014 | Vos | G06Q 30/0246 705/14.45 |
| 2014/0122703 A1 | 5/2014 | Pugh et al. | |
| 2014/0156761 A1 | 6/2014 | Heffernan et al. | |
| 2014/0173646 A1 | 6/2014 | Ramaswamy | |
| 2014/0181085 A1* | 6/2014 | Gokhale | G06F 16/248 707/722 |
| 2014/0188804 A1* | 7/2014 | Gokhale | G06F 16/125 707/645 |
| 2014/0188805 A1* | 7/2014 | Vijayan | G06F 16/113 707/646 |
| 2014/0188812 A1* | 7/2014 | Vijayan | G06F 16/21 707/679 |
| 2014/0189432 A1* | 7/2014 | Gokhale | G06F 11/1464 714/41 |
| 2014/0189680 A1* | 7/2014 | Kripalani | G06F 8/61 717/176 |
| 2014/0233430 A1 | 8/2014 | Russell | |
| 2014/0258236 A1* | 9/2014 | Vijayan | G06F 16/116 707/674 |
| 2014/0279074 A1 | 9/2014 | Chen et al. | |
| 2014/0282665 A1 | 9/2014 | Arini | |
| 2014/0298025 A1 | 10/2014 | Burbank et al. | |
| 2014/0310058 A1 | 10/2014 | Aral et al. | |
| 2014/0317114 A1 | 10/2014 | Alla et al. | |
| 2014/0324544 A1 | 10/2014 | Donato et al. | |
| 2014/0324545 A1 | 10/2014 | Splaine et al. | |
| 2014/0337104 A1 | 11/2014 | Splaine et al. | |
| 2014/0347991 A1 | 11/2014 | Blicker | |
| 2015/0006475 A1* | 1/2015 | Guo | G06F 16/1752 707/693 |
| 2015/0006752 A1 | 1/2015 | O'Hare et al. | |
| 2015/0019322 A1 | 1/2015 | Alla et al. | |
| 2015/0019327 A1 | 1/2015 | Mazumdar et al. | |
| 2015/0046579 A1 | 2/2015 | Perez et al. | |
| 2015/0052245 A1 | 2/2015 | McMillan | |
| 2015/0106505 A1 | 4/2015 | Ramaswamy et al. | |
| 2015/0120926 A1* | 4/2015 | Wells | H04L 47/765 709/226 |
| 2015/0181267 A1 | 6/2015 | Morales et al. | |
| 2015/0193816 A1 | 6/2015 | Toupet et al. | |
| 2015/0186403 A1* | 7/2015 | Srivastava | H04N 21/44226 707/692 |
| 2015/0189500 A1 | 7/2015 | Bosworth et al. | |
| 2015/0193813 A1 | 7/2015 | Toupet et al. | |
| 2015/0222951 A1 | 8/2015 | Ramaswamy | |
| 2015/0262207 A1* | 9/2015 | Rao | H04W 4/18 705/7.32 |
| 2015/0278858 A1 | 10/2015 | Lyons et al. | |
| 2015/0332297 A1 | 11/2015 | Perez et al. | |
| 2015/0341684 A1 | 11/2015 | Kitts et al. | |
| 2015/0364057 A1 | 12/2015 | Catani et al. | |
| 2016/0019580 A1* | 1/2016 | Rao | G06Q 30/0255 705/14.41 |
| 2016/0189182 A1* | 6/2016 | Sullivan | G06Q 30/0204 705/7.33 |
| 2016/0191970 A1 | 6/2016 | Sheppard et al. | |

(56) References Cited

U.S. PATENT DOCUMENTS

| | | |
|---|---|---|
| 2016/0246812 A1* | 8/2016 | Barajas Gonzalez ........................ G06F 3/0641 |
| 2016/0269766 A1 | 9/2016 | Levande et al. |
| 2016/0269783 A1 | 9/2016 | Mowrer et al. |
| 2016/0283372 A1* | 9/2016 | Davis .................. G06F 12/0246 |
| 2016/0350773 A1 | 12/2016 | Sullivan et al. |
| 2016/0379234 A1* | 12/2016 | Shah ...................... H04H 60/76 705/7.33 |
| 2016/0379235 A1 | 12/2016 | Mendrisova et al. |
| 2017/0004526 A1 | 1/2017 | Morovati et al. |
| 2017/0006342 A1 | 1/2017 | Nagaraja Rao et al. |
| 2017/0011420 A1* | 1/2017 | Sullivan .................. G06N 20/00 |
| 2017/0064411 A1 | 3/2017 | Goli et al. |
| 2017/0091794 A1 | 3/2017 | Sheppard et al. |
| 2017/0140398 A1 | 5/2017 | Fleischan et al. |
| 2017/0155956 A1 | 6/2017 | Nagaraja Rao |
| 2017/0187478 A1* | 6/2017 | Shah .................. H04N 21/8456 |
| 2017/0255643 A1* | 9/2017 | Maheshwari ....... G06F 16/1748 |
| 2019/0034962 A1 | 1/2019 | Toupet et al. |
| 2019/0220873 A1 | 7/2019 | Sullivan et al. |
| 2019/0287123 A1 | 9/2019 | Sullivan et al. |
| 2019/0356955 A1 | 11/2019 | Nagaraja Rao et al. |
| 2021/0342879 A1 | 11/2021 | Rao et al. |

FOREIGN PATENT DOCUMENTS

| | | |
|---|---|---|
| CN | 101077014 | 11/2007 |
| CN | 101222348 | 7/2008 |
| CN | 101505247 | 8/2009 |
| CN | 101536503 | 9/2009 |
| CN | 104520839 | 4/2015 |
| CN | 104541513 | 4/2015 |
| CN | 104584564 | 4/2015 |
| EP | 1059599 | 12/2000 |
| EP | 1379044 | 1/2004 |
| GB | 2176639 | 12/1986 |
| JP | H07262167 | 10/1995 |
| JP | 2001084272 | 3/2001 |
| JP | 2001282982 | 10/2001 |
| JP | 2001357192 | 12/2001 |
| JP | 2002163562 | 6/2002 |
| JP | 2002373152 | 12/2002 |
| JP | 2003044396 | 2/2003 |
| JP | 2003067289 | 3/2003 |
| JP | 2003519877 | 6/2003 |
| JP | 2004504674 | 2/2004 |
| JP | 2006127320 | 5/2006 |
| JP | 2006127321 | 5/2006 |
| JP | 2007052633 | 3/2007 |
| JP | 2008234641 | 10/2008 |
| JP | 2009181459 | 8/2009 |
| JP | 2010039845 | 2/2010 |
| JP | 2010257448 | 11/2010 |
| JP | 2012068828 | 4/2012 |
| JP | 2012093970 | 5/2012 |
| KR | 20020037980 | 5/2002 |
| KR | 20120091411 | 8/2002 |
| KR | 100765735 | 10/2007 |
| KR | 20090020558 | 2/2009 |
| KR | 20100094021 | 8/2010 |
| KR | 20110017895 | 2/2011 |
| KR | 20110023293 | 3/2011 |
| KR | 20120123148 | 11/2012 |
| WO | 9617467 | 6/1996 |
| WO | 9628904 | 9/1996 |
| WO | 9641495 | 12/1996 |
| WO | 9809447 | 3/1998 |
| WO | 2000041115 | 7/2000 |
| WO | 152168 | 7/2001 |
| WO | 0152168 | 7/2001 |
| WO | 154034 | 7/2001 |
| WO | 200207054 | 1/2002 |
| WO | 2003027860 | 4/2003 |
| WO | 2005013072 | 2/2005 |
| WO | 2005024689 | 3/2005 |
| WO | 2005111897 | 11/2005 |
| WO | 2008150575 | 12/2008 |
| WO | 2010083450 | 7/2010 |
| WO | 2010088372 | 8/2010 |
| WO | 2010095867 | 8/2010 |
| WO | 2010104280 | 9/2010 |
| WO | 2010104285 | 9/2010 |
| WO | 2011097624 | 8/2011 |
| WO | 2011127027 | 10/2011 |
| WO | 2012019643 | 2/2012 |
| WO | 2012040371 | 3/2012 |
| WO | 2012087954 | 6/2012 |
| WO | 2012128895 | 9/2012 |
| WO | 2012170902 | 12/2012 |
| WO | 2012177866 | 12/2012 |
| WO | 2013122907 | 8/2013 |
| WO | 2013188429 | 12/2013 |
| WO | 2014059319 | 4/2014 |
| WO | 2014176343 | 10/2014 |
| WO | 2014179218 | 11/2014 |
| WO | 2014182764 | 11/2014 |
| WO | 2015005957 | 1/2015 |
| WO | 2015023589 | 2/2015 |
| WO | 2015102796 | 7/2015 |
| WO | 2015102803 | 7/2015 |
| WO | WO-2015138016 A1 * | 9/2015 ............. G06F 16/95 |

OTHER PUBLICATIONS

Arbitron Inc., Edison Research, "The Infinite Dial 2011: Navigating Digital Platforms," 2011, 83 pages.

Australian Government, IP Australia, "Patent Examination Report No. 1," issued in connection with Australian Application No. 2013204953, dated Dec. 23, 2014, 5 pages.

Australian Government, IP Australia, "Examination Report," issued in connection with application No. AU 2013205736, dated Jun. 18, 2013, 2 pages.

Australian Government, IP Australia, "Patent Examination Report No. 1," issued in connection with application No. 2011305429 dated Apr. 17, 2014, 4 pages.

Australian Government, IP Australia, "Patent Examination Report No. 1," issued in connection with Australian Patent Application No. 2013203898, dated Nov. 27, 2014, 4 pages.

Australian Government, IP Australia,"Patent Examination Report No. 1," issued in connection with Application No. 2011374955, dated Sep. 25, 2014, 3 pages.

Braverman, Samantha, "Are the Online Marketing Efforts of TV Shows and Programs Worthwhile?" retrieved from www.harrisinteractive.com/NewsRoom/HarrisPolls/on Mar. 30, 2011, 5 pages.

Canadian Intellectual Property Office, "Examination Search Report," issued in connection with Application No. 2,810,541 dated Jan. 20, 2015, 3 pages.

Canadian Intellectual Property Office, "Examination Search Report," issued in connection with Application No. 2,873,128, dated Jan. 7, 2015, 3 pages.

Canadian Intellectual Property Office, "Office Action," issued in connection with Canadian Patent Application No. 2,810,264, dated Nov. 27, 2014, 5 pages.

Canadian Intellectual Property Office, "Office Action," issued in connection with application No. 2,936,701 dated May 10, 2017, 4 pages.

Canadian Intellectual Property Office, "Office Action," issued in connection with Canadian Patent Application No. 2,819,268, dated Nov. 24, 2014, 4 pages.

Chloe Albanesius, Facebook Issues Fix for Several Tracking Cookies, internet article, www.pcmag.com, Sep. 28, 2011, 2 pages.

Danaher, Journal of Marketing Research, vol. XXVIII, "A Canonical Expansion Model for Multivariate Media Exposure Distributions: A Generalization of the 'Duplication of Viewing Law,'" Aug. 1991, 7 pages.

Edwards, "Apple Wants More Advertisers To Use Its iPhone Tracking System." Business Insider. Jun. 13, 2013. Retrieved from

(56) References Cited

OTHER PUBLICATIONS

<http://www.businessinsider.com/apples-idfa-and-ifa-tracking-system-2013-6>on Jul. 24, 2014, 2 pages.
Emil Protalinski, "Facebook denies cookie tracking allegations," internet article, www.zdnet.com, Sep. 25, 2011, 2 pages.
Emil Protalinski, "Facebook fixes cookie behavior after logging out," internet article, www.zdnet.com, Sep. 27, 2011, 2 pages.
Emil Protalinski, "US congressmen ask FTC to investigate Facebook cookies," internet article, www.zdnet.com, Sep. 28, 2011, 2 pages.
Enoch et al., "Cracking the Cross-Media Code: How to Use Single-Source Measures to Examine Media Cannibalization and Convergence," Journal of Advertising Research, Jun. 2010, 13 pages.
European Patent Office, "Communication pursuant to Rules 70(2) and 70a(2) EPC," issued in connection with application No. 14885507.5 dated Jul. 18, 2017, 1 page.
European Patent Office, "Extended European Search Report," issued in connection with application No. EP 12760524.4, dated Aug. 18, 2014, 8 pages.
European Patent Office, "Extended European Search Report," issued in connection with application No. EP 14004028.8, dated Apr. 9, 2015, 7 pages.
European Patent Office, "Extended European Search Report," issued in connection with application No. 14885507.5 dated Jun. 29, 2017, 6 pages.
European Patent Office, "Extended European Search Report," issued in connection with European Patent Application No. 14004028.8, dated Apr. 9, 2015, 7 pages.
Facebook for Business. "Measuring Conversions on Facebook, Across Devices and in Mobile Apps," Retrieved from <https://www.facebook.com/business/news/cross-device-measurement> on Aug. 14, 2014, 3 pages.
Fliptop, "Fliptop Person API Documentation," retrieved from https://developer.fliptop.com/documentation on May 7, 2013, 6 pages.
Fliptop, "Get, Keep and Grow Customers with Fliptop's Customer Intelligence Application," retrieved from www.fliptop.com/features#social_matching on May 7, 2013, 3 pages.
Fliptop, "What is Fliptop?", www.fliptop.com/about_us, retrieved on May 7, 2013, 1 page.
Goerg et al., "How Many Millenials Visit YouTube? Estimating Unobserved Events From Incomplete Panel Data Conditioned on Demographic Covariates," Apr. 27, 2015, 27 pages.
Goerg et al., "How Many People Visit YouTube? Imputing Missing Events in Panels With Excess Zeros," 2015, 6 pages.
Headen et al., "The Duplication of Viewing Law and Television Media Schedule Evaluation," Journal and Marketing Research, vol. XVI, Aug. 1979, 9 pages.
Hothorn et al. "Unbiased Recursive Partitioning: A Conditional Inference Framework," Journal of Computational and Geographical Statistics, vol. 15, No. 3, 2006, pp. 651-674, 21 pages.
Huang et al., "Modeling the Audience's Banner Ad Exposure For Internet Advertising Planning," Journal of Advertising Research, vol. 35, No. 2, Summer 2006, 15 pages.
International Bureau, "International Preliminary Report on Patentability," issued in connection with PCT application Serial No. PCT/US2011/052623, dated Mar. 26, 2013, 5 pages.
International Bureau, "International Preliminary Report on Patentability," issued in connection with application No. PCT/US2012/026760, dated Sep. 24, 2013, 4 pages.
International Bureau, "International Preliminary Report on Patentability," issued in connection with International Patent Application No. PCT/US2015/067917, dated Jul. 4, 2017, 7 pages.
International Bureau, "International Preliminary Report on Patentability," issued in connection with PCT Application No. PCT/US2014/068623, dated Sep. 13, 2016, 9 pages.
International Searching Authority, "International Search Report and Written Opinion," issued in connection with International Patent Application No. PCT/US2015/067917, dated May 23, 2016, 11 pages.
International Searching Authority, "International Search Report," issued in connection with application No. PCT/US2011/052623, dated Mar. 8, 2012, 3 pages.
International Searching Authority, "International Search Report," issued in connection with application No. PCT/US2012/026760, dated Jan. 2, 2013, 3 pages.
International Searching Authority, "International Search Report," issued in connection with International Application No. PCT/US2013/025687 dated Jun. 2, 2013, 5 pages.
International Searching Authority, "Written Opinion of the International Searching Authority," issued in issued in connection with International Application No. PCT/US2013/025687 dated Jun. 2, 2013, 5 pages.
International Searching Authority, "Written Opinion," issued in connection with application No. PCT/US2011/0052762, dated Aug. 22, 2012, 4 pages.
International Searching Authority, "Written Opinion," issued in connection with application No. PCT/US2011/052623, dated Mar. 8, 2012, 4 pages.
International Searching Authority, "Written Opinion," issued in connection with application No. PCT/US2011/065881, dated Jul. 9, 2012, 6 pages.
International Searching Authority, "Written Opinion," issued in connection with application No. PCT/US2012/026760, dated Jan. 2, 2013, 3 pages.
International Searching Authority, "Written Opinion," issued in connection with application No. PCT/US2013/057045, dated Dec. 27, 2013, 5 pages.
IP Australia, "Examination Report No. 1," issued in connection with application No. AU 2015264866, dated Dec. 19, 2016, 2 pages.
IP Australia, "Examination Report No. 2," issued in connection with application No. AU 2012231667, dated Feb. 10, 2015, 3 pages.
IP Australia, "Examination Report No. 2," issued in connection with application No. AU 2015264866, dated May 26, 2017, 3 pages.
IP Australia, "Examination Report," issued in connection with application No. 2014386191 dated Feb. 10, 2017, 3 pages.
IP Australia, "Notice of Acceptance," issued in connection with Australian Patent Application No. 2011374955, dated Aug. 24, 2015, 2 pages.
IP Australia, "Notice of Grant," issued in connection with Australian Patent Application No. 2011374955, dated Dec. 17, 2015, 1 page.
IP Australia, "Patent Examination Report No. 1," issued in connection with Application No. 2011349435, dated Nov. 4, 2014, 3 pages.
IP Australia, "Patent Examination Report No. 1," issued in connection with Application No. 2013204865, dated Dec. 22, 2014, 3 pages.
IP Australia, "Patent Examination Report No. 1," issued in connection with Application No. 2014260163, dated Apr. 21, 2015, 3 pages.
IP Australia, "Patent Examination Report No. 1," issued in connection with Application No. 2014262739, dated May 29, 2015, 4 pages.
IP Australia, "Patent Examination Report No. 1," issued in connection with Australian Patent Application No. 2013204354, dated Nov. 14, 2014, 3 pages.
IP Australia, "Notice of Acceptance," issued in connection with Australian Patent Application No. 2012231667, dated May 15, 2015, 3 pages.
IP Australia, "Notice of Acceptance," issued in connection with Australian Patent Application No. 2014262739, dated Oct. 30, 2015, 2 pages.
Japan Patent Office, "Notice of Reasons for Rejection," issued in connection with Application No. 2013-529435, dated Aug. 20, 2013, 4 pages.
Japan Patent Office, "Notice of Allowance," issued in connection with Japanese Patent Application No. 2013-544887, dated May 26, 2015, 5 pages.
Japanenese Patent Office, "Notice of Reasons for Rejection," issued in connection with Japanese Patent Application No. P2014-005867 dated Apr. 15, 2014, 10 pages.
Japanese Patent Office, "Final Rejection," issued in connection with Japanese Patent Application No. P2014-005867 dated Aug. 26, 2014, 8 pages.

(56) References Cited

OTHER PUBLICATIONS

Japanese Patent Office, "Notice of Allowance," issued in connection with Japanese Patent Application No. 2014-005867 dated Jun. 9, 2015, 3 pages.
Japanese Patent Office, "Notice of Allowance," issued on connection with application No. 2016-556957, dated Oct. 3, 2017, 3 pages.
Japanese Patent Office, "Notice of Reasons for Rejection," issued in connection with Japanese Patent Application No. P2014-005867 dated Feb. 17, 2015, 6 pages.
Japanese Patent Office, "Notice of Reasons for Rejection," issued in connection with Japanese Patent Application No. P2015-0524512 dated Jun. 30, 2015, 6 pages.
Japanese Patent Office, "Notice of Reasons for Rejection," issued in connection with Japanese Patent Application No. P2015-078539 dated Jul. 14, 2015, 6 pages.
Japanese Patent Office, "Office Action" with English translation, issued in connection with application No. JP 2013-544887, dated Aug. 12, 2014, 21 pages.
Japanese Patent Office, "Office Action," issued in connection with Japanese Patent Application No. P2013546286, dated Aug. 26, 2014, 5 pages.
Javascript and Ajax Forum, Sep. 28, 2005, [retrieved from Internet at http://www.webmasterworld.com/forum91/4465.htm on Jun. 29, 2011] 4 pages.
Jennings et al., "Adding Adaptive Models Makes Neural Net Fraud Models More Robust," FICO Blog, Sep. 7, 2011, 4 pages.
Launder, "Media Journal: Nielsen to Test Online-TV Viewing Tool," The Wall Street Journal, Apr. 30, 2013, 2 pages.
Mental Poker, Wikipedia, Jan. 12, 2010, [retrieved from Internet at http://en.wikipedia.org/wiki/Mental_poker on Sep. 21, 2010] 5 pages.
Nielsen Unveils New Online Advertising Measurement, The Nielsen Company, Sep. 27, 2010, [retrieved from Internet at http://nielsen.com/us/en/insights/press-room/201O/nielsen_unveils_newonlineadvertisingmeasurement.html on May 31, 2012] 3 pages.
Nielsen, "How Teens Use Media: A Nielsen Report on the Myths and Realities of Teen Media Trends," Jun. 2009, 17 pages.
Nik Cubrilovic, "Logging out of Facebook is not enough," Internet article, www.nikcub.appspot.com, Sep. 25, 2011, 3 pages.
International Bureau, "International Preliminary Report on Patentability," issued in connection with Application No. PCT/US2013/045211, dated Dec. 16, 2014, 8 pages.
International Bureau, "International Preliminary Report on Patentability," issued in connection with Application No. PCT/US2013/057045, dated Mar. 3, 2015, 6 pages.
International Searching Authority, "International Search Report and Written Opinion," issued in connection with PCT/US2013/045211, dated Feb. 25, 2014, 13 pages.
International Searching Authority, "International Search Report and Written Opinion," issued in connection with Application No. PCT/US2014/031342, dated Jul. 28, 2014, 13 pages.
International Searching Authority "International Search Report and Written Opinion," issued in connection with Application No. PCT/US2014/034389, dated Sep. 5, 2014, 15 pages.
International Searching Authority, "International Search Report and Written Opinion," issued in connection with Application No. PCT/US2014/035683, dated Sep. 12, 2014, 13 pages.
International Searching Authority, "International Search Report and Written Opinion," issued in connection with Application No. PCT/US2014/037064, dated Sep. 12, 2014, 9 pages.
International Searching Authority, "International Search Report and Written Opinion," issued in connection with Application No. PCT/US2014/050551, dated Nov. 24, 2014, 11 pages.
International Searching Authority, "International Search Report," issued in connection with PCT application No. PCT/US2011/065881, dated Jul. 9, 2012, 3 pages.
International Searching Authority, "International Search Report," issued in connection with PCT Application No. PCT/US2014/068165, dated Feb. 25, 2015, 3 pages.
International Searching Authority, "International Search Report," issued in connection with PCT application No. PCT/US2014/068168, dated Mar. 2, 2015, 3 pages.
International Searching Authority, "International Search Report," issued in connection with PCT/US2011/052762, dated Aug. 22, 2012, 3 pages.
International Searching Authority, "International Search Report," issued in connection with PCT/US2013/057045, dated Dec. 27, 2013, 3 pages.
International Searching Authority, "International Search Report," issued in connection with Application No. PCT/US2014/035156, dated Aug. 25, 2014, 5 pages.
International Searching Authority, "International Search Report," issued in connection with Application No. PCT/US2014/068202, dated Apr. 10, 2015, 3 pages.
International Searching Authority, "International Search Report," issued in connection with Application No. PCT/US2014/068621, dated Feb. 27, 2015, 3 pages.
International Searching Authority, "International Search Report," issued in connection with Application No. PCT/US2014/068623, dated Mar. 23, 2015, 3 pages.
International Searching Authority, "Written Opinion," issued in connection with PCT Application No. PCT/US2014/06815, dated Feb. 25, 2015, 5 pages.
International Searching Authority, "Written Opinion," issued in connection with PCT application No. PCT/US2014/068168, dated Mar. 2, 2015, 5 pages.
International Searching Authority "Written Opinion," issued in connection with Application No. PCT/US2014/035156, dated Aug. 25, 2014, 5 pages.
International Searching Authority, "Written Opinion," issued in connection with Application No. PCT/US2014/068202, dated Apr. 10, 2015, 7 pages.
International Searching Authority, "Written Opinion," issued in connection with Application No. PCT/US2014/068621, dated Feb. 27, 2015, 7 pages.
International Searching Authority, "Written Opinion," issued in connection with Application No. PCT/US2014/068623, dated Mar. 23, 2015, 8 pages.
Rapleaf, "Fast. Simple. Secure," www.rapleaf.com/why-rapleaf/, retrieved on May 7, 2013 (3 pages).
Rapleaf, "Frequently Asked Questions," www.rapleaf.com/about-us/faq/#where, retrieved on May 7, 2013 (3 pages).
Rapleaf, "The Consumer Data Marketplace," www.rapleaf.com/under-the-hood/, retrieved on May 7, 2013 (2 pages).
Read et al., "Classifier Chains for Multi-Label Classification," Machine Learning, Jun. 30, 2011 (16 pages).
Rust et al., "A Comparative Study of Television Duplication Models," Journal for Advertising, vol. 10, No. 3, 1981, 6 pages.
Sharma, "Nielsen Gets Digital to Track Online TV Viewers," Wall Street Journal, Apr. 30, 2013, 3 pages.
State Intellectual Property Office of China, "Second Office Action," issued in connection with Chinese Patent Application No. 201180045957.2, dated Jul. 29, 2015, 5 pages.
Coffey, "Internet Audience Measurement: A Practitioner's View," Journal of Interactive Advertising, vol. 1, No. 2, Spring 2001, 8 pages.
Taboga, Marco. (2010) Linear combinations of normal random variables, from "Lectures on probability and statistics," 4 pages. <http://www.statlect.com/normal_distribution_linear_combinations.htm>.
The State Intellectual Property Office of China, "First Notification of Office Action," issued in connection with Application No. 201180045957.2, dated Nov. 15, 2014, 20 pages.
The State Intellectual Property Office of China, "First Notification of Office Action," issued in connection with Application No. 201180061437.0, dated Mar. 7, 2014, 11 pages.
The State Intellectual Property Office of China, "First Notification of Office Action," issued in connection with application No. CN 201280003504.8, dated Apr. 1, 2015, with English translation, 17 pages.

(56) References Cited

OTHER PUBLICATIONS

The State Intellectual Property Office of China, "Notification of Publication and Entry into Substantive Examination Procedure," issued in connection with application No. 201480077152 on Mar. 8, 2017, 2 pages.
The State Intellectual Property Office of China, "Second Notification of Office Action," issued in connection with Application No. 201180061437.0, dated Nov. 15, 2014, 6 pages.
The State Intellectual Property Office of China, "Notice of Allowance," issued in connection with Chinese Patent Application No. 201180045957.2, dated Feb. 5, 2016, 5 pages.
United States Patent and Trademark Office, "Office Action," issued in connection with U.S. Appl. No. 14/500,297, dated Jan. 5, 2015, 6 pages.
United States Patent and Trademark Office, "Examiner's Answer to Appeal Brief," issued in connection with U.S. Appl. No. 14/560,947, dated Aug. 4, 2017, 11 pages.
United States Patent and Trademark Office, "Final Office Action," issued in connection with U.S. Appl. No. 13/690,915, dated Dec. 20, 2013, 6 pages.
United States Patent and Trademark Office, "Final Office Action," issued in connection with U.S. Appl. No. 13/963,737, dated Sep. 21, 2015, 14 pages.
United States Patent and Trademark Office, "Final Office Action," issued in connection with U.S. Appl. No. 14/025,575, dated Aug. 17, 2015, 34 pages.
United States Patent and Trademark Office, "Final Office Action," issued in connection with U.S. Appl. No. 14/560,947, dated Sep. 9, 2016, 14 pages.
United States Patent and Trademark Office, "Non-Final Office Action, " issued in connection with U.S. Appl. No. 13/404,984, dated May 20, 2015, 10 pages.
United States Patent and Trademark Office, "Non-Final Office Action," issued in connection with U.S. Appl. No. 13/209,292, dated Apr. 8, 2014, 14 pages.
United States Patent and Trademark Office, "Non-Final Office Action," issued in connection with U.S. Appl. No. 13/239,005, dated Jun. 4, 2013, 11 pages.
United States Patent and Trademark Office, "Non-Final Office Action," issued in connection with U.S. Appl. No. 13/396,071, dated May 9, 2014, 14 pages.
United States Patent and Trademark Office, "Non-Final Office Action," issued in connection with U.S. Appl. No. 13/690,915, dated Sep. 5, 2013, 13 pages.
United States Patent and Trademark Office, "Non-Final Office Action," issued in connection with U.S. Appl. No. 13/691,175, dated Sep. 9, 2013, 7 pages.
United States Patent and Trademark Office, "Non-Final Office Action," issued in connection with U.S. Appl. No. 13/756,493, dated Jan. 17, 2014, 8 pages.
United States Patent and Trademark Office, "Non-Final Office Action," issued in connection with U.S. Appl. No. 13/756,493, dated Nov. 19, 2014, 12 pages.
United States Patent and Trademark Office, "Non-Final Office Action," issued in connection with U.S. Appl. No. 13/915,381, dated Jan. 30, 2015, 7 pages.
United States Patent and Trademark Office, "Non-Final Office Action," issued in connection with U.S. Appl. No. 14/014,044, dated Jul. 2, 2015, 22 pages.
United States Patent and Trademark Office, "Non-Final Office Action," issued in connection with U.S. Appl. No. 14/014,050, dated May 28, 2015, 4 pages.
United States Patent and Trademark Office, "Non-Final Office Action," issued in connection with U.S. Appl. No. 14/025,567, dated Aug. 6, 2015, 10 pages.
United States Patent and Trademark Office, "Non-Final Office Action," issued in connection with U.S. Appl. No. 14/025,575, dated Apr. 16, 2015, 19 pages.
United States Patent and Trademark Office, "Non-Final Office Action," issued in connection with U.S. Appl. No. 14/463,309, dated Aug. 5, 2015, 10 pages.
United States Patent and Trademark Office, "Non-Final Office Action," issued in connection with U.S. Appl. No. 14/560,947, dated Mar. 11, 2016, 19 pages.
United States Patent and Trademark Office, "Non-Final Office Action," issued in connection with U.S. Appl. No. 14/014,044, dated Apr. 8, 2016, 21 pages.
United States Patent and Trademark Office, "Notice of Allowance and Fee(s) Due," issued in connection with U.S. Appl. No. 13/690,915, dated Apr. 9, 2014, 5 pages.
United States Patent and Trademark Office, "Notice of Allowance," issued in connection with U.S. Appl. No. 13/239,005, dated Nov. 27, 2013, 10 pages.
United States Patent and Trademark Office, "Notice of Allowance," issued in connection with U.S. Appl. No. 13/396,071, dated Oct. 24, 2014, 8 pages.
United States Patent and Trademark Office, "Notice of Allowance," issued in connection with U.S. Appl. No. 13/513,148, dated Nov. 5, 2012, 26 pages.
United States Patent and Trademark Office, "Notice of Allowance," issued in connection with U.S. Appl. No. 13/690,915, dated Jun. 5, 2015, 6 pages.
United States Patent and Trademark Office, "Notice of Allowance," issued in connection with U.S. Appl. No. 13/691,175, dated Jan. 27, 2014, 5 pages.
United States Patent and Trademark Office, "Notice of Allowance," issued in connection with U.S. Appl. No. 13/691,175, dated May 9, 2014, 6 pages.
United States Patent and Trademark Office, "Notice of Allowance," issued in connection with U.S. Appl. No. 13/756,493, dated Mar. 17, 2015, 5 pages.
United States Patent and Trademark Office, "Notice of Allowance," issued in connection with U.S. Appl. No. 13/756,493, dated May 20, 2014, 11 pages.
United States Patent and Trademark Office, "Notice of Allowance," issued in connection with U.S. Appl. No. 13/915,381, dated Jun. 8, 2015, 7 pages.
United States Patent and Trademark Office, "Notice of Allowance," issued in connection with U.S. Appl. No. 13/995,864, dated Oct. 28, 2014, 9 pages.
United States Patent and Trademark Office, "Notice of Allowance," issued in connection with U.S. Appl. No. 14/500,297, dated May 21, 2015, 5 pages.
United States Patent and Trademark Office, "Notice of Allowance," issued in connection with U.S. Appl. No. 14/641,982, dated Sep. 2, 2015, 13 pages.
United States Patent and Trademark Office, "Office Action," issued in connection with U.S. Appl. No. 14/014,050, dated Sep. 12, 2014, 10 pages.
United States Patent and Trademark Office, "Advisory Action," issued in connection with U.S. Appl. No. 13/209,292, dated Dec. 24, 2014, 3 pages.
United States Patent and Trademark Office, "Corrected Notice of Allowability," issued in connection with U.S. Appl. No. 13/690,915, dated Nov. 6, 2014, 2 pages.
United States Patent and Trademark Office, "Final Office Action," issued in connection with U.S. Appl. No. 13/209,292, dated Sep. 10, 2014, 11 pages.
United States Patent and Trademark Office, "Final Office Action," issued in connection with U.S. Appl. No. 14/014,044, dated Nov. 30, 2015, 22 pages.
United States Patent and Trademark Office, "Non-Final Office Action," issued in connection with U.S. Appl. No. 14/809,888, dated Apr. 29, 2016, 13 pages.
United States Patent and Trademark Office, "Non-Final Office Action," issued in connection with U.S. Appl. No. 15/151,182, dated Feb. 8, 2017, 10 pages.
United States Patent and Trademark Office, "Notice of Allowance," issued in connection with U.S. Appl. No. 13/209,292, dated Feb. 17, 2015, 15 pages.

(56) References Cited

OTHER PUBLICATIONS

United States Patent and Trademark Office, "Notice of Allowance," issued in connection with U.S. Appl. No. 13/690,915, dated Jun. 24, 2014, 6 pages.
United States Patent and Trademark Office, "Notice of Allowance," issued in connection with U.S. Appl. No. 15/151,182, dated Aug. 2, 2017, 7 pages.
United States Patent and Trademark Office, "Supplemental Notice of Allowability," issued in connection with U.S. Appl. No. 13/209,292, dated Jun. 30, 2015, 2 pages.
United States Patent and Trademark Office, "Supplemental Notice of Allowability," issued in connection with U.S. Appl. No. 14/641,982, dated Sep. 23, 2015, 2 pages.
Vega, Tanzina, "Nielsen Introduces New Ad Measurement Product," The New York Times, Sep. 27, 2010, 7 pages.
Vranica, "Nielsen Testing a New Web-Ad Metric," The Wall Street Journal, Sep. 23, 2010, 2 pages.
United States Patent and Trademark Office, "Supplemental Notice of Allowability," issued in connection with U.S. Appl. No. 13/690,915, dated Jul. 8, 2014, 3 pages.
IP Australia, "Patent Examination Report No. 2," issued in connection with Australian Application No. 2014386191, dated Oct. 25, 2017, 3 pages.
International Searching Authority, "Written Opinion," issued by the International Searching Authority in connection with PCT Application No. PCT/US2014/068165, dated Feb. 25, 2015, 5 pages.
United States Patent and Trademark Office, "Non-Final Office action," issued in connection with U.S. Appl. No. 14/957,258, dated Oct. 18, 2017, 17 pages.
United States Patent and Trademark Office, "Notice of Allowance and Fee(s) Due" issued in connection with U.S. Appl. No. 14/967,355, dated Jan. 3, 2018, 11 pages.
United States Patent and Trademark Office, "Final Office Action" issued in connection with U.S. Appl. No. 14/604,394, dated Apr. 24, 2018, 28 pages.
United States Patent and Trademark Office, "Non-Final Office Action" issued in connection with U.S. Appl. No. 14/984,521, dated May 1, 2018, 28 pages.
United States Patent and Trademark Office, "Final Office Action" issued in connection with U.S. Appl. No. 14/957,258, dated Apr. 27, 2018, 18 pages.
United States Patent and Trademark Office, "Final Office Action" issued in connection with U.S. Appl. No. 14/984,521, dated Nov. 7, 2018, 34 pages.
Korean Patent Office, "Notice of Preliminary Rejection," issued in connection with Korean Patent application No. 10-2016-7024073, dated Dec. 29, 2017, 5 pages.
Ridder, "How accurate are Google Analytics Demographic Reports?," Mar. 17, 2014, retrieved from https://www.humix.be/en/blog/how-accurate-are-google-analytics-demographic-reports/, 10 pages.
Celebrating 90 Years of Innovation, retrieved from http://sites.nielsen.com/90years/, 2018, 24 pages.
United States Patent and Trademark Office, "Advisory Action Before the Filing of an Appeal Brief" issued in connection with U.S. Appl. No. 14/984,521, dated Feb. 12, 2020, 4 pages.
United States Patent and Trademark Office, "Final Office Action" issued in connection with U.S. Appl. No. 14/984,521, dated Dec. 2, 2019, 23 pages.
United States Patent and Trademark Office, "Non-Final Office Action" issued in connection with U.S. Appl. No. 14/984,521, dated Jun. 19, 2019, 20 pages.
United States Patent and Trademark Office, "Notice of Allowance and Fee(s) Due" issued in connection with U.S. Appl. No. 15/956,092, dated Mar. 13, 2019, 10 pages.
United States Patent and Trademark Office, "Non-Final Office Action" issued in connection with U.S. Appl. No. 15/956,092, dated Sep. 7, 2018, 17 pages.
United States Patent and Trademark Office, "Patent Board Decision," issued Feb. 22, 2018 in connection with U.S. Appl. No. 14/560,947, 7 pages.
United States Patent and Trademark Office, "Non-Final Office Action," dated Jun. 4, 2018 in connection with U.S. Appl. No. 14/560,947, 16 pages.
United States Patent and Trademark Office, "Final Office Action," dated Oct. 12, 2018 in connection with U.S. Appl. No. 14/560,947, 19 pages.
United States Patent and Trademark Office, "Afcp Decision and Advisory Action," dated Jan. 2, 2019 in connection with U.S. Appl. No. 14/560,947, 4 pages.
Korean Patent Office, "Notice of Preliminary Rejection," dated Jan. 28, 2020 in connection with Korean Patent Application No. 10-2018-7037635, 7 pages, including English translation.
Song, "Classification of Program Information Genre for Intelligent Personalized EPG," 27th Korea Information Processing Society, Proceedings of Spring Symposium Conference, vol. 14, No. 1, pp. 435-438, May 2007, 4 pages.
United States Patent and Trademark Office, "Non-Final Office Action" issued in connection with U.S. Appl. No. 16/247,254, dated Sep. 19, 2019, 10 pages.
United States Patent and Trademark Office, "Final Office Action," issued in connection with U.S. Appl. No. 14/957,258, dated Nov. 16, 2018, 20 pages.
United States Patent and Trademark Office, "Non-Final Office Action" issued in connection with U.S. Appl. No. 14/984,690, dated Aug. 29, 2018, 19 pages.
United States Patent and Trademark Office, "Notice of Allowance" issued in connection with U.S. Appl. No. 14/984,690, dated Mar. 28, 2019, 9 pages.
United States Patent and Trademark Office, "Notice of Allowance" issued in connection with U.S. Appl. No. 14/809,888, dated Oct. 19, 2016, 10 pages.

* cited by examiner

| | D1 | D2 | D3 |
|---|---|---|---|
| D1 | 60% | 10% | 30% |
| D2 | 20% | 50% | 40% |
| D3 | 20% | 40% | 30% |
| Total | 100% | 100% | 100% |

Misattribution Correction Matrix 800

Database Proprietor Demographic Groups i — 802

Actual Demographic Groups j — 804

FIG. 8

METHODS AND APPARATUS TO GENERATE CORRECTED ONLINE AUDIENCE MEASUREMENT DATA

RELATED APPLICATIONS

This patent arises from a continuation of U.S. patent application Ser. No. 14/984,690, which was filed on Dec. 30, 2015, which claims benefit to U.S. Provisional Patent Application Ser. No. 62/188,482, which was filed on Jul. 2, 2015. U.S. patent application Ser. No. 14/984,690 and U.S. Provisional Patent Application Ser. No. 62/188,482 are hereby incorporated herein by reference in their entireties. Priority to U.S. patent application Ser. No. 14/984,690 and U.S. Provisional Patent Application Ser. No. 62/188,482 is claimed.

FIELD OF THE DISCLOSURE

This disclosure relates generally to monitoring media, and, more particularly, to methods and apparatus to generate corrected online audience measurement data.

BACKGROUND

Traditionally, audience measurement entities determine compositions of audiences exposed to media by monitoring registered panel members and extrapolating their behavior onto a larger population of interest. That is, an audience measurement entity enrolls people that consent to being monitored into a panel and collects relatively highly accurate demographic information from those panel members via, for example, in-person, telephonic, and/or online interviews. The audience measurement entity then monitors those panel members to determine media exposure information identifying media (e.g., television programs, radio programs, movies, streaming media, etc.) exposed to those panel members. By combining the media exposure information with the demographic information for the panel members, and by extrapolating the result to the larger population of interest, the audience measurement entity can determine detailed audience measurement information such as media ratings, audience composition, reach, etc. This audience measurement information can be used by advertisers to, for example, place advertisements with specific media to target audiences of specific demographic compositions.

More recent techniques employed by audience measurement entities monitor exposure to Internet accessible media or, more generally, online media. These techniques expand the available set of monitored individuals to a sample population that may or may not include registered panel members. In some such techniques, demographic information for these monitored individuals can be obtained from one or more database proprietors (e.g., social network sites, multi-service sites, online retailer sites, credit services, etc.) with which the individuals subscribe to receive one or more online services. However, the demographic information available from these database proprietor(s) may be self-reported and, thus, unreliable or less reliable than the demographic information typically obtained for panel members registered by an audience measurement entity.

BRIEF DESCRIPTION OF THE DRAWINGS

FIG. 8 illustrates an example misattribution correction matrix.

The figures are not to scale. Wherever appropriate, the same reference numbers will be used throughout the drawing(s) and accompanying written description to refer to the same or like parts.

DETAILED DESCRIPTION

Figure 1:
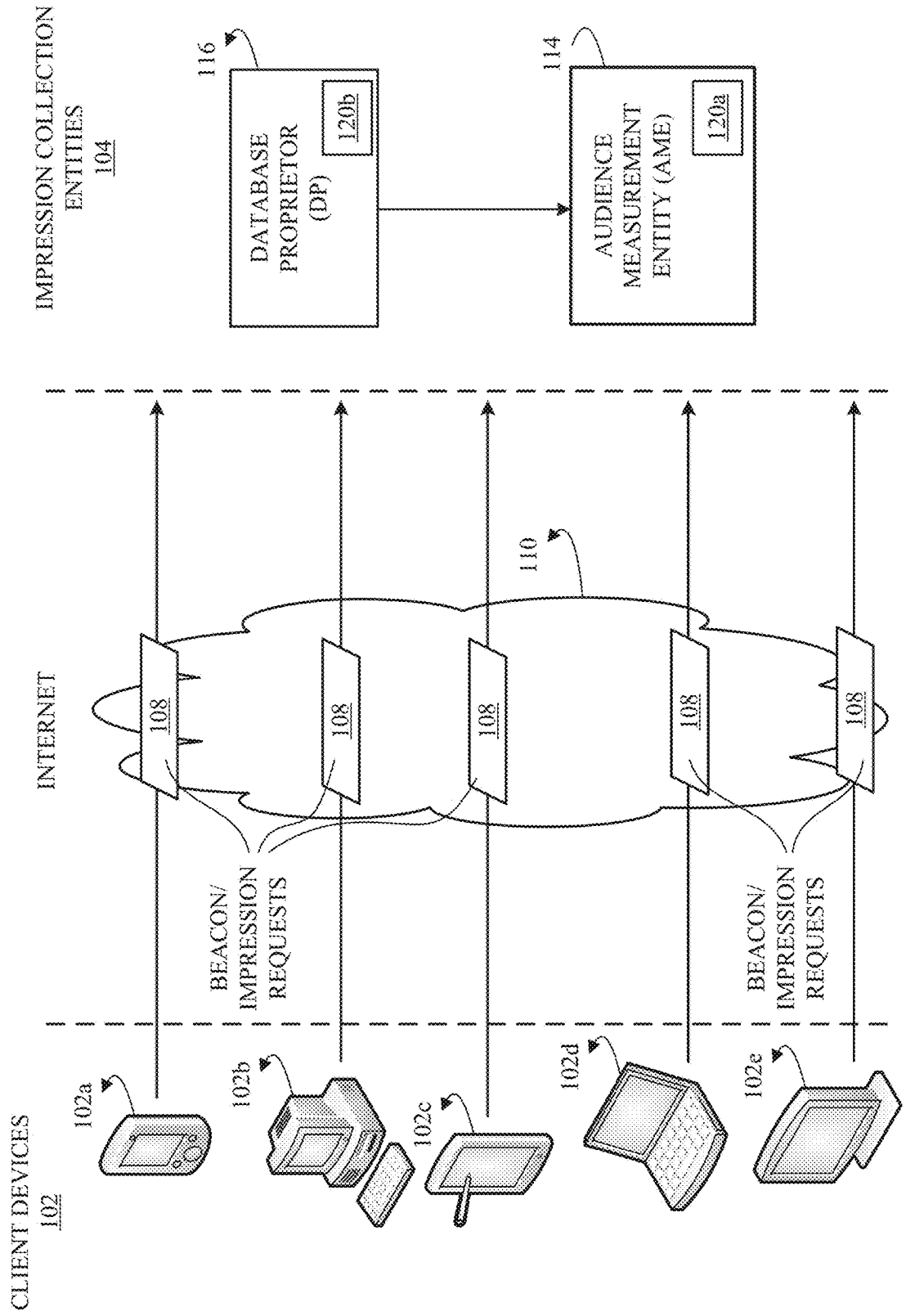
FIG. 1 illustrates example client devices that report audience and/or impressions for Internet-based media to impression collection entities to facilitate identifying numbers of impressions and sizes of audiences exposed to different Internet-based media.

In online audience measurement, collecting information about audiences and impressions from unknown viewers presents a risk of reporting biased demographic compositions in ratings information (e.g., average minute audience, views, duration, and unique audience). Examples disclosed herein reduce the risk of bias in the demographic compositions by correcting for sample bias and/or attribution error present in database proprietor data.

In disclosed examples, an online user visits a website to watch a video that has been provided with a set of instructions or information (e.g., via a software development kit (SDK) provided by an audience measurement entity such as The Nielsen Company). When the online user, who may or may not have a prior relationship with the audience measurement entity, visits the website, different types of messages are generated and sent by the online user's device via a communications network. One or more of the messages are sent to a database proprietor's server and one or more of the messages are sent to the audience measurement entity's servers.

The message(s) sent to the database proprietor's server include a cookie and/or other identifier that enable(s) the database proprietor to match the online user to demographic information. The database proprietor attributes the impression to a user account corresponding to the cookie value, and subsequently aggregates the impressions, sessions, and/or audience count based on the demographics associated with the user accounts. The message(s) sent to the audience measurement entity and/or the database proprietor enable the audience measurement entity and/or the database proprietor to measure the portions of the media (e.g., a video) presented at the online user's device.

Among the potential sources of bias in the demographic information provided by the database proprietor is coverage of the online user. For example, not everyone in a population has the database proprietor cookie that enables the database proprietor to match the impression to an online profile. For example, a user may not have an account with the database proprietor and/or the user may have an account with the database proprietor but has deleted the database proprietor cookie or otherwise does not have the database proprietor cookie set at a client device at the time of media exposure via the client device. As a result, the database proprietor is not be able to match the impressions to demographic information. A failure to match impressions results in a failure to report audience, views, or duration for those impressions and, thus, an underestimation of the audience count, view count and/or duration for the demographic group to which the online user belongs.

Another potential source of bias in the demographic information arises from misattribution, in which the online user's device is used by multiple users in a household. The other users may or may not have an account with database proprietor. For example, if a first user that logged into the database proprietor on the device at a first time is not the same user using the device at a second time during a media presentation, any impressions, sessions, audience, and/or duration logged based on the database proprietor cookie corresponding to the first user may be misattributed to an incorrect demographic group. As a result, misattribution may result in overestimation of the audience count and/or duration for the demographic group of the user corresponding to the cookie and underestimation of the audience count and/or duration for the demographic group of the actual user that was exposed to the media.

The example sources of bias described above arise in techniques for measuring online audiences for media in which viewing data is collected from unknown (e.g., anonymous) users and third-party demographic information is used to ascertain the demographic composition of the unknown users. While such techniques provide the benefit of more accurate measurements of larger audiences by including unknown or anonymous users, the use of message transmission from the client devices to the audience measurement entity and/or to the database proprietor as well as the use of cookie (or other identifier) matching at the database proprietor results in the inclusion of the above-described sources of bias in the demographic information obtained from the database proprietor.

Disclosed example methods to generate corrected online audience measurement data include collecting messages indicating impressions of streaming media delivered to computing devices via an Internet. Some disclosed example methods include receiving, from a database proprietor, a first audience count indicative of first numbers of the impressions corresponding to the messages attributed to the streaming media for a demographic group, a second audience count indicative of second numbers of the impressions corresponding to the messages attributed to text accessed by the demographic group, and a third audience count describing third numbers of the impressions corresponding to the messages attributed to the streaming media and the text content for accessed by the demographic group. Some disclosed example methods further include determining a corrected audience count of the streaming media for the demographic group by: estimating a fourth audience count for the demographic group and estimating a fifth audience count for the demographic group. In some examples, the fourth audience count indicative of a first number of people who accessed the streaming media and the fifth audience count indicative of a second number of people who accessed the text content. In some examples, determining a corrected audience count of the streaming media for the demographic group further includes calculating a deduplication factor for the demographic group based on the first audience count, the second audience count, and the third audience count, and applying the deduplication factor to a sum of the fourth audience count and the fifth audience count to determine the corrected audience count. Some example methods include generating audience metrics for the streaming media based on subtracting the corrected audience count from the first audience count.

Some example methods further include generating a first adjusted audience count by adjusting the first audience count to compensate for demographic information being unavailable to the database proprietor, generating a second adjusted audience count by adjusting the second audience count to compensate for the demographic information being unavailable to the database proprietor, and generating a third adjusted audience count by adjusting the third audience count to compensate for the demographic information being unavailable to the database proprietor. In some examples, calculating the deduplication factor is based on the first adjusted audience count, the second adjusted audience count, and the third adjusted audience count.

In some disclosed examples, the fourth audience count is estimated based on a first impressions count and a first frequency of impressions detected by the database proprietor. In some disclosed examples, the first impressions count indicates a presentation of a time segment of the streaming media.

In some disclosed example methods, the first impressions count is determined by applying a first ratio to a second impressions count, where the first ratio indicates a quantity of time sub-segments of the streaming media presented at the devices during the time segment and the second impressions count indicates a number of impressions of second media. Some example methods further include generating a redistributed impressions count by assigning second demographic information to a first impressions for which the second demographic information is unavailable to the database proprietor based on second impressions for which the second demographic information is received from the database proprietor. Some example methods further include applying an impressions matrix to the redistributed impressions count to generate the second impressions count.

Some example methods further include generating a misattribution matrix including a probability that the impressions are attributable to a second demographic group when the database proprietor determines the impressions to correspond to a person in a third demographic group. Some disclosed examples further include converting the misattribution matrix to the impressions matrix, where the impressions matrix indicating numbers of the impressions determined by the database proprietor to correspond to respective ones of demographic groups.

In some examples, the messages include an identifier relating the impressions to respective time segments of the streaming media, a network affiliate distributing the streaming media, a network affiliate distributor providing the streaming media to ones of the computing devices as permitted by the network affiliate, a program distributed by the network affiliate and provided to ones of the computing devices via the network affiliate distributor and of which the streaming media is a part, and an episode that belongs to the program of which the streaming media is at least a part. In some examples, the messages identify at least one of time segments of the streaming media that were presented at the computing devices or impressions of the text accessed via the computing devices.

Disclosed example apparatus to generate corrected online audience measurement data include a first impressions collector, a second impressions collector, a factor generator, an audience calculator, and a ratings data generator. In some examples, the first impressions collector collects messages indicating impressions of streaming media delivered to computing devices via an Internet. In some disclosed examples, second impressions collector receives, from a database proprietor, a first audience count indicative of first numbers of the impressions corresponding to the messages attributed to the streaming media for a demographic group, a second audience count indicative of second numbers of the impressions corresponding to the messages attributed to text accessed by the demographic group, and a third audience count describing third numbers of the impressions corresponding to the messages attributed to the streaming media and the text content for accessed by the demographic group. In some disclosed examples, the factor generator calculates a deduplication factor for the demographic group using the first audience count, the second audience count, and the third audience count. In some examples, the audience calculator determines a corrected audience count of the streaming media for the demographic group by: estimating a fourth audience count for the demographic group, estimating a fifth audience count for the demographic group, and applying the deduplication factor to a sum of the fourth audience count and the fifth audience count. In some examples, the fourth audience count indicative of a first number of people who accessed the streaming media and the fifth audience count indicative of a second number of people who accessed the text. In some examples, the ratings data generator generates ratings information for the streaming media based on subtracting the corrected audience count from the first audience count.

Some disclosed apparatus further include a demographic distributor to generate a first adjusted audience count by adjusting the first audience count to compensate for demographic information being unavailable to the database proprietor, generate a second adjusted audience count by adjusting the second audience count to compensate for the demographic information being unavailable to the database proprietor, and generate a third adjusted audience count by adjusting the third audience count to compensate for the demographic information being unavailable to the database proprietor. In some examples, the factor generator calculates the deduplication factor based on the first adjusted audience count, the second adjusted audience count, and the third adjusted audience count.

In some examples, the audience calculator estimates the fourth audience count based on a first impressions count and a first frequency of impressions detected by the database proprietor. In some examples, the first impressions count indicating presentation of a time segment of the streaming media. Some disclosed examples further includes a ratio calculator to determine the first impressions count by applying a first ratio to a second impressions count, in some examples, the first ratio indicates a quantity of time sub-segments of the streaming media presented at the devices during the time segment and the second impressions count indicates a number of impressions of second media.

Some example apparatus further include a matrix converter to convert a misattribution matrix to an impressions matrix, where the misattribution matrix includes a probability that the impressions are attributable to a second demographic group when the database proprietor determines the impressions to correspond to third second demographic group. In some examples, the impressions matrix indicates numbers of impressions determined by the database proprietor to correspond to respective ones of demographic groups. Some disclosed examples further include an adjuster to apply the impressions matrix to a redistributed impressions count to generate the second impressions count, in which the redistributed impressions count compensate for second demographic information being unavailable to the database proprietor.

In some examples, the messages include an identifier relating the impressions to respective time segments of the streaming media, a network affiliate distributing the streaming media, a network affiliate distributor providing the streaming media to ones of the computing devices as permitted by the network affiliate, a program distributed by the network affiliate and provided to ones of the computing devices via the network affiliate distributor and of which the streaming media is a part, and an episode that belongs to the program of which the streaming media is at least a part. In some example apparatus, the messages identify one of time segments of the streaming media that were presented at the computing devices or the impressions of the text at the computing devices.

Turning to the figures, FIG. 1 illustrates example client devices 102 (e.g., 102a, 102b, 102c, 102d, 102e) that report audience counts and/or impressions for online (e.g., Internet-based) media to impression collection entities 104 to facilitate determining numbers of impressions and sizes of audiences exposed to different online media. An "impression" generally refers to an instance of an individual's exposure to media (e.g., content, advertising, etc.). As used herein, the term "impression collection entity" refers to any entity that collects impression data, such as, for example, audience measurement entities and database proprietors that collect impression data. Duration refers to an amount of time of presentation of media, which may be credited to an impression. For example, an impression may correspond to a duration of 1 minute, 1 minute 30 seconds, 2 minutes, etc.

The client devices 102 of the illustrated example may be implemented by any device capable of accessing media over a network. For example, the client devices 102a-e may be a computer, a tablet, a mobile device, a smart television, or any other Internet-capable device or appliance. Examples disclosed herein may be used to collect impression information for any type of media. As used herein, "media" refers collectively and/or individually to content and/or advertisement(s). Media may include advertising and/or content delivered via web pages, streaming video, streaming audio, Internet protocol television (IPTV), movies, television, radio and/or any other vehicle for delivering media. In some examples, media includes user-generated media that is, for example, uploaded to media upload sites, such as YouTube, and subsequently downloaded and/or streamed by one or more other client devices for playback. Media may also include advertisements. Advertisements are typically distributed with content (e.g., programming). Traditionally, content is provided at little or no cost to the audience because it is subsidized by advertisers that pay to have their advertisements distributed with the content.

In the illustrated example, the client devices 102 employ web browsers and/or applications (e.g., apps) to access media. Some of the media includes instructions that cause the client devices 102 to report media monitoring information to one or more of the impression collection entities 104. That is, when a client device 102 of the illustrated example accesses media that is instantiated with (e.g., linked to, embedded with, etc.) one or more monitoring instructions, a web browser and/or application of the client device 102 executes the one or more instructions (e.g., monitoring instructions, sometimes referred to herein as beacon instruction(s)) in the media and executes the beacon instruction(s) to cause the executing client device 102 to send a beacon request or impression request 108 to one or more impression collection entities 104 via, for example, the Internet 110. The beacon request 108 of the illustrated example includes information about the access to the instantiated media at the corresponding client device 102 generating the beacon request. Such beacon requests allow monitoring entities, such as the impression collection entities 104, to collect impressions for different media accessed via the client devices 102. In this manner, the impression collection entities 104 can generate large impression quantities for different media (e.g., different content and/or advertisement campaigns). Example techniques for using beacon instructions and beacon requests to cause devices to collect impressions for different media accessed via client devices are further disclosed in U.S. Pat. No. 6,108,637 to Blumenau and U.S. Pat. No. 8,370,489 to Mainak, et al., which are incorporated herein by reference in their respective entireties.

The impression collection entities 104 of the illustrated example include an example audience measurement entity (AME) 114 and an example database proprietor (DP) 116. In the illustrated example, the AME 114 does not provide the media to the client devices 102 and is a trusted (e.g., neutral) third party (e.g., The Nielsen Company, LLC, Adobe Systems, etc.) for providing accurate media access statistics. In the illustrated example, the database proprietor 116 is one of many database proprietors that operate on the Internet to provide one or more services. Such services may include, but are not limited to, email services, social networking services, news media services, cloud storage services, streaming music services, streaming video services, online shopping services, credit monitoring services, etc. Example database proprietors include social network sites (e.g., Facebook, Twitter, MySpace, etc.), multi-service sites (e.g., Yahoo!, Google, etc.), online shopping sites (e.g., Amazon.com, Buy.com, etc.), credit services (e.g., Experian), and/or any other type(s) of web service site(s) that maintain user registration records. In examples disclosed herein, the database proprietor 116 maintains user account records corresponding to users registered for Internet-based services provided by the database proprietors. That is, in exchange for the provision of services, subscribers register with the database proprietor 116. As part of this registration, the subscriber may provide detailed demographic information to the database proprietor 116. The demographic information may include, for example, gender, age, ethnicity, income, home location, education level, occupation, etc. In the illustrated example of FIG. 1, the database proprietor 116 sets a device/user identifier (e.g., an identifier described below in connection with FIG. 2) on a subscriber's client device 102 that enables the database proprietor 116 to identify the subscriber in subsequent interactions.

In the illustrated example, when the database proprietor 116 receives a beacon/impression request 108 from a client device 102, the database proprietor 116 requests the client device 102 to provide the device/user identifier that the database proprietor 116 had previously set for the client device 102. The database proprietor 116 uses the device/user identifier corresponding to the client device 102 to identify demographic information in its user account records corresponding to the subscriber of the client device 102. In this manner, the database proprietor 116 can generate "demographic impressions" by associating demographic information with an impression for the media accessed at the client device 102. Thus, as used herein, a "demographic impression" is defined to be an impression that is associated with one or more characteristic(s) (e.g., a demographic characteristic) of the person(s) exposed to the media in the impression. Through the use of demographic impressions, which associate monitored (e.g., logged) media impressions with demographic information, it is possible to measure media exposure and, by extension, infer media consumption behaviors across different demographic classifications (e.g., groups) of a sample population of individuals.

In the illustrated example, the AME 114 establishes a panel of users who have agreed to provide their demographic information and to have their Internet browsing activities monitored. When an individual joins the AME panel, the person provides detailed information concerning the person's identity and demographics (e.g., gender, age, ethnicity, income, home location, occupation, etc.) to the AME 114. The AME 114 sets a device/user identifier (e.g., an identifier described below in connection with FIG. 2) on the person's client device 102 that enables the AME 114 to identify the panelist.

In the illustrated example, when the AME 114 receives a beacon request 108 from a client device 102, the AME 114 requests the client device 102 to provide the AME 114 with the device/user identifier the AME 114 previously set for the client device 102. The AME 114 uses the device/user identifier corresponding to the client device 102 to identify demographic information in its user AME panelist records corresponding to the panelist of the client device 102. In this manner, the AME 114 can generate demographic impressions by associating demographic information with an audience for the media accessed at the client device 102 as identified in the corresponding beacon request.

In the illustrated example, the database proprietor 116 reports demographic impression data to the AME 114. To preserve the anonymity of its subscribers, the demographic impression data may be anonymous demographic impression data and/or aggregated demographic impression data. In the case of anonymous demographic impression data, the database proprietor 116 reports user-level demographic impression data (e.g., which is resolvable to individual subscribers), but with any personally identifiable information (PII) removed from or obfuscated (e.g., scrambled, hashed, encrypted, etc.) in the reported demographic impression data. For example, anonymous demographic impression data, if reported by the database proprietor 116 to the AME 114, may include respective demographic impression data for each device 102 from which a beacon request 108 was received, but with any personal identification information removed from or obfuscated in the reported demographic impression data. In the case of aggregated demographic impression data, individuals are grouped into different demographic classifications, and aggregate demographic data (e.g., which is not resolvable to individual subscribers) for the respective demographic classifications is reported to the AME 114. In some examples, the aggregated data is aggregated demographic impression data. In other examples, the database proprietor 116 is not provided with impression data that is resolvable to a particular media name (but may instead be given a code or the like that the AME 114 can map to the code) and the reported aggregated demographic data may thus not be mapped to impressions or may be mapped to the code(s) associated with the impressions.

Aggregate demographic data, if reported by the database proprietor 116 to the AME 114, may include first demographic data aggregated for devices 102 associated with demographic information belonging to a first demographic classification (e.g., a first age group, such as a group which includes ages less than 18 years old), second demographic data for devices 102 associated with demographic information belonging to a second demographic classification a second age group, such as a group which includes ages from 18 years old to 34 years old), etc.

As mentioned above, demographic information available for subscribers of the database proprietor 116 may be unreliable, or less reliable than the demographic information obtained for panel members registered by the AME 114. There are numerous social, psychological and/or online safety reasons why subscribers of the database proprietor 116 may inaccurately represent or even misrepresent their demographic information, such as age, gender, etc. Accordingly, one or more of the AME 114 and/or the database proprietor 116 determine sets of classification probabilities for respective individuals in the sample population for which demographic data is collected. A given set of classification probabilities represents likelihoods that a given individual in a sample population belongs to respective ones of a set of possible demographic classifications. For example, the set of classification probabilities determined for a given individual in a sample population may include a first probability that the individual belongs to a first one of possible demographic classifications (e.g., a first age classification, such as a first age group), a second probability that the individual belongs to a second one of the possible demographic classifications (e.g., a second age classification, such as a second age group), etc. In some examples, the AME 114 and/or the database proprietor 116 determine the sets of classification probabilities for individuals of a sample population by combining, with models, decision trees, etc., the individuals' demographic information with other available behavioral data that can be associated with the individuals to estimate, for each individual, the probabilities that the individual belongs to different possible demographic classifications in a set of possible demographic classifications. Example techniques for reporting demographic data from the database proprietor 116 to the AME 114, and for determining sets of classification probabilities representing likelihoods that individuals of a sample population belong to respective possible demographic classifications in a set of possible demographic classifications, are further disclosed in U.S. Patent Publication No. 2012/0072469 (Perez et al.) and U.S. patent application Ser. No. 14/604,394 (Sullivan et al.), which are incorporated herein by reference in their respective entireties.

In the illustrated example, one or both of the AME 114 and the database proprietor 116 include example audience data generators to determine ratings data from population sample data having incomplete demographic classifications in accordance with the teachings of this disclosure. For example, the AME 114 may include an example audience data generator 120a and/or the database proprietor 116 may include an example audience data generator 120b. As disclosed in further detail below, the audience data generator(s) 120a and/or 120b of the illustrated example process sets of classification probabilities determined by the AME 114 and/or the database proprietor 116 for monitored individuals of a sample population (e.g., corresponding to a population of individuals associated with the devices 102 from which beacon requests 108 were received) to estimate parameters characterizing population attributes (also referred to herein as population attribute parameters) associated with the set of possible demographic classifications.

In some examples, such as when the audience data generator 120b is implemented at the database proprietor 116, the sets of classification probabilities processed by the audience data generator 120b to estimate the population attribute parameters include personal identification information which permits the sets of classification probabilities to be associated with specific individuals. Associating the classification probabilities enables the audience data generator 120*b* to maintain consistent classifications for individuals over time, and the audience data generator 120*b* may scrub the PII from the impression information prior to reporting impressions based on the classification probabilities. In some examples, such as when the audience data generator 120*a* is implemented at the AME 114, the sets of classification probabilities processed by the audience data generator 120*a* to estimate the population attribute parameters are included in reported, anonymous demographic data and, thus, do not include PII. However, the sets of classification probabilities can still be associated with respective, but unknown, individuals using, for example, anonymous identifiers (e.g., hashed identifiers, scrambled identifiers, encrypted identifiers, etc.) included in the anonymous demographic data.

In some examples, such as when the audience data generator 120*a* is implemented at the AME 114, the sets of classification probabilities processed by the audience data generator 120*a* to estimate the population attribute parameters are included in reported, aggregate demographic impression data and, thus, do not include personal identification and are not associated with respective individuals but, instead, are associated with respective aggregated groups of individuals. For example, the sets of classification probabilities included in the aggregate demographic impression data may include a first set of classification probabilities representing likelihoods that a first aggregated group of individuals belongs to respective possible demographic classifications in a set of possible demographic classifications, a second set of classification probabilities representing likelihoods that a second aggregated group of individuals belongs to the respective possible demographic classifications in the set of possible demographic classifications, etc.

Using the estimated population attribute parameters, the audience data generator(s) 120*a* and/or 120*b* of the illustrated example determine ratings data for media, as disclosed in further detail below. For example, the audience data generator(s) 120*a* and/or 120*b* may process the estimated population attribute parameters to further estimate numbers of individuals across different demographic classifications who were exposed to given media, numbers of media impressions across different demographic classifications for the given media, accuracy metrics for the estimate number of individuals and/or numbers of media impressions, numbers of individuals that accessed media multiple times from same and/or different devices, etc.

Figure 2:
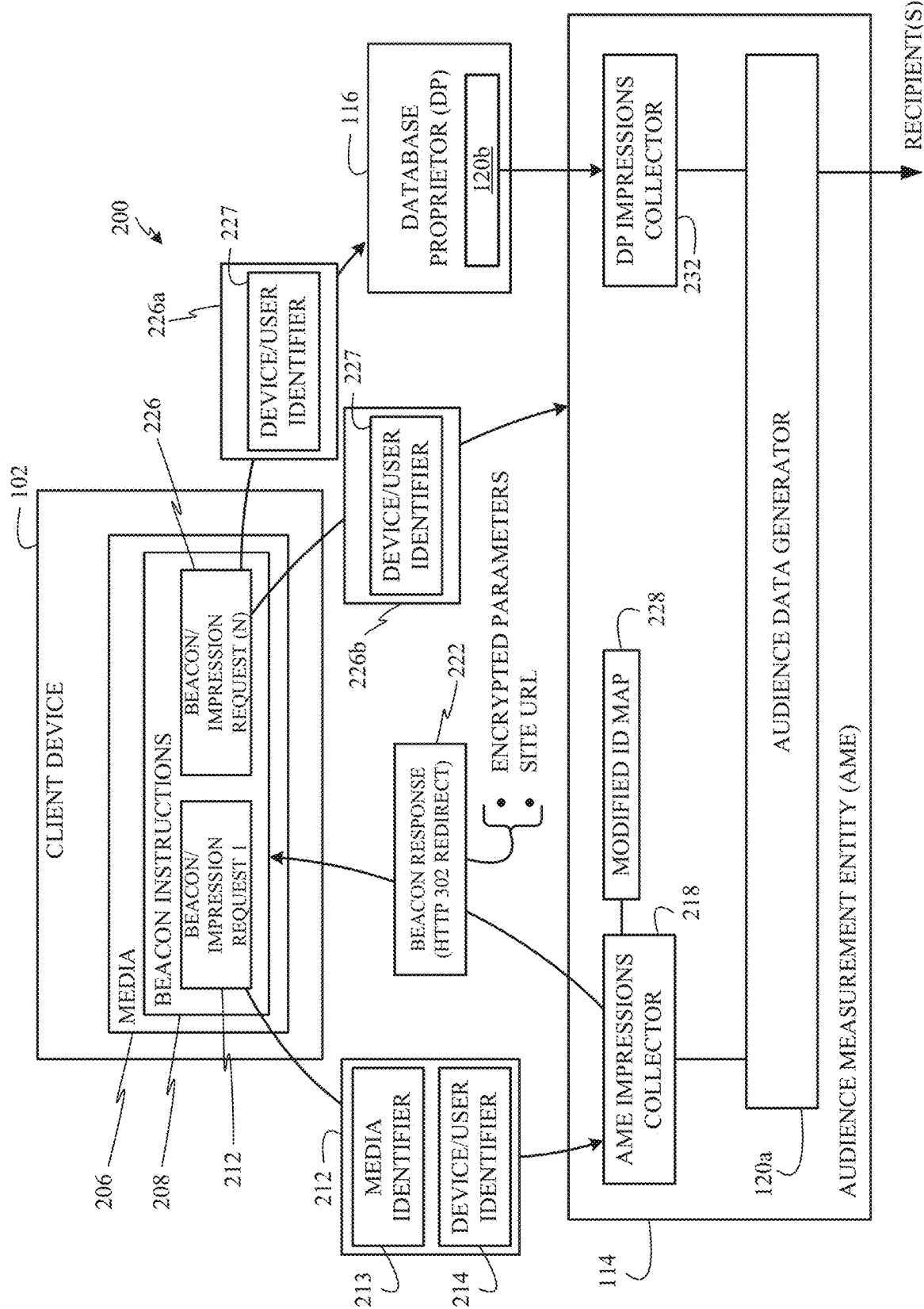
FIG. 2 is an example communication flow diagram illustrating an example manner in which an example audience measurement entity and an example database proprietor can collect impressions and demographic information associated with a client device, and can further determine ratings data from population sample data having incomplete demographic classifications in accordance with the teachings of this disclosure.

FIG. 2 is an example communication flow diagram 200 illustrating an example manner in which the AME 114 and the database proprietor 116 can cooperate to collect demographic impressions based on client devices 102 reporting impressions to the AME 114 and/or the database proprietor 116. FIG. 2 also shows the example audience data generators 120*a* and 120*b*, which are able to determine ratings data from population sample data having unreliable demographic classifications in accordance with the teachings of this disclosure. The example chain of events shown in FIG. 2 occurs when a client device 102 accesses media for which the client device 102 reports an impression to the AME 114 and/or the database proprietor 116. In some examples, the client device 102 reports impressions for accessed media based on instructions (e.g., beacon instructions) embedded in the media that instruct the client device 102 (e.g., that instruct a web browser or an app executing on the client device 102) to send beacon/impression requests (e.g., the beacon/impression requests 108 of FIG. 1) to the AME 114 and/or the database proprietor 116. In such examples, the media associated with the beacon instructions is referred to as tagged media. The beacon instructions are machine executable instructions (e.g., code, a script, etc.) which may be contained in the media (e.g., in the HTML of a web page) and/or referenced by the media (e.g., identified by a link in the media that causes the client to request the instructions).

Although the above examples operate based on monitoring instructions associated with media (e.g., a web page, a media file, etc.), in other examples, the client device 102 reports impressions for accessed media based on instructions associated with (e.g., embedded in) apps or web browsers that execute on the client device 102 to send beacon/impression requests (e.g., the beacon/impression requests 108 of FIG. 1) to the AME 114 and/or the database proprietor 116 for media accessed via those apps or web browsers. In such examples, the media itself need not be tagged media. In some examples, the beacon/impression requests (e.g., the beacon/impression requests 108 of FIG. 1) include device/user identifiers (e.g., AME IDs and/or DP IDs) as described further below to allow the corresponding AME 114 and/or the corresponding database proprietor 116 to associate demographic information with resulting logged impressions.

In the illustrated example, the client device 102 accesses tagged media 206 that is tagged with beacon instructions 208. The beacon instructions 208 cause the client device 102 to send a beacon/impression request 212 to an AME impressions collector 218 when the client device 102 accesses the media 206. For example, a web browser and/or app of the client device 102 executes the beacon instructions 208 in the media 206 which instruct the browser and/or app to generate and send the beacon/impression request 212. In the illustrated example, the client device 102 sends the beacon/impression request 212 using an HTTP (hypertext transfer protocol) request addressed to the URL (uniform resource locator) of the AME impressions collector 218 at, for example, a first Internet domain of the AME 114. The beacon/impression request 212 of the illustrated example includes a media identifier 213 identifying the media 206 (e.g., an identifier that can be used to identify content, an advertisement, content type (e.g., text, video, a combination of both text and video), and/or any other media). In some examples, the beacon/impression request 212 also includes a site identifier (e.g., a URL) of the website that served the media 206 to the client device 102 and/or a host website ID (e.g., www.acme.com) of the website that displays or presents the media 206. In the illustrated example, the beacon/impression request 212 includes a device/user identifier 214. In the illustrated example, the device/user identifier 214 that the client device 102 provides to the AME impressions collector 218 in the beacon impression request 212 is an AME ID because it corresponds to an identifier that the AME 114 uses to identify a panelist corresponding to the client device 102. In other examples, the client device 102 may not send the device/user identifier 214 until the client device 102 receives a request for the same from a server of the AME 114 in response to, for example, the AME impressions collector 218 receiving the beacon/impression request 212.

In some examples, the device/user identifier 214 may be a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 data store (where HTML is an abbreviation for hypertext markup language), and/or any other identifier that the AME 114 stores in association with demographic information about users of the client devices 102. In this manner, when the AME 114 receives the device/user identifier 214, the AME 114 can obtain demographic information corresponding to a user of the client device 102 based on the device/user identifier 214 that the AME 114 receives from the client device 102. In some examples, the device/user identifier 214 may be encrypted (e.g., hashed) at the client device 102 so that only an intended final recipient of the device/user identifier 214 can decrypt the hashed identifier 214. For example, if the device/user identifier 214 is a cookie that is set in the client device 102 by the AME 114, the device/user identifier 214 can be hashed so that only the AME 114 can decrypt the device/user identifier 214. If the device/user identifier 214 is an IMEI number, the client device 102 can hash the device/user identifier 214 so that only a wireless carrier (e.g., the database proprietor 116) can decrypt the hashed identifier 214 to recover the IMEI for use in accessing demographic information corresponding to the user of the client device 102. By hashing the device/user identifier 214, an intermediate party (e.g., an intermediate server or entity on the Internet) receiving the beacon request cannot directly identify a user of the client device 102.

In response to receiving the beacon/impression request 212, the AME impressions collector 218 logs an impression for the media 206 by storing the media identifier 213 contained in the beacon/impression request 212. In the illustrated example of FIG. 2, the AME impressions collector 218 also uses the device/user identifier 214 in the beacon/impression request 212 to identify AME panelist demographic information corresponding to a panelist of the client device 102. That is, the device/user identifier 214 matches a user ID of a panelist member (e.g., a panelist corresponding to a panelist profile maintained and/or stored by the AME 114). In this manner, the AME impressions collector 218 can associate the logged impression with demographic information of a panelist corresponding to the client device 102. In some examples, the AME impressions collector 218 determines (e.g., in accordance with the examples disclosed in U.S. Patent Publication No. 2012/0072469 to Perez et al. and/or U.S. patent application Ser. No. 14/604,394 to Sullivan et al.) a set of classification probabilities for the panelist to include in the demographic information associated with the logged impression. As described above and in further detail below, the set of classification probabilities represent likelihoods that the panelist belongs to respective ones of a set of possible demographic classifications (e.g., such as likelihoods that the panelist belongs to respective ones of a set of possible age groupings, etc.).

In some examples, the beacon request 212 is an impression message, or I beacon, which is a non-durational message that is transmitted by the client device 102 when the media 206 is loaded. In some examples, the beacon/impression request 212 may not include the device/user identifier 214 (e.g., if the user of the client device 102 is not an AME panelist). In such examples, the AME impressions collector 218 logs impressions regardless of whether the client device 102 provides the device/user identifier 214 in the beacon/impression request 212 (or in response to a request for the identifier 214). When the client device 102 does not provide the device/user identifier 214, the AME impressions collector 218 can still benefit from logging an impression for the media 206 even though it does not have corresponding demographics. For example, the AME 114 may still use the logged impression to generate a total impressions count and/or a frequency of impressions (e.g., an average number of impressions per unique audience member) for the media 206. Additionally or alternatively, the AME 114 may obtain demographics information from the database proprietor 116 for the logged impression if the client device 102 corresponds to a subscriber of the database proprietor 116.

In the illustrated example of FIG. 2, to compare or supplement panelist demographics (e.g., for accuracy or completeness) of the AME 114 with demographics from one or more database proprietors (e.g., the database proprietor 116), the AME impressions collector 218 returns a beacon response message 222 (e.g., a first beacon response) to the client device 102 including an HTTP "302 Found" re-direct message and a URL of a participating database proprietor 116 at, for example, a second Internet domain different than the Internet domain of the AME 114. In the illustrated example, the HTTP "302 Found" re-direct message in the beacon response 222 instructs the client device 102 to send a second beacon request 226 to the database proprietor 116. In other examples, instead of using an HTTP "302 Found" re-direct message, redirects may be implemented using, for example, an iframe source instruction (e.g., <iframe src=" ">) or any other instruction that can instruct a client device to send a subsequent beacon request (e.g., the second beacon request 226) to a participating database proprietor 116. In the illustrated example, the AME impressions collector 218 determines the database proprietor 116 specified in the beacon response 222 using a rule and/or any other suitable type of selection criteria or process. In some examples, the AME impressions collector 218 determines a particular database proprietor to which to redirect a beacon request based on, for example, empirical data indicative of which database proprietor is most likely to have demographic data for a user corresponding to the device/user identifier 214. In some examples, the beacon instructions 208 include a predefined URL of one or more database proprietors to which the client device 102 should send follow up beacon requests 226. In other examples, the same database proprietor is always identified in the first redirect message (e.g., the beacon response 222).

In the illustrated example of FIG. 2, the beacon/impression request 226 may include a device/user identifier 227 that is a DP ID because it is used by the database proprietor 116 to identify a subscriber of the client device 102 when logging an impression. In some instances (e.g., in which the database proprietor 116 has not yet set a DP ID in the client device 102), the beacon/impression request 226 does not include the device/user identifier 227. In some examples, the DP ID is not sent until the database proprietor 116 requests the same (e.g., in response to the beacon/impression request 226). In some examples, the device/user identifier 227 is a device identifier (e.g., an IMEI), an MEID, a MAC address, etc.), a web browser unique identifier (e.g., a cookie), a user identifier (e.g., a user name, a login ID, etc.), an Adobe Flash® client identifier, identification information stored in an HTML5 data store, and/or any other identifier that the database proprietor 116 stores in association with demographic information about subscribers corresponding to the client devices 102. In some examples, the device/user identifier 227 may be encrypted (e.g., hashed) at the client device 102 so that only an intended final recipient of the device/user identifier 227 can decrypt the hashed identifier 227. For example, if the device/user identifier 227 is a cookie that is set in the client device 102 by the database proprietor 116, the device/user identifier 227 can be hashed so that only the database proprietor 116 can decrypt the device/user identifier 227. If the device/user identifier 227 is an IMEI number, the client device 102 can hash the device/user identifier 227 so that only a wireless carrier (e.g., the database proprietor 116) can decrypt the hashed identifier 227 to recover the IMEI for use in accessing demographic information corresponding to the user of the client device 102. By hashing the device/user identifier 227, an intermediate party (e.g., an intermediate server or entity on the Internet) receiving the beacon request cannot directly identify a user of the client device 102. For example, if the intended final recipient of the device/user identifier 227 is the database proprietor 116, the AME 114 cannot recover identifier information when the device/user identifier 227 is hashed by the client device 102 for decrypting only by the intended database proprietor 116.

In the example of FIG. 2, the beacon instructions 208 cause the client device 102 to transmit multiple second beacon requests 226a, 226b to the database proprietor 116 and to the AME 114. The example second beacon requests 226a, 226b may take the form of duration (e.g., indicative of video content) messages (e.g., referred to herein as D beacons or D pings).

In the example of FIG. 2, D beacons are beacon requests 226a, 226b that contain duration information that identify portions of the media 206 (e.g., video content) that has been presented at the client device 102. For example, the D beacons may use the format "D_s_abcde," where s denotes a time segment of the media 206 (e.g., an episode of a program distributed by a distributor (e.g., a network affiliate distributor)) being presented at the client device 102. The s term can vary between 1 and n, with n being the last segment of the media 206. In the D beacon format D_s_abcde, the terms a, b, c, d, and e refer to respective ones of 1st, 2nd, 3rd, 4th, and 5th sub-segments (e.g., minutes) of a segment. A value 0 in any of the terms a, b, c, d, e indicates that the corresponding sub-segment (e.g., the corresponding minute) was not presented and the value 1 indicates that the corresponding sub-segment (e.g., the corresponding minute) was presented. Thus, a D beacon of D_2_01010 indicates that, of a second time segment of the media 206 (of n time segments making up the media 206), the 2nd and 4th sub-segments were presented while the 1st, 3rd, and 5th sub-segments were not presented. In the example of FIG. 2, the client device 102 sends the D beacons at the conclusion of designated time segments (e.g., after the 5th minute of a time segment is viewed) and/or at designated time intervals during presentation of the media (e.g., every z minutes. Where z sub-segments are represented per D beacon). As used herein, a "time segment" may refer to the larger segments represented by one D beacon (e.g., super-segments) and/or to a sub-segment (e.g., a minute) that is a component of the larger segment.

When the database proprietor 116 receives the device/user identifier 227, the database proprietor 116 can obtain demographic information corresponding to a user of the client device 102 based on the device/user identifier 227 that the database proprietor 116 receives from the client device 102. In some examples, the database proprietor 116 determines (e.g., in accordance with the examples disclosed in U.S. Patent Publication No. 2012/0072469 to Perez et al. and/or U.S. patent application Ser. No. 14/604,394 to Sullivan et al.) a set of classification probabilities associated with the user of the client device 102 to include in the demographic information associated with this user. As described above and in further detail below, the set of classification probabilities represent likelihoods that the user belongs to respective ones of a set of possible demographic classifications (e.g., likelihoods that the panelist belongs to respective ones of a set of possible age groupings, etc.).

Although only a single database proprietor 116 is shown in FIGS. 1 and 2, the impression reporting/collection process of FIGS. 1 and 2 may be implemented using multiple database proprietors. In some such examples, the beacon instructions 208 cause the client device 102 to send beacon/impression requests 226 to numerous database proprietors. For example, the beacon instructions 208 may cause the client device 102 to send the beacon/impression requests 226 to the numerous database proprietors in parallel or in daisy chain fashion. In some such examples, the beacon instructions 208 cause the client device 102 to stop sending beacon/impression requests 226 to database proprietors once a database proprietor has recognized the client device 102. In other examples, the beacon instructions 208 cause the client device 102 to send beacon/impression requests 226 to database proprietors so that multiple database proprietors can recognize the client device 102 and log a corresponding impression. Thus, in some examples, multiple database proprietors are provided the opportunity to log impressions and provide corresponding demographics information if the user of the client device 102 is a subscriber of services of those database proprietors.

In some examples, prior to sending the beacon response 222 to the client device 102, the AME impressions collector 218 replaces site IDs (e.g., URLs) of media provider(s) that served the media 206 with modified site IDs (e.g., substitute site IDs) which are discernable only by the AME 114 to identify the media provider(s). In some examples, the AME impressions collector 218 may also replace a host website ID (e.g., www.acme.com) with a modified host site ID (e.g., a substitute host site ID) which is discernable only by the AME 114 as corresponding to the host website via which the media 206 is presented. In some examples, the AME impressions collector 218 also replaces the media identifier 213 with a modified media identifier 213 corresponding to the media 206. In this way, the media provider of the media 206, the host website that presents the media 206, and/or the media identifier 213 are obscured from the database proprietor 116, but the database proprietor 116 can still log impressions based on the modified values (e.g., if such modified values are included in the beacon request 226), which can later be deciphered by the AME 114 after the AME 114 receives logged impressions from the database proprietor 116. In some examples, the AME impressions collector 218 does not send site IDs, host site IDS, the media identifier 213 or modified versions thereof in the beacon response 222. In such examples, the client device 102 provides the original, non-modified versions of the media identifier 213, site IDs, host IDs, etc. to the database proprietor 116.

In the illustrated example, the AME impression collector 218 maintains a modified ID mapping table 228 that maps original site IDs with modified (or substitute) site IDs, original host site IDs with modified host site IDs, and/or maps modified media identifiers to the media identifiers such as the media identifier 213 to obfuscate or hide such information from database proprietors such as the database proprietor 116. Also in the illustrated example, the AME impressions collector 218 encrypts all of the information received in the beacon/impression request 212 and the modified information to prevent any intercepting parties from decoding the information. The AME impressions collector 218 of the illustrated example sends the encrypted information in the beacon response 222 to the client device 102 so that the client device 102 can send the encrypted information to the database proprietor 116 in the beacon/impression request 226. In the illustrated example, the AME impressions collector 218 uses an encryption that can be decrypted by the database proprietor 116 site specified in the HTTP "302 Found" re-direct message.

Periodically or aperiodically, the impression data collected by the database proprietor 116 is provided to a DP impressions collector 232 of the AME 114 as, for example, batch data. In some examples, the impression data collected from the database proprietor 116 by the DP impressions collector 232 is demographic impression data, which includes sets of classification probabilities for individuals of a sample population associated with client devices 102 from which beacon requests 226 were received. In some examples, the sets of classification probabilities included in the demographic impression data collected by the DP impressions collector 232 correspond to respective ones of the individuals in the sample population, and may include personal identification capable of identifying the individuals, or may include obfuscated identification information to preserve the anonymity of individuals who are subscribers of the database proprietor but not panelists of the AME 114. In some examples, the sets of classification probabilities included in the demographic impression data collected by the DP impressions collector 232 correspond to aggregated groups of individuals, which also preserves the anonymity of individuals who are subscribers of the database proprietor.

Additional examples that may be used to implement the beacon instruction processes of FIG. 2 are disclosed in U.S. Pat. No. 8,370,489 to Mainak et al. In addition, other examples that may be used to implement such beacon instructions are disclosed in U.S. Pat. No. 6,108,637 to Blumenau.

In the example of FIG. 2, the AME 114 includes the example audience data generator 120a of FIG. 1 to determine ratings data (e.g., ratings information) using the sets of classification probabilities determined by the AME impressions collector 218 and/or obtained by the DP impressions collector 232. Additionally or alternatively, in the example of FIG. 2, the database proprietor 116 includes the example audience data generator 120b of FIG. 1 to determine media ratings data using the sets of classification probabilities determined by the database proprietor 116. A block diagram of an example audience data generator 120, which may be used to implement one or both of the example audience data generators 120a and/or 120b, is illustrated in FIG. 3.

Figure 3:
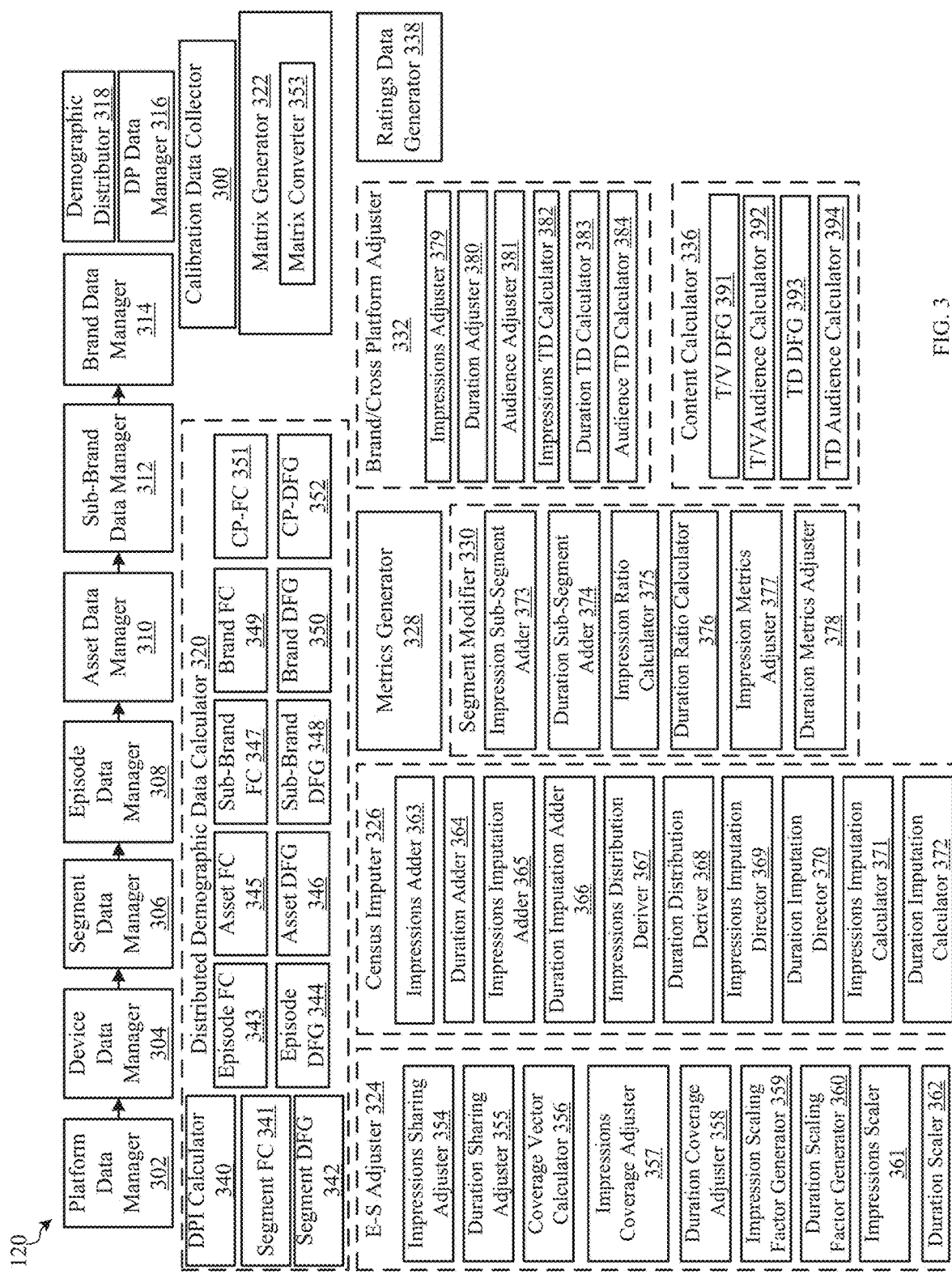
FIG. 3 is a block diagram of an example implementation of the audience data generator of FIGS. 1 and/or 2.

The example audience data generator 120 of FIG. 3 receives impression information from the AME impressions collector 218. Example impression information includes the impression requests 212 and/or the beacon requests 226b. The AME impressions collector 218 collects and tracks the requests 212, 226b, as well as the devices 102 from which the requests 212, 226b are received.

The example audience data generator 120 further receives demographic information corresponding to impressions received by the DP 116. In some examples, the impressions received at the DP 116 correspond at least in part to the requests 212, 226b received at the AME impressions collector 218. The example DP 116 attempts to determine demographic information for the impressions (e.g., the beacon requests 226a), and provides numbers of impressions, numbers of duration units (e.g., minutes, seconds, etc.), and/or numbers of audience members to the AME 114.

In examples disclosed herein, the audience data generator 120 receives aggregated data files containing aggregated numbers of impressions, aggregated numbers of duration units, and aggregated counts of unique audience members organized by groups (e.g., levels of detail) from the DP 116. In examples disclosed herein, the aggregated data files are organized by platform (e.g., computing platform). For example, the DP 116 attributes the aggregated data files to a mobile computing platform or a non-mobile computing platform. As such, the aggregated data files may indicate whether an audience accessed the media 206 of FIG. 2 via a mobile computing platform (e.g., through a mobile device such as a smartphone, a tablet, a portable media player (PMP), etc.) or via a non-mobile computing platform (e.g., through a desktop computer). In some examples, the DP 116 may identify ones of the aggregated data files attributed to both the mobile computing platform and the non-mobile computing platform as duplicate data files and attribute the duplicate data files to a total digital computing platform. As such, the aggregated data files are organized by mobile computing platform, non-mobile computing platform, and/or total digital computing platform.

In examples disclosed herein, the aggregated data files are further organized by brand. As used herein, a brand refers to a network affiliate (e.g., a broadcaster, streaming entity, or media provider owned by a company other than an owner of a network by which media is delivered). For example, the DP 116 may attribute first ones of the aggregated data files to a first brand, or a first network affiliate (e.g., the American Broadcast Company (ABC)), second ones of the aggregated data files to a second brand, or a second network affiliate (e.g., the FOX Broadcasting Company), etc. In examples disclosed herein, the aggregated data files are further organized by sub-brand. As used herein, sub-brand refers to network affiliate distributors (e.g., an asset, a subsidiary, or a division of a network affiliate distributing specified services and media). For example, the DP 116 may attribute certain ones of the aggregated data files to a first sub-brand, or a first network affiliate distributor (e.g., CBS Television), a second sub-brand, or a second network affiliate distributor (e.g., CBS Sports), a third sub-brand, or a third network affiliate distributor (e.g., Hulu), etc. In examples disclosed herein, a network affiliate may grant permissions to certain ones of network affiliate distributors to allow the certain ones of the network affiliate distributors to provide certain programs and/or episodes to an audience.

In the example of FIG. 3, the audience data generator 120 receives the aggregated data files from the DP 116 organized by: Platform×Device×Brand×Corrected Age×Gender (e.g., platform and device specific brand-level (e.g., network affiliate level) aggregation by age and gender, such as "Platform 1, Device 1, Brand 1, Male, ages 18-24" and "Platform 1, Device 1, Brand 2, Male, ages 25-30"); Platform×Device×Brand×Sub-Brand×Corrected Age×Gender (e.g., platform and device specific sub-brand-level (e.g., network affiliate distributor level) aggregation by age and gender, such as "Platform 1, Device 1, Brand 1, Sub-Brand 1, Male, ages 18-24" and "Platform 1, Device 1, Brand 1, Sub-Brand 2, Male, ages 25-30"); Platform×Device×Brand× Sub-Brand×Asset×Corrected Age×Gender (e.g., platform and device specific asset-level (e.g., program level) aggregation by age and gender, such as "Platform 1, Device 1, Brand 1, Sub-brand 1, Asset 1, Male, ages 18-24" and "Platform 1, Device 1, Brand 1, Sub-brand 1, Asset 2, Male, ages 25-30"); Platform×Brand×Sub-Brand×Asset×Episode×Corrected Age×Gender (e.g., episode-level aggregation by platform, age, and gender, such as "Platform 1, Brand 1, Sub-Brand 1, Asset 1, Episode 1, Male, ages 18-24" and "Platform 1, Brand 1, Sub-brand 1, Asset 1, Episode 2, Male, ages 18-24"); Platform×Brand×Sub-Brand×Asset×Segment×Corrected Age×Gender (e.g., time segment-level aggregation by age and gender, such as "Platform 1, Brand 1, Sub-Brand 1, Asset 1, Minute 1 (or Minutes 1-5), Male, ages 18-24" and "Platform 1, Brand 1, Sub-Brand 1, Asset 1, Minute 5 (or Minutes 6-10). Male, ages 18-24"), Platform×Brand×Segment×Corrected Age×Gender (e.g., time segment-level aggregation by age and gender, such as "Platform 1, Brand 1, Minute 1 (Or Minutes 1-5), male, ages 18-24" and "Platform 1, Brand 1, Minute 5 (or Minutes 6-10), Male, ages 18-24").

The audience data generator 120 also receives aggregated data files containing aggregated numbers of impressions, aggregated numbers of duration units, and aggregated counts of unique audience members organized by groups (e.g., levels of detail) observed at a monitored website (e.g., web site census counts): Platform×Device×Brand (e.g., platform and device specific brand-level (e.g., network affiliate level) aggregation, such as "Platform 1, Device 1, Brand 1" and "Platform 1, Device 1, Brand 2"); Platform×Device×Brand×Sub-Brand (e.g., platform and device specific sub-brand-level (e.g., network affiliate distributor level) aggregation, such as "Platform 1, Device 1, Brand 1, Sub-Brand 1" and "Platform 1, Device 1, Brand 1, Sub-Brand 2"); Platform×Device×Brand×Sub-Brand×Asset (e.g., platform and device specific asset-level (e.g., program level)) aggregation, such as "Platform 1, Device 1, Brand 1, Sub-Brand 1, Asset 1" and "Platform 1, Device 1, Brand 1, Sub-Brand 1, Asset 2"); Platform×Brand×Sub-Brand×Asset×Episode (e.g., episode-level aggregation, such as "Platform 1, Brand 1, Sub-Brand 1, Asset 1, Episode 1" and "Platform 1, Brand 1, Sub-brand 1, Asset 1, Episode 2)"; Platform×Brand×Sub-Brand×Asset×Segment (e.g., time segment-level aggregation by age and gender, such as "Platform 1, Brand 1, Sub-Brand 1, Asset 1, Minute 1 (or Minutes 1-5)" and "Platform 1, brand 1, Sub-Brand 1, Asset 1, Minute 5 (Or Minutes 6-10))"

The example audience data generator 120 includes an example calibration data collector 300. The example calibration data collector 300 collects or obtains survey calibration data describing platform and device usage statistics of an audience. For example, the survey calibration data may include and/or be based on responses to a survey (e.g., a probability survey) of households selected at random. In some examples, a calibration survey obtains information including the demographic characteristics of a panel member (e.g., age and gender, race, ethnicity, language characteristics, household income, geographic location, etc.), the numbers and/or types of devices (e.g., smartphones, tablet computers, portable media players, desktop computer, etc.) used by a panel member, and/or registrations of panel members with specified database proprietors (e.g., DP 116 of FIG. 1). In some examples, the calibration survey obtains, for each panel member of a survey panel, usage characteristics of each of the devices and/or types of devices; programs and episodes typically viewed by the panel member; programs and episodes typically viewed by the panel member on each device and/or type of device; apps used by the panel member on each device and/or type of device; and/or characteristics of interactions with specified database proprietors on each device and/or type of device. The example calibration data collector 300 obtains the survey calibration data from at least a threshold number of households and, if appropriate, weights the results to be reflective of a general population or audience.

In some other examples, the survey calibration data source includes a survey of established panel(s) of respondents, such as the Nielsen National People Meter (NPM) panel for television ratings. Surveys of established panels often provide higher quality survey calibration data.

The example audience data generator 120 includes an example platform data manager 302, an example device data manager 304, an example segment data manager 306, an example episode data manager 308, an asset data manager 310, a sub-brand data manager 312, and a brand data manager 314. The example platform data manager 302, the example device data manager 304, the example segment data manager 306, the example episode data manager 308, the example asset data manager 310, the example sub-brand data manager 312, and the example brand data manager 314 each manage the aggregated demographic information received from the DP 116 and/or from the AME impressions collector 218 for the respective data levels.

The example audience data generator 120 of FIG. 3 further includes an example DP data manager 316. The example DP data manager 316 collects, stores, and provides the demographic information (e.g., raw impressions, duration units, and/or audience data per demographic group and/or data level) obtained from the DP 116. While the platform data manager 302, the device data manager 304, the segment data manager 306, the episode data manager 308, the asset data manager 310, the sub-brand data manager 312, and the brand data manager 314 manage the correction and/or calibration of demographic information obtained from the DP 116 at the respective levels, the example DP data manager 316 manages the raw demographic information obtained from the DP 116 for use in the correction and/or calibration of the demographic information.

The example audience data generator 120 also includes an example demographic distributor 318, an example distributed demographic data calculator 320, an example matrix generator 322, an example episode-segment (E-S) adjuster 324, an example census imputer 326, an example metrics generator 328, an example segment modifier 330, an example brand/cross-platform adjuster 332, an example content calculator 336, and an example ratings data generator 338. The example platform data manager 302, the example device data manager 304, the example segment data manager 306, the example episode data manager 308, the example asset data manager 310, the example sub-brand data manager 312, and/or the example brand data manager 314 may communicate with or notify the example demographic distributor 318, the example distributed demographic data calculator 320, the example matrix generator 322, the example episode-segment (E-S) adjuster 324, the example census imputer 326, the example metrics generator 328, the example segment modifier 330, the example brand/cross-platform adjuster 332, the example content calculator 336, and the example ratings data generator 338 to correct and/or calibrate the DP demographic information and/or to generate ratings information for online media.

The example demographic distributor 318 of FIG. 3 may receive communications, notifications, requests, signals, etc. from the platform data manager 302, the device data manager 304, the segment data manager 306, the episode data manager 308, the asset data manager 310, the sub-brand data manager 312, and/or the brand data manager 314 to distribute impressions, duration units and/or audience members into demographic groups (e.g., demographic groups defined by the AME 114 and/or another entity, demographic groups corresponding to an audience measurement system such as television ratings, etc.). For example, all or a portion of impression information received from the DP 116 may have incomplete demographic information (e.g., undetermined age and/or gender information). As described in more detail below, the example demographic distributor 318 determines distributions of impressions, duration units, and/or audience members by demographic groups, and then distributes any impressions, duration units, and/or audience members for which a demographic group is unknown into the demographic groups based on the determined distribution. In examples disclosed herein, the demographic distributor 318 may send distributed (e.g., redistributed) impressions, duration units, and/or audience counts to the distributed demographic data calculator 320 and/or the content calculator 336. Example implementations of the demographic distributor 318 are described below in connection with FIG. 5.

The example distributed demographic data calculator 320 of FIG. 3 receives redistributed impressions, duration units, and/or audience counts from the demographic distributor 318 and calculates raw measures for the demographic groups. The distributed demographic data calculator 320 includes an example duration-per-impression (DPI) calculator 340, an example segment frequency calculator (FC) 341, an example segment deduplication factor generator (DFG) 342, an example episode frequency calculator (FC) 343, an example episode deduplication factor generator (DFG) 344, an example asset frequency calculator (FC) 345, an example asset deduplication factor generator (DFG) 346, an example sub-brand frequency calculator (FC) 347, an example sub-brand deduplication factor generator (DFG) 348, an example brand frequency calculator (FC) 349, an example brand deduplication factor generator (DFG) 350, an example cross-publisher frequency calculator (CP-FC) 351, and an example cross-publisher deduplication factor generator (CP-DFG) 352. Example implementations of the distributed demographic data calculator 320 are described below in connection with FIGS. 6 and 7.

The DPI calculator 340 calculates a duration-per-impression (DPI) measure for each demographic group using redistributed impressions and redistributed audience counts at the time segment-level.

The segment FC 341 calculates an impression frequency per audience member, also referred to herein as a frequency, for each demographic group using the redistributed impressions and the redistributed audience counts at the time segment-level.

The segment DFG 342 calculates a ratio of duplicated audience counts to total audience counts across all platforms y, referred to herein as a deduplication factor, for each demographic group using the redistributed audience counts at the time segment-level.

The episode FC 343 calculates a frequency for each demographic group using the redistributed impressions and the redistributed audience counts at the episode-level.

The episode DFG 344 calculates a deduplication factor for each demographic group using the redistributed audience counts at the episode-level.

The asset FC 345 calculates a frequency for each demographic group using the redistributed impressions and the redistributed audience counts at the asset-level.

The asset DFG 346 calculates a deduplication factor for each demographic group using the redistributed audience counts at the asset-level.

The sub-brand FC 347 calculates a frequency for each demographic group using the redistributed impressions and the redistributed audience counts at the sub-brand level.

The sub-brand DFG 348 calculates a deduplication factor for each demographic group using the redistributed audience counts at the sub-brand level.

The brand FC 349 calculates a frequency for each demographic group using the redistributed impressions and the redistributed audience counts at the brand-level.

The brand DFG 350 calculates a deduplication factor for each demographic group using the redistributed audience counts at the brand-level.

The CP-FC 351 calculates a frequency for each demographic group using the redistributed audience counts at a cross-publisher level. As described in more detail below, the demographic distributor 318 determines a distribution of impression information (e.g., impressions, duration units, and/or audience counts) at the time segment-level and sums the distributed impression information at the time segment-level, respectively, across all brands b to generate impression information distributed at the cross-publisher level.

The CP-DFG 352 calculates a deduplication factor for each demographic group using the redistributed audience counts at the cross-publisher level.

The example matrix generator 322 generates and/or calculates misattribution correction matrices based on the survey calibration data. In examples disclosed herein, the matrix generator 322 creates a misattribution correction matrix for each combination of device type x and brand b. The matrix generator 322 receives survey calibration data from the calibration data collector 300 and calculates probabilities that: (1) a person of a recognized demographic group i is identified by the database proprietor 116 as a viewer of media, and (2) a person in an actual viewer demographic group j is an actual viewer, which is configured using the survey calibration data. Additional examples that may be used to implement the misattribution correction matrix generation process are disclosed in U.S. Patent Publication No. 2015/0262207 to Rao et al. The example matrix generator 322 includes an example matrix converter 353.

The example matrix converter 353 converts the misattribution correction matrices to impression counts matrices. In examples disclosed herein, the matrix converter 353 utilizes a conversion formula to convert a probability of each cell in the misattribution correction matrices to an impressions count probability. In examples disclosed herein, the impression counts matrices are used to correct and/or calibrate impression information and to generate ratings information. Example implementations of the matrix converter 353 are described below in connection with FIG. 9.

The example E-S adjuster 324 adjusts impression counts and durations at the episode-level and the time-segment level. In examples disclosed herein, the example E-S adjuster 324 receives, from the demographic distributor 318, and applies redistributed impression counts and redistributed durations at the episode-level and the time-segment level, respectively, to a corresponding impression counts matrix to generate misattribution adjusted impression counts and misattribution adjusted durations to compensate for device sharing. The E-S adjuster 324 compensates for database proprietor non-coverage error by applying coverage vectors to the misattribution impression counts and durations to generate coverage adjusted impression and durations. As used herein, coverage vectors reflect portions of impressions and/or durations attributable to persons by the database proprietor 116. In examples disclosed herein, the E-S adjuster 324 scales the coverage adjusted impression counts and durations by applying scaling factors. The E-S adjuster 324 includes an impressions sharing adjuster 354, a duration sharing adjuster 355, a coverage vector calculator 356, an impressions coverage adjuster 357, a duration coverage adjuster 358, an impression scaling factor generator 359, a duration scaling factor generator 360, an impressions scaler 361, and a duration scaler 362. Example implementations of the E-S adjuster 324 are described below in connection with FIG. 17.

The impressions sharing adjuster 354 receives impression counts matrices from the matrix converter 353 and redistributed impressions from the demographic distributor 318. In examples disclosed herein, the impressions sharing adjuster 354 multiplies, for each demographic group at the episode-level and the time-segment level, respectively, the redistributed impressions by a corresponding impression counts matrix to determine misattribution adjusted impressions.

The duration sharing adjuster 355 receives impression counts matrices from the matrix converter 353 and redistributed durations from the demographic distributor 318. In examples disclosed herein, the duration sharing adjuster 355 multiplies, for each demographic group at the episode-level and the time-segment level, respectively, the redistributed durations by the corresponding impression counts matrix to determine misattribution adjusted durations.

The coverage vector calculator 356 calculates coverage adjustment vectors for each brand b and device type x. In examples disclosed herein, the coverage vector calculator 356 receives survey calibration data from the calibration data collector 300 and determines a number or portion of persons (e.g., respondents to a survey) in a demographic group that indicate they would be recognized by the database proprietor 116 when using a particular device type x, as a proportion of the persons in the demographic group that own and have access to that particular device type x. The coverage vector calculator 356 calculates coverage adjustment vectors by determining a total number of respondents in a demographic group with access to a device of the device type x and dividing by a covered portion of respondents in the demographic group for the device type x based on the survey calibration data.

The impressions coverage adjuster 357 receives the misattribution adjusted impressions from the impressions sharing adjuster 354 and the coverage vectors from the coverage vector calculator 356. In examples disclosed herein, the impressions coverage adjuster 357 multiplies, for each demographic group at the episode-level and the time-segment level, respectively, the misattribution adjusted impressions by a corresponding coverage vector to generate coverage adjusted impression counts.

The duration coverage adjuster 358 receives the misattribution adjusted durations from the duration sharing adjuster 355 and the coverage vectors from the coverage vector calculator 356. In examples disclosed herein, the duration coverage adjuster 358 multiplies, for each demographic group at the episode-level and the time-segment level, respectively, the misattribution adjusted durations by the corresponding coverage vector to generate coverage adjusted durations.

The impression scaling factor generator 359 obtains and/or receives the aggregated numbers of impressions from the monitored website (e.g., the web site census counts) at the episode-level and the time-segment level, respectively. In examples disclosed herein, the impression scaling factor generator 359 determines impression scaling factors for each demographic group, at the episode-level and the time-segment level, respectively, by dividing the aggregated numbers of impressions by a sum of the coverage adjusted impressions across all demographic groups d.

The duration scaling factor generator 360 obtains and/or receives the aggregated numbers of duration units from the monitored website (e.g., the web site census counts) at the episode-level and the time-segment level, respectively. In examples disclosed herein, the duration scaling factor generator 360 determines duration scaling factors for each demographic group, at the episode-level and the time-segment level, respectively, by dividing the aggregated numbers of duration units by a sum of the coverage adjusted durations across all demographic groups d.

The impressions scaler 361 receives the impression scaling factors from the impression scaling factor generator 359 and multiplies, for each demographic group at the episode-level and the time-segment level, respectively, the coverage adjusted impressions by a corresponding impression scaling factor to generate scaled impressions.

The duration scaler 362 receives the duration scaling factors from the duration scaling factor generator 360 and multiplies, for each demographic group at the episode-level and the time-segment level, respectively, the coverage adjusted durations by a corresponding duration scaling factor to generate scaled durations.

The census imputer 326 further adjusts impression counts and durations at the asset-level, the episode-level, and the time-segment level. In examples disclosed herein, the census imputer 326 receives scaled impressions and durations from the E-S adjuster 324 and distributes the scaled impressions and durations at the asset-level. The census imputer 326 receives, from the monitored website, and imputes the aggregated numbers of impressions and the aggregated numbers of duration units. In examples disclosed herein the census imputer 326 calculates scaled and adjusted impressions and durations based on the imputation. The census imputer 326 includes an example impressions adder 363, an example duration adder 364, an example impressions imputation adder 365, an example duration imputation adder 366, an example impressions distribution deriver 367, an example duration distribution deriver 368, an example impressions imputation director 369, an example duration imputation director 370, an example impressions imputation calculator 371, and an example duration imputation calculator 372. Example implementations of the census imputer 326 are described below in connection with FIG. 11.

The impressions adder 363 receives the scaled impressions at the episode-level and the time-segment level, respectively, from the E-S adjuster 324 and sums, for each demographic group, the scaled impressions across all episodes e and time-segments i, respectively, to generate asset-level adjusted impressions.

The duration adder 363 receives the scaled durations at the episode-level and the time-segment level, respectively, from the E-S adjuster 324 and sums, for each demographic group, the scaled durations across all episode e and time-segments i, respectively, to generate asset-level adjusted durations.

The impressions imputation adder 365 receives the asset-level adjusted impressions from the impressions adder 363 and determines sums of the asset-level adjusted impressions across all demographic groups d.

The duration imputation adder 366 receives the asset-level adjusted durations from the duration adder 363 and determines sums of the asset-level adjusted durations across all of the demographic groups d.

The impressions distribution deriver 367 receives the asset-level adjusted impressions from the impressions adder 363 and the sums of the asset-level adjusted impressions across all demographic groups d from the impressions imputation adder 365. In examples disclosed herein, the impressions distribution deriver 367 determines a ratio, for each demographic group d at the episode-level e and the time-segment level i, respectively, of the asset-level adjusted impressions to the sum of the asset-level adjusted impressions across all demographic groups d to generate adjusted impression demographic distributions.

The duration distribution deriver 368 receives the asset-level adjusted durations from the duration adder 364 and the sums of the asset-level adjusted durations across all demographic groups d from the duration imputation adder 366. In examples disclosed herein, the duration distribution deriver 368 determines a ratio, for each demographic group d at the episode-level e and the time-segment level i, respectively, of the asset-level adjusted durations to the sum of the asset-level adjusted durations across all demographic groups d to generate adjusted duration demographic distributions.

The impressions imputation director 369 obtains site census impressions (e.g., the aggregated numbers of impressions received from the monitored website) and determines whether, at the episode-level e and the time-segment level i, respectively, the site census impressions are logged and the impressions from the database proprietor 116 are not logged. In examples disclosed herein, the impressions imputation director 369 imputes the site census impressions by applying, for each demographic group d at the episode-level e and the time-segment level i, respectively, the adjusted impression demographic distributions to the site census impressions to generate imputed impressions.

The duration imputation director 370 obtains site census durations (e.g., the aggregated numbers of duration units from the monitored website) and determines whether, at the episode level e and the time-segment level i, respectively, the site census durations are logged and the durations from the database proprietor are not logged. In examples disclosed herein, the duration imputation director 370 imputes the site census durations by applying, for each demographic group d at the episode-level e and the time-segment level i, respectively, the adjusted duration demographic distributions to the site census durations to generate imputed durations.

The impressions imputation calculator 371 receives the imputed impressions from the impressions imputation director 369 and the scaled impressions from the E-S adjuster 324 and determines adjusted and scaled impressions by adding, for each demographic group d at the episode-level e and the segment level i, respectively, the imputed impressions to the scaled impressions.

The duration imputation calculator 372 receives the imputed durations from the duration imputation director 370 and the scaled durations from the E-S adjuster 324 and determines adjusted and scaled durations by adding, for each demographic group d at the episode-level e and the segment level i, respectively, the imputed durations to the scaled durations.

The metrics generator 328 estimates impression information counts (e.g., estimated impression counts, estimated durations, and estimated audience counts), for each combination of demographic group d and platform y, at the time-segment level i, the episode-level e, the asset-level p, the sub-brand level s, and the brand-level b. In examples disclosed herein, the metrics generator 328 receives adjusted and scaled impressions and durations from the census imputer 326. The metrics generator 328 also receives frequencies and deduplication factors from the distributed demographic data calculator 320. In examples disclosed herein, estimated impression counts, referred to herein as time-segment level estimates (e.g., time-segment level impression estimates, time-segment level duration estimates, and time-segment level audience estimates), are generated at the time-segment level i by the metrics generator 328 and estimated impression counts, referred to herein as episode-level estimates (e.g., episode-level impression estimates, episode-level duration estimates, and episode-level audience estimates), are generated at the episode level e by the metrics generator 328. Additionally, the estimated impression counts rolled up from the time-segment level to the asset-level are referred to herein as first-asset level estimates (e.g., first asset-level impression estimates, first asset-level duration estimates, and first-asset level audience estimates) whereas the estimated impression counts rolled up from the episode-level to the asset-level are referred to herein as second-asset level estimates (e.g., second asset-level impression estimates, second asset-level duration estimates, and second asset-level duration estimates). Example implementations of the metrics generator 328 are described below in connection with FIGS. 12 and 13.

The segment modifier 330 adjusts ones of the estimated impression counts for each demographic group d at the time-segment level i. In examples disclosed herein, the segment modifier 330 receives ones of the time-segment level estimates from the metrics generator 328. The segment modifier 330 calculates impression ratios and duration ratios at a sub-segment level $i_s$ to adjust ones of the time-segment level estimates. The example segment modifier 330 includes an example impression sub-segment adder 373, an example duration sub-segment adder 374, an example impression ratio calculator 375, an example duration ratio calculator 376, an example impression metrics adjuster 377, and an example duration metrics adjuster 378. Example implementation of the segment modifier 330 are described below in connection with FIG. 21.

The impression sub-segment adder 373 receives time-segment level impression estimates from the metrics generator 328. In examples disclosed herein, the impression sub-segment adder 373 identifies or tracks, for each time-segment level impression estimate, durational segments (e.g., D beacons) representative of impressions identified by the AME 114 and the DP 116. The impression sub-segment adder 373 may identify, for each time-segment level impression estimate determined for platform y, brand b, sub-brand s, asset p, time-segment z, and demographic d, sub-segments of the corresponding D beacons. For example, if the time-segment level impression estimate is partially derived from a D beacon of D_2_01010, the sub-segment adder 373 identifies the sub-segments (e.g., 01010) and determines a quantity of total identified sub-segments in the D beacon (e.g., a total of 5 sub-segments). As such, the impression sub-segment adder 373 determines a sum of sub-segments $i_s$ of the media 206 for each of the time-segment level impression estimates. In this manner, the impression sub-segment adder 373 may calculate a sum of sub-segments for all D beacons corresponding to the nine-segment level impression estimates.

The duration sub-segment adder 374 receives time-segment level duration estimates from the metrics generator 328. In examples disclosed herein, the duration sub-segment adder 374 identifies or tracks, for each time-segment level duration estimate, the durational segments (e.g., the D beacons). The duration sub-segment adder 374 may identify, for each time-segment level duration estimate determined for platform y, brand b, sub-brand s, asset p, time segment z, and demographic d, durations of the corresponding D beacons. For example, if the time-segment level duration estimate is partially derived from the D beacon of the aforementioned example (e.g., D_2_01010), the duration sub-segment adder 374 identifies the durations of the sub-segments (e.g., each sub-segment is equal to a duration of one minute) and determines a quantity of total identified sub-segment durations in the D beacon (e.g., a total duration of 5 minutes). As such, the duration sub-segment adder 374 determines a sum of sub-segment durations of the media 206 for each of the time-segment level duration estimates. In this manner, the duration sub-segment adder 374 may calculate a sum of sub-segment durations for all D beacons corresponding to the time-segment level duration estimates.

The impression ratio calculator 375 receives time-segment level impression estimates from the metrics generator 328 and the sums of the sub-segments is for each time-segment z from the impression sub-segment adder 373. In examples disclosed herein, the impression ratio calculator 375 calculates an impression ratio for each combination of platform y, brand b, sub-brand s, asset p, time segment z, and demographic d, by dividing a quantity of time sub-segments presented (e.g., credited as impressions) in the time-segment level impression estimates by the sum of the sub-segments $i_s$, for the demographic group d and the time-segment z. For example, if time-segment level impression estimate is partially derived from the D beacon, D_2_01010, the quantity of time sub-segments presented in the time-segment level impression estimate is 2 (e.g., of the 5 sub-segments, the 2nd and 4th sub-segments of the media 206 were credited as being presented). Thus, the ratio of the time-segment level impression estimate (e.g., 2) and the sum of the sub-segments is for the time-segment z (e.g., 5) is the impression ratio (e.g., 2/5). In examples disclosed herein, the impression ratio calculator 375 may determine an impression ratio for each corresponding D beacon and sum the impression ratios across all D beacons.

The duration ratio calculator 376 receives time-segment level duration estimates from the metrics generator 328 and the sums of the sub-segment durations for each time-segment z from the duration sub-segment adder 374. In examples disclosed herein, the duration ratio calculator 376 calculates a duration ratio for each combination of platform y, brand b, sub-brand s, asset p, time segment z, and demographic d, by dividing a quantity of presented time sub-segment durations (e.g., credited as durations) of the time-segment level duration estimate by the sum of the sub-segment durations for the demographic group d and the time-segment z. For example, if a time-segment level duration estimate is partially derived from the D beacon, D_2_01010, the quantity of presented time sub-segment durations in the time-segment level duration estimate is 2 minutes (e.g., of the 5 sub-segments, each one minute in duration, the $2^{nd}$ and $4^{th}$ sub-segments of the media 206 were credited as being presented). Thus, the ratio of the time-segment level duration estimate (e.g., 2 minutes) and the sum of the sub-segment durations for the time-segment z (e.g., 5 minutes) is the duration ratio (e.g., 2 minute/5 minutes=2/5). In examples disclosed herein, the duration ratio calculator 376 may determine a duration ratio for each corresponding D beacon and sum the impression ratios across all D beacons.

The impression metrics adjuster 377 receives first asset-level impressions from the metrics generator 328 and the impression ratios from the impression ratio calculator 375. In examples disclosed herein, the impression metrics adjuster 377 adjusts the first asset-level impressions by applying (e.g., multiplying), for each platform y, brand b, sub-brand s, asset p, segment z, and demographic d, the impression ratio of the segment z and the demographic d to the first-asset level impressions of the demographic d. The resulting product produces adjusted time-segment level impression estimates.

The duration metrics adjuster 378 receives first asset-level durations from the metrics generator 328 and the duration ratios from the duration ratio calculator 376. In examples disclosed herein, the durations metrics adjuster 378 adjusts the first asset-level durations by applying (e.g., multiplying), for each platform y, brand b, sub-brand s, asset p, segment z, and demographic d, the duration ratio of the segment z and the demographic d to the first-asset level durations of the demographic d. The resulting product produces adjusted time-segment level duration estimates.

The example brand/cross-platform adjuster 332 adjusts the adjusted time-segment level impression and duration estimates at the brand-level b. In examples disclosed herein, the brand/cross-platform adjuster 332 receives time segment-level estimates from the segment modifier 330 and frequencies and deduplication factors from the distributed demographic data calculator 320. The brand/cross-platform adjuster 332 includes an example impressions adjuster 379, an example duration adjuster 380, an example audience adjuster 381, an example impression total digital (TD) calculator 382, an example duration total digital (TD) calculator 383, and an example audience total digital (TD) calculator 384. Example implementation of the brand/cross-platform adjuster 332 is described below in connection with FIG. 22.

The impressions adjuster 379 receives the adjusted time-segment-level impression estimates from the segment modifier 330 and calculates, for each demographic group d, adjusted brand-level impression estimates (e.g., brand-level impression counts) by summing the adjusted time segment-level impression estimates across all assets p within sub-brands s. Additionally or alternatively, the example impressions adjuster 379 calculates, for each demographic group d, cross publisher adjusted brand-level impression estimates (e.g., cross-publisher adjusted brand-level impression counts) by summing the adjusted brand-level impression estimates across all brands b (e.g., across all network affiliates providing a segment z of the media 206).

The duration adjuster 380 receives the adjusted time segment-level duration estimates (e.g., the adjusted time segment-level durations) from the segment modifier 330 and calculates, for each demographic group d, adjusted-brand level duration estimates by summing the time-segment level duration estimates across all assets p within sub-brands s. Additionally or alternatively, the duration adjuster 380 calculates, for each demographic group d, cross publisher adjusted-brand level durations by summing the adjusted brand-level durations across all brands b.

The audience adjuster 381 receives the adjusted brand-level impression estimates from the impression adjuster 379 and the frequency at the brand-level b, referred to herein as brand-level frequency, from the brand FC 349. In examples disclosed herein, the audience adjuster 381 calculates adjusted brand-level audience estimates by dividing, for each demographic group d, the adjusted brand-level impression estimate by the brand-level frequency. Additionally or alternatively, the example audience adjuster receives the frequency at the cross publisher level, referred to herein as cross publisher-level frequency, from the CP-FC 351. In examples disclosed herein, the audience adjuster 381 calculates cross publisher adjusted brand-level audience estimates (e.g., cross publisher adjusted brand-level audience counts)

by dividing, for each demographic group d, the cross publisher adjusted brand-level impression count by the cross publisher-level frequency.

The impressions TD calculator 382 receives the adjusted brand-level impression estimates from the impressions adjuster 379 and determines total digital brand-level impression estimates, by adding, for each demographic group d, adjusted brand-level impression counts presented at a time segment z via a non-mobile (e.g., desktop) computing platform to adjusted brand-level impression counts presented at the time segment z via a mobile computing platform. Additionally or alternatively, the impressions TD calculator 382 determines cross publisher total digital brand-level impression estimates (e.g., cross publisher total digital brand-level impression counts), by adding, for each demographic group d, cross publisher adjusted brand-level impression estimates presented at a time segment z via a non-mobile (e.g., desktop) computing platform to cross publisher adjusted brand-level impression estimates presented at the time segment z via a mobile computing platform.

The duration TD calculator 383 receives the adjusted brand-level durations from the duration adjuster 380 and determines total digital brand-level durations, by adding, for each demographic group d, adjusted brand-level durations presented at a time segment z via a non-mobile (e.g., desktop) computing platform to adjusted brand-level impression durations presented at the time segment z via a mobile computing platform. Additionally or alternatively, the duration TD calculator 383 determines cross publisher total digital brand-level durations, by adding, for each demographic group d, cross publisher adjusted brand-level duration estimates presented at a time segment z via a non-mobile (e.g., desktop) computing platform to cross publisher adjusted brand-level duration estimates presented at the time segment z via a mobile computing platform.

The audience TD calculator 384 receives the deduplication factors at the brand level b, referred to herein as brand-level deduplication factors, from the brand DFG 350. The audience TD calculator 384 also receives the adjusted brand-level audience counts from the audience adjuster 381. In examples disclosed herein, the TD calculator 384 determines total digital brand-level audience counts by adding, for each demographic group d, adjusted brand-level audience counts presented at a time segment z via a non-mobile (e.g., desktop) computing platform to adjusted brand-level audience counts presented at the time segment z via a mobile computing platform and multiplying the sum by a corresponding brand-level deduplication factor.

In some examples, the audience TD calculator 384 receives the deduplication factors at the cross publisher level, referred to herein as cross publisher-level deduplication factors, from the CP-DFG 352. The example audience TD calculator 384 determines cross publisher total digital brand-level audience estimates by adding, for each demographic group d, cross publisher adjusted brand-level audience estimates presented at a time segment z via a non-mobile (e.g., desktop) computing platform to cross publisher adjusted brand-level audience estimates presented at the time segment z via a mobile computing platform and multiplying the sum by a corresponding cross publisher-level deduplication factor.

The brand/cross-platform adjuster 332 also adjusts the adjusted time-segment level impression and duration estimates at the cross-publisher level. In examples disclosed herein, the brand/cross-platform adjuster 332 determines the adjusted brand-level impression counts, and receives the frequencies and deduplication factors from the distributed demographic data calculator 320.

The content calculator 336 receives redistributed impression counts, duration units, and/or audience counts organized by content type c (e.g., text content t, video content v, or both text and video content w) from the demographic distributor 318. The example content calculator 336 also receives adjusted brand-level impression estimates from the impressions adjuster 379. In examples disclosed herein, the content calculator 336 generates text and video (T/V) deduplication factors based on the audience counts organized by content type c. In examples disclosed herein, the content calculator 336 determines corrected audience counts (e.g., total content audience counts) based on the (T/V) deduplication factors and the adjusted brand-level audience estimates. The corrected audience counts indicate a quantity of audience members, of a demographic group d, that were presented text content t and/or video content v for a particular segment z of the media 206 of FIG. 2. In examples disclosed herein, the corrected audience counts are based on a quantity of audience members that accessed text content t, referred to herein as text audience counts, and a quantity of audience members that accessed video content v, referred to herein as video audience counts. The content calculator 336 includes an example text and video (T/V) deduplication factor generator (DFG) 391, an example text and video (T/V) audience calculator 392, an example total digital (TD) deduplication factor generator (DFG) 393, and an example total digital (TD) audience calculator 394. Example implementation of the content calculator adjuster 336 is described below in connection with FIG. 24.

The T/V DFG 391 receives audience counts redistributed by text content t, video content v, and both text and video content w from the demographic distributor 318. In examples disclosed herein, the T/V DFG 391 calculates, for each demographic d and time segment z, a T/V deduplication factor by dividing a redistributed audience count indicative of both text and video w (e.g., a duplicated content audience count) by a sum of a redistributed audience count indicative of text t (e.g., a text redistributed audience count) and a redistributed audience count indicative of video v (e.g., a video redistributed audience count).

The T/V audience calculator 392 receives adjusted brand-level impression estimates from the impressions adjuster 379. The T/V audience calculator 392 also generates T/V deduplication factors using the T/V DFG 391. In examples disclosed herein, the T/V audience calculator 392 calculates a text frequency by dividing, for each demographic group d, an impression count redistributed by text t by an audience count redistributed by text t. The T/V audience calculator 392 also calculates a video frequency by dividing, for each demographic group d, an impression count redistributed by video v by an audience count redistributed by video v. In examples disclosed herein the T/V audience calculator 392 determines, for each demographic d, a text audience count by dividing an adjusted brand-level impression estimate by the text frequency. The T/V audience calculator 392 further determines, for each demographic d, a video audience count by dividing the adjusted brand-level impression estimate by the video frequency. In examples disclosed herein, the T/V audience calculator 392 calculates a corrected audience count (e.g., a total content audience count), for each demographic d, by applying a T/V deduplication factor to a sum of the text audience count and the video audience count.

The TD DFG 393 receives audience counts redistributed by text content t, video content v, and both text and video content w from the demographic distributor 318. In examples disclosed herein, the TD DFG 393 determines, for each demographic d, a total digital (TD) text and video (T/V) deduplication factor by dividing a duplicated platform audience count (e.g., an audience count, based on all audience counts redistributed by content type c, credited to both a non-mobile computing platform and a mobile computing platform) by a sum of a non-mobile computing platform audience count (e.g., an audience count, based on all audience counts redistributed by content type c, credited to the non-mobile computing platform) and a mobile computing platform audience count (e.g., an audience count, based on all audience counts redistributed by content type c, credited to the mobile computing platform).

The TD audience calculator 394 receives the TD T/V deduplication factors from the TD DFG 393. The TD audience calculator 394 also accesses and/or receives the adjusted brand-level impression estimates from the impressions adjuster 379. In examples disclosed herein, the TD audience calculator 394 calculates a total digital text frequency by dividing, for each demographic group d, an impression count redistributed by text t across all platforms y by an audience count redistributed by text t across all platforms y. The TD audience calculator 394 also calculates a total digital video frequency by dividing, for each demographic group d, an impression count redistributed by video v across all platforms y by an audience count redistributed by video v across all platforms y. In examples disclosed herein the TD audience calculator 394 determines, for each demographic d, a total digital text audience count by dividing an adjusted brand-level impression estimate by the total digital text frequency. The TD audience calculator 394 further determines, for each demographic d, a total digital video audience count by dividing the adjusted brand-level impression estimate by the total digital video frequency. In examples disclosed herein, the TD audience calculator 394 calculates a total digital corrected audience count (e.g., a total content audience count), for each demographic d, by applying a TD T/V deduplication factor to a sum of the total digital text audience count and the total digital video audience count.

The ratings data generator 338 generates ratings information for media of interest for the demographic groups d using corrected and/or adjusted impression and/or audience information (e.g., the corrected audience counts, the total content audience counts, etc.).

While an example manner of implementing the audience data generator 120a-b of FIGS. 1 and/or 2 is illustrated in FIG. 3, one or more of the elements, processes and/or devices illustrated in FIG. 3 may be combined, divided, re-arranged, omitted, eliminated and/or implemented in any other way. Further, the example calibration data collector 300, the example platform data manager 302, the example device data manager 304, the example segment data manager 306, the example episode data manager 308, the example asset data manager 310, the example sub-brand data manager 312, the example brand data manager 314, the example database proprietor (DP) data manager 316, the example demographic distributor 318, the example distributed demographic data calculator 320, the example matrix generator 322, the example episode-segment (E-S) adjuster 324, the example census imputer 326, the example metrics generator 328, the example segment modifier 330, the example brand/cross-platform adjuster 332, the example content calculator 336, the example ratings data generator 338, the example duration-per-impression (DPI) calculator 340, the example segment frequency calculator (FC) 341, the example segment deduplication factor generator (DFG) 342, the example episode frequency calculator (FC) 343, the example episode deduplication factor generator (DFG) 344, the example asset frequency calculator (FC) 345, the example asset deduplication factor generator (DFG) 346, the example sub-brand frequency calculator (FC) 347, the example sub-brand deduplication factor generator (DFG) 348, the example brand frequency calculator (FC) 349, the example brand deduplication factor generator (DFG) 350, the example cross publisher frequency calculator (CP-FC) 351, the example cross publisher deduplication factor generator (CP-DFG) 352, the example matrix converter 353, the example impressions sharing adjuster 354, the example duration sharing adjuster 355, the example coverage vector calculator 356, the example impressions coverage adjuster 357, the example duration coverage adjuster 358, the example impression scaling factor generator 359, the example duration scaling factor generator 360, the example impressions scaler 361, the example duration scaler 362, the example impressions adder 363, the example duration adder 364, the example impressions imputation adder 365, the example duration imputation adder 366, the example impressions distribution deriver 367, the example duration distribution deriver 368, the example impressions imputation director 369, the example duration imputation director 370, the example impressions imputation calculator 371, the example duration imputation calculator 372, the example impression sub-segment adder 373, the example duration sub-segment adder 374, the example impression ratio calculator 375, the example duration ratio calculator 376, the example impression metrics adjuster 377, the example duration metrics adjuster 378, the example impressions adjuster 379, the example duration adjuster 380, the example audience adjuster 381, the example impressions total digital (TD) calculator 382, the example duration total digital (TD) calculator 383, the example audience total digital (TD) calculator 384, the example text and video (T/V) deduplication factor generator (DFG) 391, the example text and video (T/V) audience calculator 392, the example total digital (TD) deduplication factor generator 393, the example total digital (TD) audience calculator 394 and/or, more generally, the example audience data generator 120 of FIGS. 1, 2, and/or 3 may be implemented by hardware, software, firmware and/or any combination of hardware, software and/or firmware. Thus, for example, any of the example calibration data collector 300, the example platform data manager 302, the example device data manager 304, the example segment data manager 306, the example episode data manager 308, the example asset data manager 310, the example sub-brand data manager 312, the example brand data manager 314, the example database proprietor (DP) data manager 316, the example demographic distributor 318, the example distributed demographic data calculator 320, the example matrix generator 322, the example episode-segment (E-S) adjuster 324, the example census imputer 326, the example metrics generator 328, the example segment modifier 330, the example brand/cross-platform adjuster 332, the example content calculator 336, the example ratings data generator 338, the example duration-per-impression (DPI) calculator 340, the example segment frequency calculator (FC) 341, the example segment deduplication factor generator (DFG) 342, the example episode frequency calculator (FC) 343, the example episode deduplication factor generator (DFG) 344, the example asset frequency calculator (FC) 345, the example asset deduplication factor generator (DFG) 346, the example sub-brand frequency calculator (FC) 347, the example sub-brand deduplication factor generator (DFG) 348, the example brand frequency calculator (FC) 349, the example brand deduplication factor generator (DFG) 350, the example cross publisher frequency calculator (CP-FC) 351, the example cross publisher deduplication factor generator (CP-DFG) 352, the example matrix converter 353, the example impressions sharing adjuster 354, the example duration sharing adjuster 355, the example coverage vector calculator 356, the example impressions coverage adjuster 357, the example duration coverage adjuster 358, the example impression scaling factor generator 359, the example duration scaling factor generator 360, the example impressions scaler 361, the example duration scaler 362, the example impressions adder 363, the example duration adder 364, the example impressions imputation adder 365, the example duration imputation adder 366, the example impressions distribution deriver 367, the example duration distribution deriver 368, the example impressions imputation director 369, the example duration imputation director 370, the example impressions imputation calculator 371, the example duration imputation calculator 372, the example impression sub-segment adder 373, the example duration sub-segment adder 374, the example impression ratio calculator 375, the example duration ratio calculator 376, the example impression metrics adjuster 377, the example duration metrics adjuster 378, the example impressions adjuster 379, the example duration adjuster 380, the example audience adjuster 381, the example impressions total digital (TD) calculator 382, the example duration total digital (TD) calculator 383, the example audience total digital (TD) calculator 384, the example text and video (T/V) deduplication factor generator (DFG) 391, the example text and video (T/V) audience calculator 392, the example total digital (TD) deduplication factor generator 393, the example total digital (TD) audience calculator 394, and/or, more generally, the example audience data generator 120 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example calibration data collector 300, the example platform data manager 302, the example device data manager 304, the example segment data manager 306, the example episode data manager 308, the example asset data manager 310, the example sub-brand data manager 312, the example brand data manager 314, the example database proprietor (DP) data manager 316, the example demographic distributor 318, the example distributed demographic data calculator 320, the example matrix generator 322, the example episode-segment (E-S) adjuster 324, the example census imputer 326, the example metrics generator 328, the example segment modifier 330, the example brand/cross-platform adjuster 332, the example content calculator 336, the example ratings data generator 338, the example duration-per-impression (DPI) calculator 340, the example segment frequency calculator (FC) 341, the example segment deduplication factor generator (DFG) 342, the example episode frequency calculator (FC) 343, the example episode deduplication factor generator (DFG) 344, the example asset frequency calculator (FC) 345, the example asset deduplication factor generator (DFG) 346, the example sub-brand frequency calculator (FC) 347, the example sub-brand deduplication factor generator (DFG) 348, the example brand frequency calculator (FC) 349, the example brand deduplication factor generator (DFG) 350, the example cross publisher frequency calculator (CP-FC) 351, the example cross publisher deduplication factor generator (CP-DFG) 352, the example matrix converter 353, the example impressions sharing adjuster 354, the example duration sharing adjuster 355, the example coverage vector calculator 356, the example impressions coverage adjuster 357, the example duration coverage adjuster 358, the example impression scaling factor generator 359, the example duration scaling factor generator 360, the example impressions scaler 361, the example duration scaler 362, the example impressions adder 363, the example duration adder 364, the example impressions imputation adder 365, the example duration imputation adder 366, the example impressions distribution deriver 367, the example duration distribution deriver 368, the example impressions imputation director 369, the example duration imputation director 370, the example impressions imputation calculator 371, the example duration imputation calculator 372, the example impression sub-segment adder 373, the example duration sub-segment adder 374, the example impression ratio calculator 375, the example duration ratio calculator 376, the example impression metrics adjuster 377, the example duration metrics adjuster 378, the example impressions adjuster 379, the example duration adjuster 380, the example audience adjuster 381, the example impressions total digital (TD) calculator 382, the example duration total digital (TD) calculator 383, the example audience total digital (TD) calculator 384, the example text and video (T/V) deduplication factor generator (DFG) 391, the example text and video (T/V) audience calculator 392, the example total digital (TD) deduplication factor generator 393, and/or the example total digital (TD) audience calculator 394 and/or, more generally, the example audience data generator 120 is/are hereby expressly defined to include a tangible computer readable storage device or storage disk such as a memory, a digital versatile disk (DVD), a compact disk (CD), a Blu-ray disk, etc. storing the software and/or firmware. Further still, the example audience data generator 120 of FIGS. 1, 2 and/or 3 may include one or more elements, processes and/or devices in addition to, or instead of, those illustrated in FIG. 3, and/or may include more than one of any or all of the illustrated elements, processes and devices.

Flowcharts representative of example machine readable instructions for implementing the audience data generator 120 of FIGS. 1, 2, and/or 3 are shown in FIGS. 4-7 and 9-16. In this example, the machine readable instructions comprise a program for execution by a processor such as the processor 1712 shown in the example processor platform 1700 discussed below in connection with FIG. 17. The program(s) may be embodied in software stored on a tangible computer readable storage medium such as a CD-ROM, a floppy disk, a hard drive, a digital versatile disk (DVD), a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowchart illustrated in FIGS. 4-7 and 9-16, many other methods of implementing the example audience data generator 120 may alternatively be used. For example, the order of execution of the blocks may be changed, and/or some of the blocks described may be changed, eliminated, or combined.

As mentioned above, the example processes of FIGS. 4-7 and 9-16 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-7 and 9-16 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
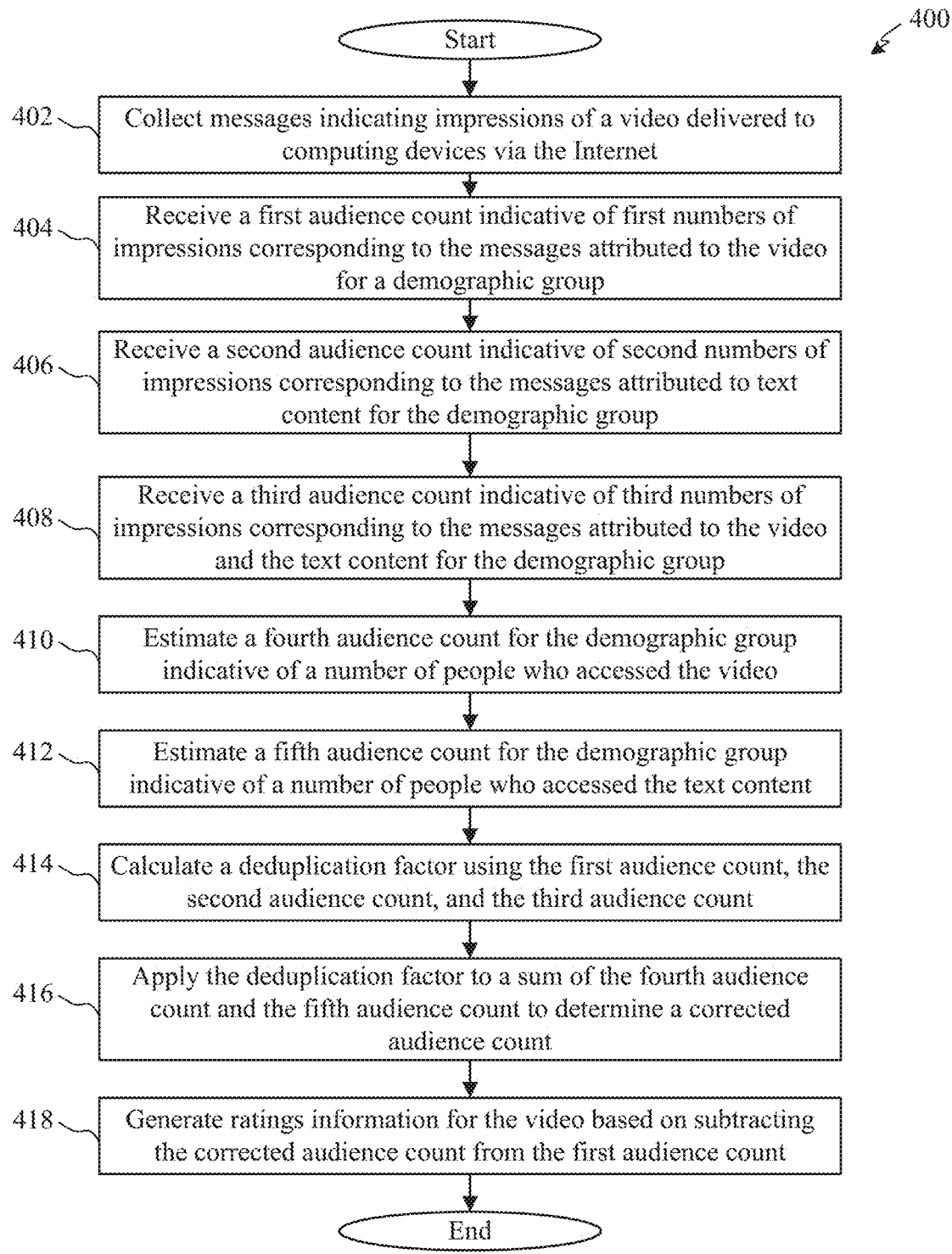
FIG. 4 is a flowchart representative of example machine readable instructions which may be executed to implement the example audience data generator of FIGS. 1-3 to generate ratings information for video based on subtracting a duplicated audience count from a first audience count.

FIG. 4 is a flowchart representative of example machine readable instructions 400 which may be executed to implement the audience data generator 120 of FIGS. 1-3 to determine rating data from population sample data having incomplete demographic classifications.

The example AME impressions collector 218 collects messages (e.g., the beacon requests 212, 226b) indicating impressions of a video delivered to devices (e.g., the client device 102) via the Internet (block 402).

The example DP impressions collector 232 receives, from the DP 116, a first audience count describing first numbers of impressions corresponding to the messages attributed to the video for a demographic group (Block 404). The example DP impressions collector 232 receives, from the DP 116, a second audience count describing second numbers of impressions corresponding to the messages attributed to text content for the demographic group (Block 406). The example DP impressions collector 232 receives, from the DP 116, a third audience count describing third numbers of impressions corresponding to the messages attributed to the video and the text content for the demographic group (Block 408).

The example audience data generator 120 of FIGS. 1, 2, and/or 3 (e.g., via the content calculator 336 of FIG. 3) determines a corrected audience count of the video for the demographic group. The example T/V calculator 392 estimates a fourth audience count for the demographic group (Block 410). The fourth audience count indicates a number of people who accessed the video. The example T/V calculator 392 also estimates a fifth audience count for the demographic group (Block 412). The fifth audience count indicates a number of people who accessed the text content.

The example audience data generator 120 (e.g., via the T/V DFG 391) calculates a deduplication factor for the demographic group using the first audience count, the second audience count, and the third audience count (Block 414).

The example audience data generator 120 (e.g., via the T/V audience calculator 392) applies the deduplication factor to a sum of the fourth audience count and the fifth audience count to determine the corrected audience count (Block 416).

The example audience data generator (e.g., via the ratings data generator 338) generates ratings information for the video based on subtracting the corrected audience count from the first audience count (Block 418).

The example instructions 400 of FIG. 4 may then end. More detailed examples of implementing the instructions of FIG. 4 are described below with reference to FIGS. 4-7 and 9-16.

Gender Redistribution at the Episode Level

Figure 5:
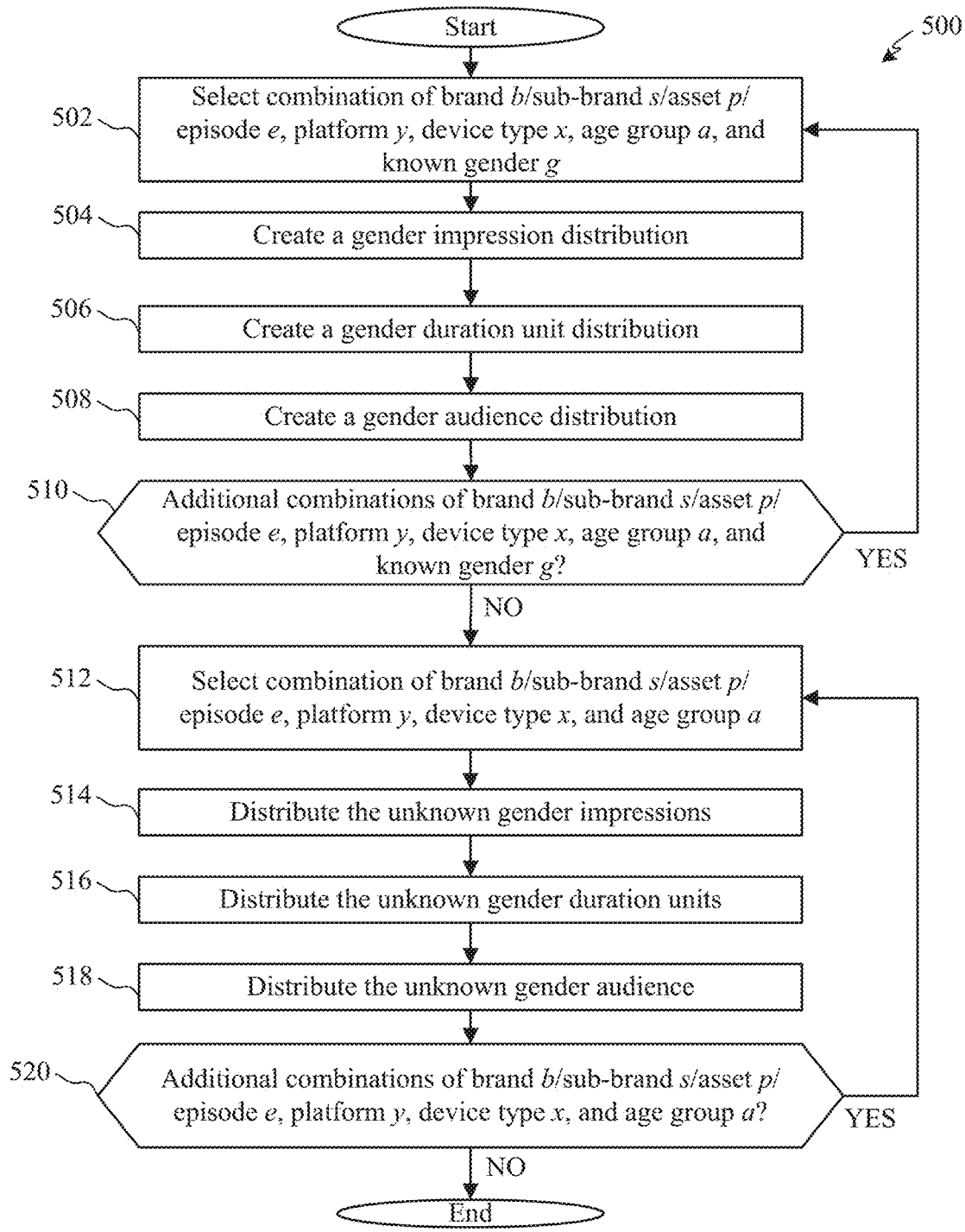
FIG. 5 is a flowchart representative of example machine readable instructions which may be executed to implement the audience data generator of FIGS. 1-3 to perform demographic redistribution of database proprietor demographic data at an episode level.

FIG. 5 is a flowchart representative of example machine readable instructions 500 which may be executed to implement the audience data generator of FIGS. 1-3 to perform demographic redistribution of database proprietor demographic data. The example instructions 500 of FIG. 5 may be executed to perform demographic redistribution at any of multiple levels. Example levels include the hierarchical levels for which the audience data generator receives aggregate demographic data for impressions, audience counts, and/or duration from a database proprietor. For example, demographic redistribution may occur for impressions, audience counts, and/or duration attributed by the database proprietor to a combination of a platform, a device type, an age group, a time segment, an episode, an asset, a sub-brand, and/or a brand. The example demographic distributor 318 of FIG. 3 may perform the instructions 500 of FIG. 5 to redistribute impressions, durations, and/or unique audience members for which the DP 116 is unable to determine a gender at the example time segment level, the example episode level, the example asset level, the example sub-brand level, and/or the example brand level. The example instructions 500 are described below with respect to a redistribution of a gender group, but may be modified to redistribute DP demographic data according to any demographic quality.

In some examples, aggregated demographic information may not be collected for impressions, audience counts, and/or durations at some hierarchical levels. In such examples, the corresponding gender redistribution blocks may be omitted from the instructions 500.

Table 1 illustrates an example demographic redistribution of database proprietor demographic data at the episode level. Table 2 illustrates an example demographic redistribution of database proprietor demographic data at the asset level. Table 3 illustrates an example demographic redistribution of demographic data at the sub-brand level. Table 4 illustrates an example demographic redistribution of database proprietor demographic data at the brand level.

TABLE 1

Example redistribution of impressions, duration, and audience counts
for which gender is unknown at the example episode level

| Brand | Sub-Brand | Asset | Episode | Demo | Impr (from DP, deduplicated across all segments) | Gender Impr Distr | Redistr Imprs |
|---|---|---|---|---|---|---|---|
| Br1 | S-Br1 | As1 | Ep1 | D1 = M12+ | 12,557 | 59.6% | 13,970 |
| Br1 | S-Br1 | As1 | Ep1 | D2 = F12+ | 8,496 | 40.4% | 9,460 |
| Br1 | S-Br1 | As1 | Ep1 | Unknown Gender 12+ | 2,387 | | |
| Br1 | S-Br1 | As1 | Ep1 | Total | 23,340 | | 23,340 |

| Brand | Sub-Brand | Asset | Episode | Demo | Dur (from DP, deduplicated across all segments)(min.) | Gender Dur Distr | Redistr Dur (min.) |
|---|---|---|---|---|---|---|---|
| Br1 | S-Br1 | As1 | Ep1 | D1 = M12+ | 138,868 | 60.4% | 153,307 |
| Br1 | S-Br1 | As1 | Ep1 | D2 = F12+ | 91,004 | 39.6% | 100,471 |
| Br1 | S-Br1 | As1 | Ep1 | Unknown Gender 12+ | 23,906 | | |
| Br1 | S-Br1 | As1 | Ep1 | Total | 253,778 | | 253,778 |

| Brand | Sub-Brand | Asset | Episode | Demo | UA (from DP, deduplicated across all segments) | Gender UA Distr | Redistr UA |
|---|---|---|---|---|---|---|---|
| Br1 | S-Br1 | As1 | Ep1 | D1 = M12+ | 105 | 54.7% | 116 |
| Br1 | S-Br1 | As1 | Ep1 | D2 = F12+ | 87 | 45.3% | 96 |
| Br1 | S-Br1 | As1 | Ep1 | Unknown Gender 12+ | 20 | | |
| Br1 | S-Br1 | As1 | Ep1 | Total | 212 | | 212 |

TABLE 2

Example redistribution of impressions, duration, and audience counts
for which gender is unknown at the example asset level

| Brand | Sub-Brand | Asset | Demo | Impr (from DP, deduplicated across all segments) | GenderImpr Distr | Redistr Imprs |
|---|---|---|---|---|---|---|
| Br1 | S-Br1 | As1 | D1 = M12+ | 15,751 | 56.8% | 17,107 |
| Br1 | S-Br1 | As1 | D2 = F12+ | 11,987 | 43.2% | 13,018 |
| Br1 | S-Br1 | As1 | Unknown Gender 12+ | 2,387 | | |
| Br1 | S-Br1 | As1 | Total | 30,125 | | 30,125 |

| Brand | Sub-Brand | Asset | Demo | Dur (from DP, deduplicated across all segments)(min.) | Gender Dur Distr | Redistr Dur (min.) |
|---|---|---|---|---|---|---|
| Br1 | S-Br1 | As1 | D1 = M12+ | 175,312 | 54.7% | 188,389 |
| Br1 | S-Br1 | As1 | D2 = F12+ | 145,119 | 45.3% | 155,948 |
| Br1 | S-Br1 | As1 | Unknown Gender 12+ | 23,906 | | |
| Br1 | S-Br1 | As1 | Total | 344,337 | | 334,337 |

| Brand | Sub-Brand | Asset | Demo | UA (from DP, deduplicated across all segments) | Gender UA Distr | Redistr UA |
|---|---|---|---|---|---|---|
| Br1 | S-Br1 | As1 | D1 = M12+ | 125 | 38.5% | 133 |
| Br1 | S-Br1 | As1 | D2 = F12+ | 200 | 61.5% | 212 |
| Br1 | S-Br1 | As1 | Unknown Gender 12+ | 20 | | |
| Br1 | S-Br1 | As1 | Total | 345 | | 345 |

TABLE 3

Example redistribution of impressions, duration, and audience counts for which gender is unknown at the example sub-brand level

| Brand | Sub-Brand | Demo | Impr (from DP, deduplicated across all segments) | Gender Impr Distr | Redistr Imprs |
|---|---|---|---|---|---|
| Br1 | S-Br1 | D1 = M12+ | 21,345 | 60% | 22,777 |
| Br1 | S-Br1 | D2 = F12+ | 16,789 | 40% | 17,744 |
| Br1 | S-Br1 | Unknown Gender 12+ | 2,387 | | |
| Br1 | S-Br1 | Total | 40,521 | | 40,521 |

| Brand | Sub-Brand | Demo | Dur (from DP, deduplicated across all segments)(min.) | Gender Dur Distr | Redistr Dur (min.) |
|---|---|---|---|---|---|
| Br1 | S-Br1 | D1 = M12+ | 211,467 | 51.7% | 223,826 |
| Br1 | S-Br1 | D2 = F12+ | 197,651 | 48.3% | 209,198 |
| Br1 | S-Br1 | Unknown Gender 12+ | 23,906 | | |
| Br1 | S-Br1 | Total | 433,024 | | 433,024 |

| Brand | Sub-Brand | Demo | UA (from DP, deduplicated across all segments) | Gender UA Distr | Redistr UA |
|---|---|---|---|---|---|
| Br1 | S-Br1 | D1 = M12+ | 250 | 45.5% | 259 |
| Br1 | S-Br1 | D2 = F12+ | 300 | 54.5% | 311 |
| Br1 | S-Br1 | Unknown Gender 12+ | 20 | | |
| Br1 | S-Br1 | Total | 570 | | 570 |

TABLE 4

Example redistribution of impressions, duration, and audience counts for which gender is unknown at the example brand level

| Brand | Demo | Impr (from DP, deduplicated across all segments) | Gender Impr Distr | Redistr Imprs |
|---|---|---|---|---|
| Br1 | D1 = M12+ | 42,323 | 66.0% | 43,898 |
| Br1 | D2 = F12+ | 21,789 | 34.0% | 22,601 |
| Br1 | Unknown Gender 12+ | 2,387 | | |
| Br1 | Total | 66,499 | | 66,499 |

| Brand | Demo | Dur (from DP, deduplicated across all segments)(min.) | Gender Dur Distr | Redistr Dur (min.) |
|---|---|---|---|---|
| Br1 | D1 = M12+ | 292,178 | 57.4% | 305,900 |
| Br1 | D2 = F12+ | 216,782 | 42.6% | 226,966 |
| Br1 | Unknown Gender 12+ | 23,906 | | |
| Br1 | Total | 532,866 | | 532,866 |

| Brand | Demo | UA (from DP, deduplicated across all segments) | Gender UA Distr | Redistr UA |
|---|---|---|---|---|
| Br1 | D1 = M12+ | 352 | 42.5% | 360 |
| Br1 | D2 = F12+ | 476 | 57.5% | 488 |

TABLE 4-continued

Example redistribution of impressions, duration, and audience counts for which gender is unknown at the example brand level

| Br1 | Unknown Gender 12+ | 20 | |
|---|---|---|---|
| Br1 | Total | 848 | 848 |

The example demographic distributor 318 receives as input post-Decision-Tree (DT) episode-level data from the DP 116 of FIGS. 1 and/or 2 (e.g., via the DP data manager 316 of FIG. 3). As shown in Table 1, the episode-level demographic data includes episode-level impression counts, episode-level durations, and episode-level unique audience counts, which correspond to a brand b, a sub-brand s, an asset p, and an episode e. The DP 116 aggregates and de-duplicates the impression counts, the durations, and the unique audience counts of Table 1 for all time segments included in an identified episode. The impression counts, the durations, and the unique audience counts of Table 1 are attributed to demographic groups (e.g., male, age 12+ and female, age 12+) by the DP 116. The example DP 116 also provides the impression counts, the durations, and the unique audience counts of Table 1 for an unknown demographic group, which corresponds to impression counts, durations, and unique audience members that the DP 116 counted based on the pings or requests, but for which the DP 116 was unable to identify demographic groups.

Similarly, the example demographic distributor 318 receives as input post-Decision-Tree (DT) asset-level demographic data, sub-brand-level demographic data, and brand-level demographic data from the DP 116 of FIGS. 1 and/or 2 (e.g., via the DP data manager 316 of FIG. 3). As shown in Table 2, the asset-level demographic data includes asset-level impression counts, asset-level durations, and asset-level unique audience counts, which correspond to a brand b, a sub-brand s, and an asset p. The example impression counts, durations, and unique audience counts of Table 2 are attributed to demographic groups (e.g., male, age 12+ and female, age 12+) by the DP 116. As shown in Table 3, the sub-brand level demographic data includes sub-brand level impression counts, sub-brand level durations, and sub-brand level unique audience counts, which correspond to a brand b, and a sub-brand s. The example impression counts, durations, and unique audience counts of Table 3 are attributed to demographic groups (e.g., male, age 12+ and female, age 12+) by the DP 116. As shown in Table 4, the brand-level demographic data includes brand-level impression counts, brand-level durations, and brand-level unique audience counts, which correspond to a brand b. The example impression counts, durations, and unique audience counts of Table 4 are attributed to demographic groups (e.g., male, age 12+ and female, age 12+) by the DP 116. The example demographic data of Tables 1-4 above may be further specified according to a platform and/or a device type, but the specified device type and the specified platform are omitted from Tables 1-4 for brevity.

Because the demographic distributor 318 may execute similar instructions to perform distribution at any of the episode level, the asset level, the sub-brand level, and the brand-level, the example instructions 500 of FIG. 5 may be applied at the example episode level, the example asset level, the example sub-brand level, and/or the example brand-level.

In the example of FIG. 5, the example demographic distributor 318 of FIG. 3 selects a combination of a brand b/sub-brand s/asset p/episode e, a platform y, a device type x, an age group a, and a gender group g (Block 502). In this example, the gender groups "male" and "female" are referred to by indices g=1 and 2, and an unknown gender group is referred to using the index g=0.

The demographic distributor 318 creates a gender impression distribution (e.g., gImpsRatio$_{b/s/p/e,y,x,a,g}$) (block 504). For example, the gender impression distribution gImpsRatio$_{b/s/p/e,y,x,a,g}$ may be a ratio of the impression counts of Tables 1, 2, 3, and/or 4 for the selected brand b/sub-brand s/asset p/episode e, platform y, device type x, age group a, and gender group g (e.g., Imps$_{b/s/p/e,y,x,a,g}$) and total impression counts across all of the gender groups (e.g., for g=1 and g=2) for the selected age group a and the selected brand b/sub-brand s/asset p/episode e. In the example of Table 1, the demographic distributor 318 determines an impression distribution of 59.6% for the male demographic group D1 for the selected episode (e.g., 12,557/(12,557+8,496)) and 40.4% for the female demographic group D2 for the selected episode (e.g., 8,496/(12,557+8,496). In the example of Table 2, the demographic distributor 318 determines an impression distribution of 56.8% for the male demographic group D1 for the selected asset (e.g., 15,751/(15,751+11,987)) and 43.2% for the female demographic group D2 for the selected asset (e.g., 11,987/(15,751+11,987)). In the example of Table 3, the demographic distributor 318 determines an impression distribution of 60% for the male demographic group D1 for the selected sub-brand (e.g., 21,345/(21,345+16,789)) and 40.0% for the female demographic group D2 for the selected sub-brand (e.g., 16,789/(21,345+16,789)). In the example of Table 4, the demographic distributor 318 determines an impression distribution of 66% for the male demographic group D1 for the selected brand (e.g., 42,323/(42,323+21,789)) and 34% for the female demographic group D2 for the selected brand (e.g., 21,789/(42,323+21,789)). Equation 1 below may be used to implement block 504.

$$gImpsRatio_{b/s/p/e,y,x,a,g} = \frac{Imps_{b/s/p/e,y,x,a,g}}{\sum_{g=1}^{g}(Imps_{b/s/p/e,y,x,a,g})}, \quad \text{(Equation 1)}$$

where $g = 1\ \&\ 2$

The demographic distributor 318 creates a gender duration distribution (e.g., gDurationRatio$_{b/s/p/e,y,x,a,g}$) (Block 506). For example, the gender duration distribution gDurationRatio$_{b/s/p/e,y,x,a,g}$ may be a ratio of the durations of Tables 1, 2, 3, and/or 4 for the selected brand b/sub-brand s/asset p/episode e, platform y, device type x, age group a, and gender group g (e.g., Duration$_{b/s/p/e,y,x,a,g}$) and total durations across all of the gender groups (e.g., for g=1 and g=2) for the selected age group a and the selected brand b/sub-brand s/asset p/episode e. In the example of Table 1, the demographic distributor 318 determines a duration distribution of 60.4% for the male demographic group D1 for the selected episode (e.g., 138,868 minutes/(138,868 minutes+91,004 minutes)) and 39.6% for the female demographic group D2 for the selected episode (e.g., 91,004 minutes/(138,868 minutes+91,004 minutes). In the example of Table 2, the demographic distributor 318 determines a duration distribution of 54.7% for the male demographic group D1 for the selected asset (e.g., 175,312 minutes/(175,312 minutes+145,119 minutes)) and 45.3% for the female demographic group D2 for the selected asset (e.g., 145,119 minutes/(175,312 minutes+145,119 minutes)). In the example of Table 3, the demographic distributor 318 determines a duration distribution of 51.7% for the male demographic group D1 for the selected sub-brand (e.g., 211,467 minutes/(211,467 minutes+197,651 minutes)) and 48.3% for the female demographic group D2 for the selected sub-brand (e.g., 197,651 minutes/(211,467 minutes+197,651 minutes)). In the example of Table 4, the demographic distributor 318 determines a duration distribution of 57.4% for the male demographic group D1 for the selected brand (e.g., 292,178 minutes/(292,178 minutes+216,782 minutes)) and 42.6% for the female demographic group D2 for the selected brand (e.g., 216,782 minutes/(292,178 minutes+216,782 minutes)). Equation 2 below may be used to implement block 506.

$$gDurationRatio_{b/s/p/e,y,x,a,g} = \frac{Duration_{b/s/p/e,y,x,a,g}}{\sum_{g=1}^{g}(Duration_{b/s/p/e,y,x,a,g})}, \quad \text{(Equation 2)}$$

where $g = 1\ \&\ 2$

The demographic distributor 318 creates a gender audience distribution (e.g., gUARatio$_{b/s/p/e,y/x,a,g}$) (Block 508). For example, the gender audience distribution gUARatio$_{b/s/p/e,y/x,a,g}$ may be a ratio of the unique audience count of Tables 1, 2, 3, and/or 4 for the selected brand b/sub-brand s/asset p/episode e, platform y/device type x, age group a, and gender group g (e.g., UA$_{b/s/p/e,y/x,a,g}$) and total unique audience count across all of the gender groups (e.g., for g=1 and g=2) for the selected age group a and the selected brand b/sub-brand s/asset p/episode e. In some examples, the demographic distributor 318 creates the gender audience distribution gUARatio$_{b,s,p,e,y,a,g}$ for a platform y but does not distinguish between device types x. In the example of Table 1, the demographic distributor 318 determines an audience distribution of 54.7% for the male demographic group D1 for the selected episode (e.g., 105/(105+87)) and 45.3% for the female demographic group D2 for the selected episode (e.g., 87/(105+87))). In the example of Table 2, the demographic distributor 318 determines an audience distribution of 38.5% for the male demographic group D1 for the selected asset (e.g., 125/(125+200)) and 61.5% for the female demographic group D2 for the selected asset (e.g., 200/(125+200))). In the example of Table 3, the demographic distributor 318 determines an audience distribution of 45.5% for the male demographic group D1 for the selected sub-brand (e.g., 250/(250+300)) and 54.5% for the female demographic group D2 for the selected sub-brand (e.g., 250/(250+300)). In the example of Table 4, the demographic distributor 318 determines an audience distribution of 42.5% for the male demographic group D1 for the selected brand (e.g., 352/(352+476)) and 57.5% for the female demographic group D2 for the selected brand (e.g., 476/(352+476)). Equation 3 below may be used to implement block 506.

$$gUARatio_{b/s/p,e,y/x,a,g} = \frac{UA_{b/s/p/e,y,x,a,g}}{\sum_{g=1}^{g}(UA_{b/s/p/e,y,x,a,g})}, \quad \text{(Equation 3)}$$

where $g = 1\ \&\ 2$

The example demographic distributor 318 determines whether there are additional combinations of brand b/sub-brand s/asset p/episode e, platform y, device type x, age group a, and known gender g (block 510). If there are additional combinations (e.g., combinations for which the distributions of the impression counts, the durations, and the unique audience counts are to be created) (block 510), control returns to block 502.

When there are no more combinations of brand b/sub-brand s/asset p/episode e, platform y, device type x, age group a, and known gender g (block 510), the demographic distributor 318 selects a combination of a brand b/sub-brand s/asset p/episode e, platform y, device type x, and age group a (block 512).

The demographic distributor 318 distributes the unknown gender impressions (block 514). For example, the demographic distributor 318 may distribute the unknown gender impressions to generate redistributed impressions $rDPImps_{b/s/p/e,y,x,d}$ by applying the gender impression distribution $gImpsRatio_{b/s/p/e,y,x,a,g}$ of Tables 1, 2, 3, and/or 4, to the impression counts, of Tables 1, 2, 3, and/or 4, respectively, for which the gender is unknown (e.g., unknown gender impressions) ($Imps_{b/s/p/e,y,x,a,0}$) for the selected brand b/sub-brand s/asset p/episode e, platform y, device type x, and age group a. In the example of Table 1, the demographic distributor 318 determines 13,980 redistributed impression counts for the male demographic group D1 (e.g., 12,557+0.596*2,387=13,980) and 9,460 redistributed impression counts for the female demographic group D2 (e.g., 8,496+0.404*2,387=9,460) by applying (e.g., multiplying) the respective gender impression distribution of Table 1 to the unknown gender impressions. In the example of Table 2, the demographic distributor 318 determines 17,107 redistributed impression counts for the male demographic group D1 (e.g., 15,751+0.568*2,387=17,107) and 13,018 redistributed impression counts for the female demographic group D2 (e.g., 15,751+0432*2,387=13,108) by applying (e.g., multiplying) the respective gender impression distribution of Table 2 to the unknown gender impressions. In the example of Table 3, the demographic distributor 318 determines 22,777 redistributed impression counts for the male demographic group D1 (e.g., 21,345+0.60*2,387=22,777) and 17,744 redistributed impression counts for the female demographic group D2 (e.g., 16,789+0.40*2,387=17,744) by applying (e.g., multiplying) the respective gender impression distribution of Table 3 to the unknown gender impressions. In the example of Table 4, the demographic distributor 318 determines 43,898 redistributed impression counts for the male demographic group D1 (e.g., 42,434+0.66*2,387=43,898) and 22,601 redistributed impression counts for the female demographic group D2 (e.g., 21,789+0.34*2,387=22,601) by applying (e.g., multiplying) the respective gender impression distribution of Table 4 to the unknown gender impressions. As shown in Tables 1-4, the total DP impression counts are equal to the respective total redistributed impressions. Equation 4 below may be used to implement block 514.

$$rDPImps_{b/s/p/e,y,x,d} = Imps_{b/s/p/e,y,x,a,g} + (Imps_{b/s/p/e,y,x,a,0} * gImpsRatio_{b/s/p/e,y,x,a,g}) \quad \text{(Equation 4)}$$

The demographic distributor 318 distributes the unknown gender durations (block 516). For example, the demographic distributor 318 may distribute the unknown duration impressions to generate redistributed durations $rDPDuration_{b/s/p/e,y,x,d}$ by applying the gender duration distribution $gDurationRatio_{b/s/p/e,y,x,a,g}$ of Tables 1, 2, 3, and/or 4, to the durations, of Tables 1, 2, 3, and/or 4, respectively, for which the gender is unknown (e.g., unknown gender durations) ($Duration_{b/s/p/e,y,x,a,0}$) for the selected brand b/sub-brand s/asset p/episode e, platform y, device type x, and age group a. In the example of Table 1, the demographic distributor 318 determines a redistributed duration of 153,307 minutes for the male demographic group D1 (e.g., 138,868 minutes+0.604*23,906 minutes=13,980 minutes) and a redistributed duration of 100,471 minutes for the female demographic group D2 (e.g., 91,004 minutes+0.396*23,906 minutes=100,471 minutes) by applying (e.g., multiplying) the respective gender duration distribution of Table 1 to the unknown gender duration. In the example of Table 2, the demographic distributor 318 determines a redistributed duration of 188,389 minutes for the male demographic group D1 (e.g., 175,312 minutes+0.547*23,906 minutes=188,389 minutes) and a redistributed duration of 155,948 minutes for the female demographic group D2 (e.g., 145,119 minutes+0.432*23,906 minutes=155,948 minutes) by applying (e.g., multiplying) the respective gender duration distribution of Table 2 to the unknown gender durations. In the example of Table 3, the demographic distributor 318 determines a redistributed duration of 223,826 minutes for the male demographic group D1 (e.g., 211,467 minutes+0.517*23,906 minutes=223,826 minutes) and a redistributed duration of 209,198 minutes for the female demographic group D2 (e.g., 197,651 minutes+0.483*23,906 minutes=209,198 minutes) by applying (e.g., multiplying) the respective gender duration distribution of Table 3 to the unknown gender duration. In the example of Table 4, the demographic distributor 318 determines a redistributed duration of 305,900 minutes for the male demographic group D1 (e.g., 292,178 minutes+0.574*23,906 minutes=305,900 minutes) and a redistributed duration of 226,966 minutes for the female demographic group D2 (e.g., 216,782 minutes+0.426*23,906 minutes=226,966 minutes) by applying (e.g., multiplying) the respective gender duration distribution of Table 4 to the unknown gender duration. As shown in Tables 1-4, the total DP durations are equal to the respective total redistributed durations. Equation 5 below may be used to implement block 516.

$$rDPDuration_{b/s/p/e,y,x,d} = Duration_{b/s/p/e,y,x,a,g} + (Duration_{b/s/p/e,y,x,a,0} * gDurationRatio_{b/s/p/e,y,x,a,g}) \quad \text{(Equation 5)}$$

The demographic distributor 318 distributes the unknown gender audience (block 518). For example, the demographic distributor 318 may distribute the unknown gender audience to generate redistributed unique audiences $rDPUA_{b/s/p/e,y/x,d}$ by applying the gender audience distribution $gUARatio_{b/s/p/e,y,x,a,g}$ of Tables 1, 2, 3, and/or 4, to the unique audience counts, of Tables 1, 2, 3, and/or 4, respectively, for which the gender is unknown (e.g., unknown gender audience) ($UA_{b/s/p/e,y,x,a,0}$) for the selected brand b/sub-brand s/asset p/episode e, platform y, device type x, and age group a. In the example of Table 1, the demographic distributor 318 determines 116 redistributed unique audience members (e.g., a redistributed unique audience count) for the male demographic group D1 (e.g., 105+0.547*20=116) and 96 redistributed unique audience members for the female demographic group D2 (e.g., 87+0.453*20=96) by applying (e.g., multiplying) the respective gender audience distribution of Table 1 to the unknown gender unique audience. In the example of Table 2, the demographic distributor 318 determines 133 redistributed unique audience members for the male demographic group D1 (e.g., 125+0.386*20=133) and 212 redistributed unique audience members for the female demographic group D2 (e.g., 200+0.615*20=212) by applying (e.g., multiplying) the respective gender audience distribution of Table 2 to the unknown gender unique audience. In the example of Table 3, the demographic distributor 318 determines 259 redistributed unique audience members for the male demographic group D1 (e.g., 250+0.455*20=259) and 311 redistributed unique audience members for the female demographic group D2 (e.g., 300+0.545*20=311) by applying (e.g., multiplying) the respective gender audience distribution of Table 3 to the unknown gender unique audience. In the example of Table 4, the demographic distributor 318 determines 360 redistributed unique audience members for the male demographic group D1 (e.g., 352+0.425*20=360) and 488 redistributed unique audience members for the female demographic group D2 (e.g., 476+0.575*20=488) by applying (e.g., multiplying) the respective gender audience distribution of Table 4 to the unknown gender unique audience. As shown in Tables 1-4, the total DP unique audiences are equal to the respective total redistributed unique audiences. Equation 6 below may be used to implement block 518.

$$rDPUA_{b/s/p/e,y/x,d} = UA_{b/s/p/e,y/x,a,g} + (UA_{b/s/p/e,y/x,a,o} * gUARatio_{b/s/p/e,y/x,a,g})$$ (Equation 6)

In examples disclosed herein, the redistributed audience (e.g., $rDPUA_{b/s/p/e,y/x,a,g}$), when determined at the episode level, is determine for each platform y but not device type x.

The demographic distributor 318 determines whether there are additional combinations of brand b/sub-brand s/asset p/episode e, platform y, device type x, and age group a (block 520). If there are additional combinations (e.g., combinations for which the redistributed impression counts, the redistributed durations, and the redistributed unique audience counts are to be created) (block 520), control returns to block 512. When there are no more combinations of brand b/sub-brand s/asset p/episode e, platform y, device type x, and age group a (block 520), the example instructions 500 of FIG. 5 end.

In some other examples, the instructions 500 of FIG. 5 are performed for combinations of a first time segment level including demographic data corresponding to a brand b, sub-brand s, asset p, segment z; a second time segment level including demographic data corresponding to a brand b and a segment z; a cross-publisher level including demographic data corresponding to a platform y, a brand b, a segment z, and an age group a; and/or a text/video (T/V) segment level including demographic data corresponding to a content type c (e.g., either text content t, video content v, or both text content and video content w), a brand b, a segment z, and a platform y.

Figure 6:
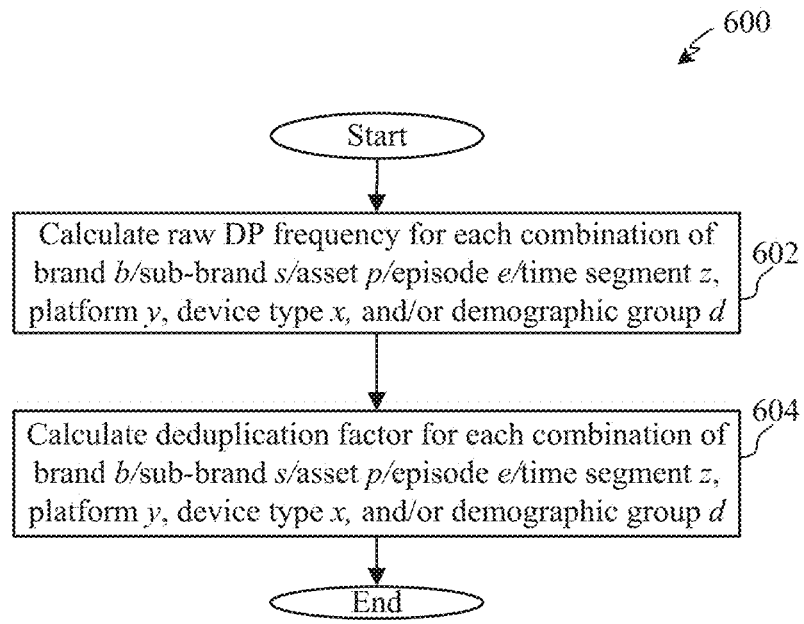
FIG. 6 is a flowchart representative of example machine readable instructions which may be executed to implement the audience data generator of FIGS. 1-3 to calculate a frequency and a deduplication factor associated with database proprietor demographic data at an episode level.

FIG. 6 is a flowchart representative of example machine readable instructions 600 which may be executed to implement the audience data generator 120 of FIGS. 1-3 to calculate raw measures for the demographic groups using redistributed demographic information. The example instructions 600 are described below with reference to the example distributed demographic data calculator 320 of FIG. 3.

The example instructions 600 may be executed to implement the distributed demographic data calculator 320 to calculate frequencies and deduplication factors at the episode-level e, the asset-level p, the sub-brand level s, the brand-level b, the second time segment level, and/or the cross-publisher level. In some examples, the example instructions 600 may include calculating duration-per-impression (DPI) measures at the first time segment level. In examples disclosed herein, the distributed demographic data calculator 320 receives redistributed demographic data from the demographic distributor 318. The redistributed demographic data received from the demographic distributor includes redistributed impressions (e.g., $rDPImps_{b/s/p/e,y,x,d}$ (e.g., at the example episode-level e, the example asset-level p, the example sub-brand level s, the example brand-level b, the example first time segment level, the example second time segment level, and/or the example cross-publisher level), redistributed audiences $rDPUA_{b/s/p/e,y/x,d}$ (e.g., at the example episode-level e, the example asset-level p, the example sub-brand level s, and the example brand-level b, and/or the example cross-publisher level), and/or redistributed durations $rDPDuration_{b,s,p,i,y,x,d}$ (e.g., at the example first time segment level).

The example episode FC 343 receives the redistributed impressions $rDPImps_{b,s,p,e,y,x,d}$ and the redistributed audiences $rDPUA_{b,s,p,e,y,d}$ at the at the example episode-level e, the example asset-level p, the example sub-brand level s, the example brand-level b, the example first time segment level, the example second time segment level, and/or the example cross-publisher level (e.g., from FIG. 5). Additionally, the episode DFG 344 receives the redistributed audiences $rDPUA_{b,s,p,e,y,d}$ at the at the example episode-level e, the example asset-level p, the example sub-brand level s, the example brand-level b, the example first time segment level, the example second time segment level, and/or the example cross-publisher level. In the example instructions 600 of FIG. 6, the episode FC 343 calculates raw database proprietor frequency for each combination of brand b/sub-brand s/asset p/episode e/time segment z, platform y, device type x, and/or demographic group d (e.g., $rDPFreq_{b,s,p,e,y,d}$) (block 602). The episode FC 343 calculates the episode-level frequency $rDPFreq_{b,s,p,e,y,d}$ by dividing, for each combination of brand b/sub-brand s/asset p/episode e/time segment z, platform y, device type x, and/or demographic group d, the redistributed impressions (e.g., $rDPImps_{b,s,p,e,y,x,d}$) across all device types x (e.g., $rDPImps_{b,s,p,e,y,d}$) by the redistributed audiences (e.g., $rDPUA_{b,s,p,e,y,d}$). In some examples, the episode-level frequency $rDPFreq_{b,s,p,e,y,d}$ is not calculated for each device type x at the episode-level e because the unique audience counts at the episode-level e (e.g., $UA_{b,s,p,e,y,a,g}$) provided by the DP 116 of FIGS. 1 and/or 2 are not organized by device type x. Equation 7 below may be used to implement block 602.

$$rDBFreq_{b,s,p,e,y,d} = rDPImps_{b,s,p,e,y,d}/rDPUA_{b,s,p,e,y,d}$$ (Equation 7)

The episode DFG 344 calculates a deduplication factor (e.g., $Dedup\_F_{TD,b,s,p,e,d}$) for each combination of brand b/sub-brand s/asset p/episode e/time segment z, platform y, device type x, and/or demographic group d (block 604). For example, the episode DFG 344 may calculate, for each combination of brand b/sub-brand s/asset p/episode e/time segment z, platform y, device type x, and/or demographic group d, the episode-level deduplication factor $Dedup\_F_{TD,b,s,p,e,d}$ by dividing an episode-level gender audience attributed to both the mobile computing platform and the non-mobile computing platform (e.g., the total digital platform), (e.g., $rDPUA_{TD,b,s,p,e,d}$), a duplicated episode-level audience, by a sum of an episode-level gender audience attributed to the non-mobile computing platform (e.g., $rDPUA_{Desktop,b,s,p,e,d}$) and an episode-level gender audience attributed to the mobile computing platform (e.g., $rDPUA_{Mobile,b,s,p,e,d}$). Equation 8 below may be used to implement block 604.

$$Dedup\_F_{TD,b,s,p,e,d} = rDPUA_{TD,b,s,p,e,d} / rDPUA_{Desktop,b,s,p,e,d} + rDPUA_{Mobile,b,s,p,e,d}$$ (Equation 8)

After calculating the deduplication factor, the example instructions 600 end. In some examples, the raw DP frequency (block 602) and the deduplication factor (block 604) may be calculated for combinations of brand b, sub-brand s, asset p, platform y, device type x, and demographic group d; combinations of brand b, sub-brand s, platform y, device type x, and demographic d; and/or Calculate raw DP frequency for each brand b, platform y, device type x, and demographic group d.

Figure 7:
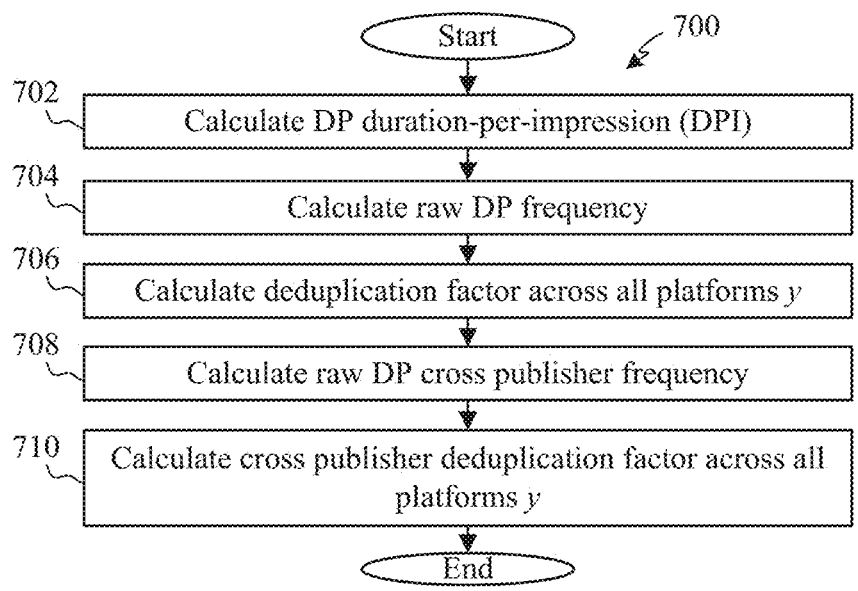
FIG. 7 is a flowchart representative of example machine readable instructions which may be executed to implement the audience data generator of FIGS. 1-3 to calculate a frequency and a deduplication factor associated with database proprietor demographic data at the time segment level and the cross-publisher level.

FIG. 7 is a flowchart representative of example machine readable instructions 700 which may be executed to implement the audience data generator of FIGS. 1-3 to calculate a frequency and a deduplication factor associated with database proprietor demographic data at the time segment level and the cross-publisher level.

The distributed demographic data calculator 320 calculates raw measures associated with demographic data redistributed at the first time segment level, the second time segment level, and the cross-publisher level based on the example instructions 700 of FIG. 7. In examples disclosed herein, the DPI calculator 340 receives the redistributed impressions rDPImps$_{b,s,p,i,y,x,d}$ and the redistributed durations rDPDuration$_{b,s,p,i,y,x,d}$ from the demographic distributor 318 (e.g., at the first time segment level). The segment FC 341 receives the redistributed impressions rDPImps$_{b,i,y,x,d}$ and the redistributed audiences rDPUA$_{b,i,y,x,d}$ from the demographic distributor 318 (e.g., at the second time segment level). The segment DFG 342 receives the redistributed audiences rDPUA$_{b,i,y,x,d}$ from the demographic distributor 318 (e.g., at the second time segment level). Additionally, the CP-FC 351 receives the redistributed impressions rDBCPImps$_{b,i,y,d}$ and the redistributed audience counts rDBCPUA$_{b,i,y,d}$ from the demographic distributor 318 (e.g., cross-publisher level).

The DPI calculator 340 of FIG. 3 calculates a duration-per-impression (DPI) measure (e.g., rDPDPI$_{b,s,p,i,y,x,d}$) (block 702). For example, the DPI calculator 340 may calculate the DPI measure, for each combination of brand b, sub-brand s, asset p, segment z, platform y, device type x, and demographic d, by dividing a respective redistributed duration rDPDuration$_{b,s,p,i,y,x,d}$ by a respective redistributed impressions rDPImps$_{b,s,p,i,y,x,d}$. Equation 9 below may be used to implement block 702.

$$\text{rDPDPI}_{b,s,p,i,y,x,d} = \text{rDPDuration}_{b,s,p,i,y,x,d} / \text{rDPImps}_{b,s,p,i,y,x,d} \quad \text{(Equation 9)}$$

The segment FC 341 calculates a segment level frequency (e.g., rDPFreq$_{b,i,y,d}$) (block 704). For example, the segment FC 341 may calculate the segment level frequency rDPFreq$_{b,i,y,d}$ (e.g., at the second time segment level) by dividing, for each combination of brand b, segment z, platform y, and demographic d, respective redistributed impressions rDPImps$_{b,i,y,x,d}$ across all device types x (e.g., rDPImps$_{b,i,y,d}$) by a respective redistributed audience rDPUA$_{b,i,y,x,d}$ across all device types x (e.g., rDPUA$_{b,i,y,d}$). Equation 10 below may be used to implement block 704.

$$\text{rDPFreq}_{b,i,y,d} = \text{rDPImps}_{b,i,y,d} / \text{rDPUA}_{b,i,y,d} \quad \text{(Equation 10)}$$

The segment DFG 342 calculates a segment level deduplication factor (e.g., Dedup_F$_{TD,b,i,d}$) (block 706). For example, the segment DFG 342 may calculate, for each combination of brand b, segment z, and demographic group d, the segment-level deduplication factor Dedup_F$_{TD,b,i,d}$ by dividing a segment level gender audience attributed to the total digital platform (e.g., rDPUA$_{TD,b,i,d}$), a duplicated segment-level audience, by a sum of a segment-level gender audience attributed to the non-mobile computing platform (e.g., rDPUA$_{Desktop,b,i,d}$) and a segment-level gender audience attributed to the mobile computing platform (e.g., rDPUA$_{Mobile,b,i,d}$). In some examples, the duplicated segment-level audience (e.g., rDPUA$_{TD,b,i,d}$), the segment-level gender audience attributed to the non-mobile computing platform (e.g., rDPUA$_{Desktop,b,i,d}$), and the segment-level gender audience attributed to the mobile computing platform (e.g., rDPUA$_{Mobile,b,i,d}$) are derived from the redistributed audiences rDPUA$_{b,i,y,x,d}$ across all device types x. Equation 11 below may be used to implement block 706.

$$\text{Dedup\_F}_{TD,b,i,d} = \text{rDPUA}_{TD,b,i,d} / (\text{rDPUA}_{Desktop,b,i,d} + \text{rDPUA}_{Mobile,b,i,d}) \quad \text{(Equation 11)}$$

The CP-FC 351 calculates a cross-publisher level frequency (e.g., rDPCPFreq$_{b,i,y,d}$) (block 708). For example, the CP-FC 351 may calculate the cross publisher level frequency rDPCPFreq$_{b,i,y,d}$ by dividing, for each combination of brand b, segment z, platform y, and demographic d, respective redistributed impressions rDPCPImps$_{b,i,y,x,d}$ across all device types x (e.g., rDPCPImps$_{b,i,y,d}$) by a respective redistributed audience rDPCPUA$_{b,i,y,x,d}$ across all device types x (e.g., rDPCPUA$_{b,i,y,d}$). Equation 12 below may be used to implement block 708.

$$\text{rDPCPFreq}_{b,i,y,d} = \text{rDPCPImps}_{b,i,y,d} / \text{rDPCPUA}_{b,i,y,d} \quad \text{(Equation 12)}$$

The CP-DFG 352 calculates a cross publisher level deduplication factor (e.g., Dedup_F_CP$_{TD,b,i,d}$) (block 710). For example, the CP-DFG 352 may calculate, for each combination of brand b, segment z, and demographic group d, the cross-publisher level deduplication factor Dedup_F_CP$_{TD,b,i,d}$ by dividing a cross-publisher level gender audience attributed to the total digital platform (e.g., rDPCPUA$_{TD,b,i,d}$), a duplicated cross publisher level audience, by a sum of a cross-publisher level gender audience attributed to the non-mobile computing platform (e.g., rDPCPUA$_{Desktop,b,i,d}$) and a cross-publisher level gender audience attributed to the mobile computing platform (e.g., rDPCPUA$_{Mobile,b,i,d}$). Equation 13 below may be used to implement block 710.

$$\text{Dedup\_F\_CP}_{TD,b,i,d} = \text{rDPCPUA}_{TD,b,i,d} / (\text{rDPCPUA}_{Desktop,b,i,d} + \text{rDPUA}_{Mobile,b,i,d}) \quad \text{(Equation 13)}$$

The example instructions 700 end.

Misattribution Correction Matrix Generation and Transformation

FIG. 8 illustrates an example misattribution correction matrix 800 (e.g., for a particular brand b and device type x) generated by the matrix generator 322. The example matrix generator 322 may generate the example misattribution correction matrix 800 as described in U.S. Patent Publication No. 2015/0262207. The entirety of U.S. Patent Publication No. 2015/0262207 is incorporated herein by reference. In the illustrated example of FIG. 8, the columns of the misattribution correction matrix 800 (database proprietor demographic groups i 802) represent demographic groups identified by the DP 116 associated with impression information, and the rows of the misattribution correction matrix 800 (actual demographic groups j 804) represent the demographic groups actually viewing the media 206 of FIG. 2 and corresponding to the survey calibration data.

Each cell of the misattribution correction matrix 800 corresponding to a demographic group i 802 and a demographic group j 804 includes a probability (e.g., represented as a percentage). In examples disclosed herein, the probability is a probability that (1) a person of the demographic group j is identified by the DP 116 as a viewer of the media 206 and (2) a person in the actual demographic group j is an actual viewer of the media 206. Thus, when a person is identified by the DP 116 as being a person in the demographic group i, the actual or true viewer is a person in the actual viewer demographic group j, determined from the survey calibration data. As shown in FIG. 8, the values of each of the columns sum to 100%. Therefore, all of the impression information attributed to recognized demographic group i is accounted for.

Figure 9:
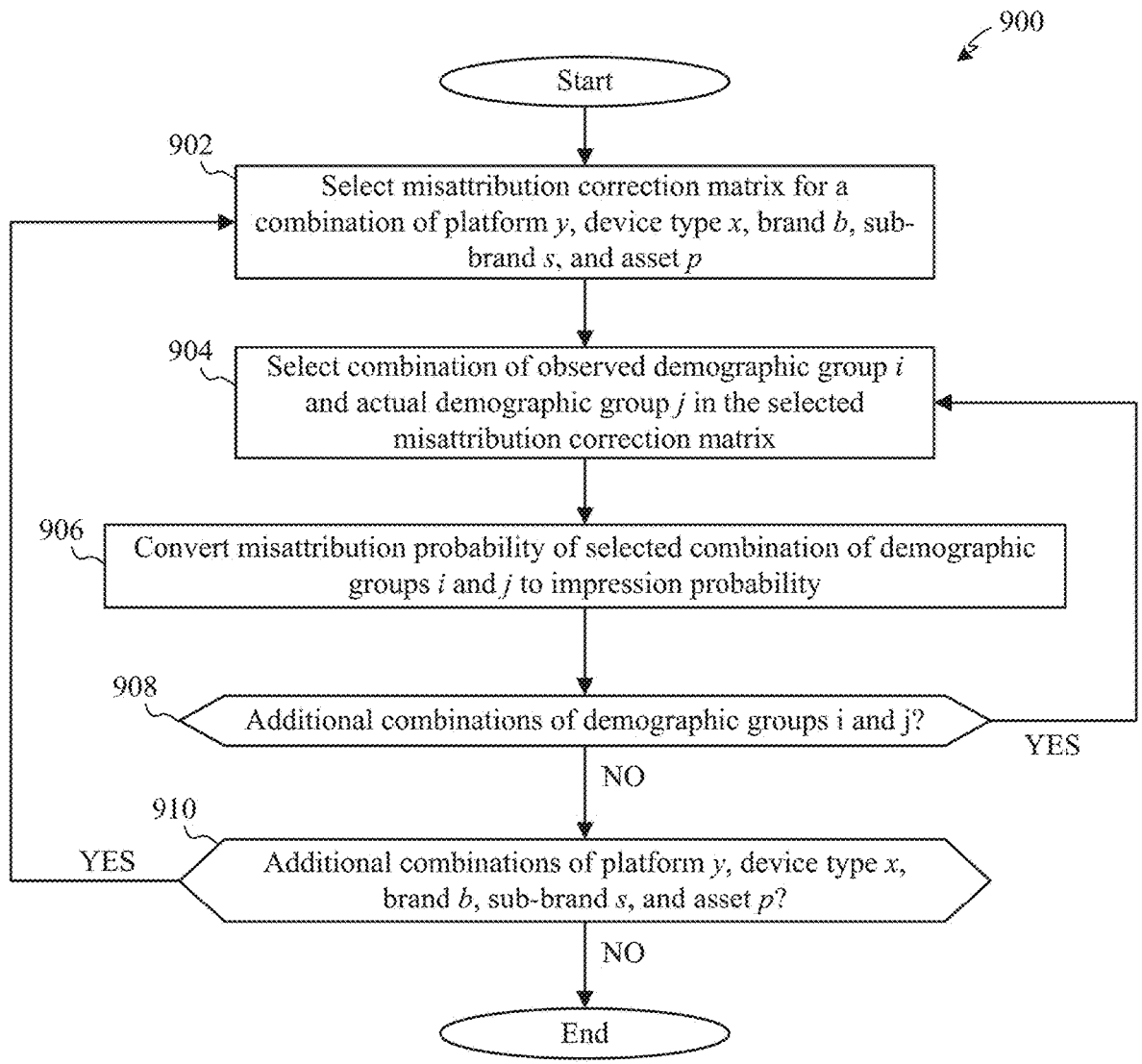
FIG. 9 is a flowchart representative of example machine readable instructions which may be executed to implement the audience data generator of FIGS. 1-3 to convert the misattribution correction matrix to an impressions count matrix.

FIG. 9 is a flow chart representative of example machine readable instructions 900 which may be executed to implement the audience data generator 120 of FIGS. 1, 2, and/or 3 to convert or transform the misattribution correction matrices into impression count matrices $IM_{b,s,p,y,x,d}$. The example matrix converter 353 of FIG. 3 may perform the instructions 900 of FIG. 9 to convert the misattribution correction matrices generated by the matrix generator 322 to impression count matrices for each combination of brand b and device type x. In examples disclosed herein, the impression count matrices are generated using the asset-level frequencies $rDPFreq_{b,s,p,y,x,d}$ generated by the asset FC 345 of FIG. 3. The matrix converter 353 may apply a conversion formula, or a conversion equation, to each cell of each of the misattribution correction matrices to convert the misattribution correction matrices to impression count matrices.

The matrix converter 353 may obtain asset-level frequencies (e.g., $rDPFreq_{b,s,p,y,x,d}$) from the asset FC 345 of FIG. 3. The matrix converter 353 also obtains and/or accesses the misattribution correction matrices (e.g., the example misattribution correction matrix 800 of FIG. 8) generated by the matrix generator 322 for each combination of brand b and device type x.

The matrix converter 353 selects a misattribution correction matrix 800 for a combination of a device type x, a platform y, a brand b, a sub-brand s and an asset p (block 902).

The matrix converter 353 selects a combination of demographic groups i and j in the selected misattribution matrix 800 (block 904). For example, the matrix converter 353 may select one of the demographic groups i and one of the demographic groups j of the selected misattribution matrix. To illustrate, the matrix converter 353 may select the "D1" (e.g., Female, ages 02-12) demographic group from the database proprietor demographic group i 802 and the "D1" (e.g., Female, ages 02-12) demographic group from the actual demographic group j 804 in the misattribution correction matrix 800.

The matrix converter 353 converts a misattribution probability of the selected combination of demographic groups i and j to an impression probability (block 906). For example, the matrix converter 353 may use Equation 14 below to implement block 906 for a selected probability (e.g., cell) of the misattribution matrix 800 of FIG. 9 to convert each cell of a misattribution matrix to an impression probability.

$$IM_{b,s,p,y,x,DPDemo_pTrueDemo_j} = \\ (M_{b,x,DPDemo_pTrueDemo_{j,x}} rDPFreq^{b,s,p,y,x,d})/(\Sigma_{j=1}^{d} \\ M_{b,x,DPDemo_pTrueDemo_{j,x}} rDPFreq^{b,s,p,y,x,d})$$ (Equation 14)

The matrix converter 353 determines whether there are additional combinations of demographic groups i and j (block 908). If there are additional combinations of demographic groups i and j, control returns to block 904 to select another combination of demographic groups i and j. When there are no more combinations of the demographic groups i and j (block 908), the example matrix converter 353 determines whether there are additional combinations of platform y, device type x, brand b, sub-brand s, and asset p (block 910). If there are additional combinations, the example instructions 900 return to block 902 to select another misattribution correction matrix for conversion. In this manner, the matrix converter 353 converts each misattribution correction matrix corresponding to a brand b and a device type x to an impression counts matrix including impression probabilities for each brand b, sub-brand s, asset p, platform y, and device type x. When there are no additional combinations of platform y, device type x, brand b, sub-brand s, and asset p (block 910), the example instructions 900 of FIG. 9 end.

Figure 10:
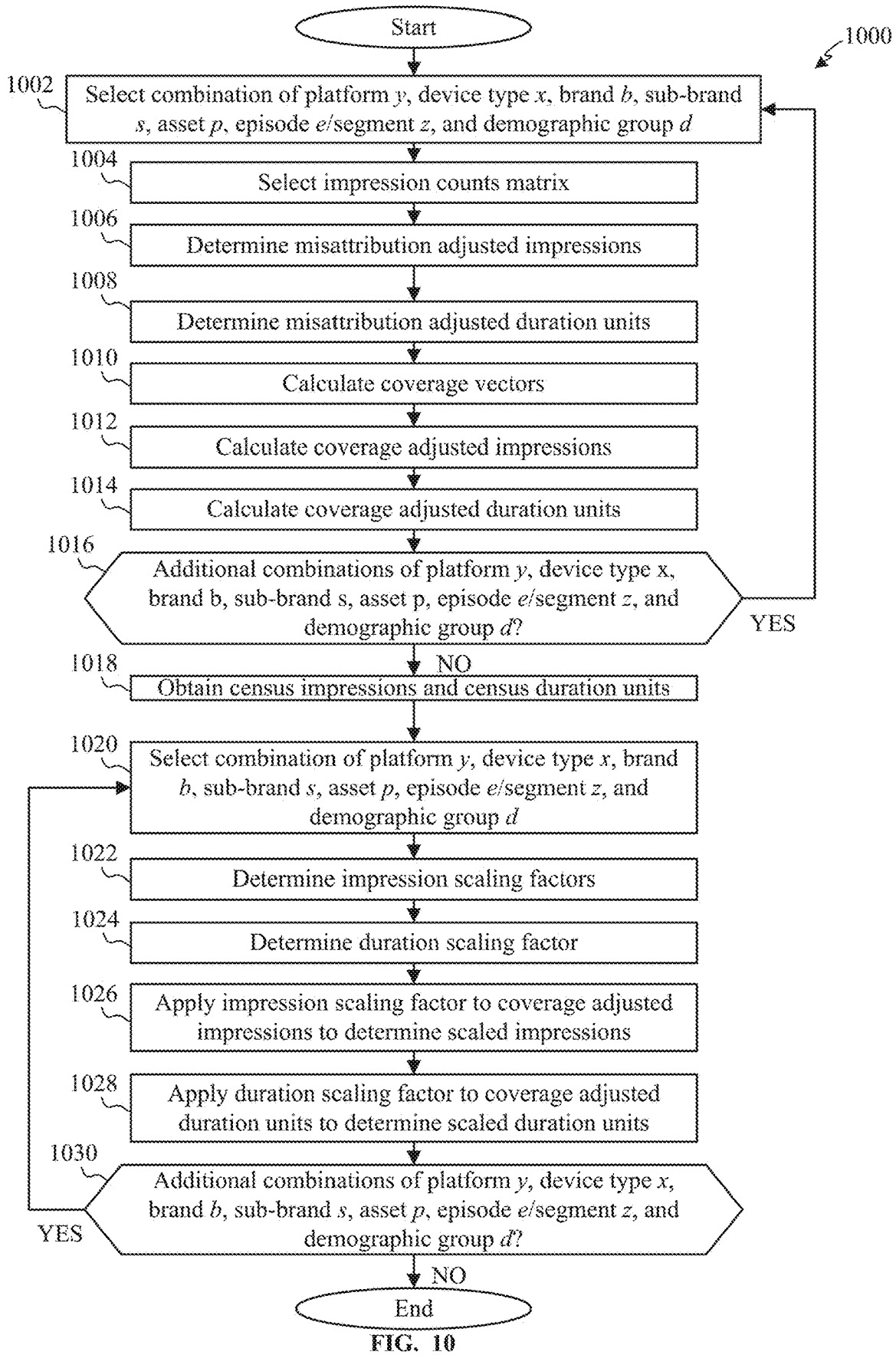
FIG. 10 is a flowchart representative of example machine readable instructions which may be executed to implement the audience data generator of FIGS. 1-3 to compensate impression data for inaccuracies related to demographic misattribution and database proprietor non-coverage at the episode level and the time segment level.

Sharing Adjustments, Coverage Adjustments, and Scaling at the Episode-Level and the First Time Segment Level FIG. 10 is a flow chart representative of example machine readable instructions 1000 which may be executed to implement the audience data generator 120 of FIGS. 1-3 to compensate impression data for inaccuracies related to demographic misattribution and database proprietor coverage at the episode level e and the first time segment level. The example E-S adjuster 324 of FIG. 3 may perform the instructions 1000 of FIG. 10 to adjust the redistributed impressions $rDPImps_{b,s,p,e,y,x,d}$ and $rDPImps_{b,s,p,i,y,x,d}$ at the episode-level and the first time segment level, respectively, and to adjust the redistributed durations $rDPDuration_{b,s,p,e,y,x,d}$ and $rDPDuration_{b,s,p,i,y,x,d}$ at the episode-level and the first time segment level, respectively, to compensate for misattribution and coverage error.

The impression sharing adjuster 354 and the duration sharing adjuster 355 receive the redistributed impressions $rDPImps_{b,s,p,e,y,x,d}$ and $rDPImps_{b,s,p,i,y,x,d}$ and the redistributed durations $rDPDuration_{b,s,p,e,y,x,d}$ and $rDPDuration_{b,s,p,i,y,x,d}$ from the demographic distributor 318 of FIG. 3. Additionally, the impression sharing adjuster 354 receives and/or obtains the impression count matrices from the matrix converter 353 of FIG. 3.

Because the E-S adjuster 324 may execute similar instructions to perform the example instructions 1000 at any of the episode-level and the first time segment level, the example instructions 1000 of FIG. 10 are described below using the episode level and the first time segment level in the alternative (e.g., episode/segment).

The E-S adjuster 324 selects a combination of platform y, device type x, brand b, sub-brand s, episode e/segment z, and demographic d (block 1002). The E-S adjuster 324 selects an impression counts matrix (block 1004). For example, the E-S adjuster 324 selects an impression matrix corresponding to the selected platform y, device type x, brand b, sub-brand s, and asset p. The impressions sharing adjuster 354 determines misattribution adjusted impressions (block 1006). In examples disclosed herein, the impressions sharing adjuster 354 applies (e.g., performs a dot product calculation) the selected impression counts matrix (e.g., $IM_{b,s,p,y,x,d}$) to the redistributed impressions (e.g., $rDPImps_{b,s,p,e,y,x,d}/rDPImps_{b,s,p,i,y,x,d}$) corresponding to the selected combination of platform y, device type x, brand b, sub-brand s, episode e/segment z, and demographic d. For example, the impressions sharing adjuster 354 multiplies each cell of the impression counts matrix to the redistributed impressions to determine misattribution adjusted impressions (e.g., $mImps_{b,s,p,y,x,e/i,d}$) for each demographic d.

The duration sharing adjuster 355 determines misattribution adjusted durations (block 1008). In examples disclosed herein, the duration sharing adjuster 355 applies (e.g., performs a dot product calculation) the selected impression counts matrix (e.g., $IM_{b,s,p,y,x,d}$) to the redistributed durations (e.g., $rDPDuration_{b,s,p,e,y,x,d}/rDPDuration_{b,s,p,i,y,x,d}$) corresponding to the selected combination of platform y, device type x, brand b, sub-brand s, episode e/segment z, and demographic d. For example, the duration sharing adjuster 355 multiplies each cell of the impression counts matrix to the redistributed durations to determine misattribution adjusted durations (e.g., $mDuration_{b,s,p,y,x,e/i,d}$) for each demographic d.

The coverage vector calculator 356 calculates coverage adjustment vectors (block 1010). The coverage vector calculator 356 receives survey calibration data from the calibration data collector 300 of FIG. 3. The coverage vector calculator 356 calculates coverage adjustment vectors (e.g., $C_{b,x}$) for each combination of brand b and device type x using the survey calibration data. The coverage vector calculator determines a total number of respondents in a demographic group with access to a device of a device type x and media (e.g., the media 206 of FIG. 2) provided by a brand b and divides by a covered portion of respondents (e.g., recognized by the DP 116) in the demographic group for a device type x and a brand b.

The impressions coverage adjuster 357 calculates coverage adjusted impressions (block 1012). In examples disclosed herein, the impressions coverage adjuster 357 receives the misattribution adjusted impressions $mImps_{b,s,p,y,x,e/i,d}$ from the impressions sharing adjuster 354 and the coverage adjustment vectors $C_{b,x}$ from the coverage vector calculator 356. The impressions coverage adjuster 357 multiplies the misattribution adjusted impressions by a coverage adjustment vector $C_{b,x}$ corresponding to the selected brand b and device type x. The resultant product is coverage adjusted impressions $cImps_{b,s,p,e/i,y,x,d}$. Equation 15 below may be used to implement block 1012.

$$cImps_{b,s,p,e/i,y,x,d} = mImps_{b,s,p,e/i,y,x,d} * C_{b,x} \quad \text{(Equation 15)}$$

The duration coverage adjuster 358 calculates coverage adjusted durations (block 1014). In examples disclosed herein, the duration coverage adjuster 358 receives the misattribution adjusted durations $mDuration_{b,s,p,y,x,e/i,d}$ from the duration sharing adjuster 355 and the coverage adjustment vectors $C_{b,x}$ from the coverage vector calculator 356. The duration coverage adjuster 358 multiplies misattribution adjusted durations by a coverage adjustment vector $C_{b,x}$ corresponding to the selected brand b, and device type x. The resultant product is coverage adjusted durations $cDuration_{b,s,p,e/i,y,x,d}$. Equation 16 below may be used to implement block 1014.

$$cDuration_{b,s,p,e/i,y,x,d} = mDuration_{b,s,p,e/i,y,x,d} * C_{b,x} \quad \text{(Equation 16)}$$

The E-S adjuster 324 determines whether there are additional combinations of brand b, sub-brand s, asset p, episode e/segment z, platform y, device type x, and demographic d (block 1016). If there are additional combinations, the example instructions 1000 return to block 1002. When the E-S adjuster 324 determines no additional combinations of brand b, sub-brand s, asset p, episode e/segment z, platform y, device type x, and demographic d are available (block 1016), the E-S adjuster 324 obtains census impression counts $SCImps_{b,s,p,e/i,y,x,d}$ and census durations $SCDuration_{b,s,p,e/i,y,x,d}$ from the monitored website (e.g., the web site census) corresponding to the brand b, sub-brand s, asset p, episode e/segment z, platform y, device type x, and demographic d (block 1018).

The E-S adjuster 324 selects a combination of brand b, sub-brand s, asset p, episode e/segment z, platform y, device type x, and demographic d (block 1020). The impression scaling factor generator 359 obtains the census impression counts $SCImps_{b,s,p,e/i,y,x,d}$ and receives the coverage adjusted impressions $cImps_{b,s,p,e/i,y,x,d}$ from the impressions coverage adjuster 357. The impression scaling factor generator 359 determines an impression scaling factor (block 1022). The impression scaling factor generator 359 generates, or calculates, for the selected combination of brand b, sub-brand s, asset p, episode e/segment z, platform y, device type x, and demographic d, an impression scaling factor $ISF_{b,s,p,e/i,y,x,d}$ by dividing a corresponding census impression count $SCImps_{b,s,p,e/i,y,x,d}$ by a sum of corresponding coverage adjusted impressions across all demographic groups d. Equation 17 below may be used to implement block 1022.

$$ISF_{b,s,p,e/i,y,x,d} = SCImps_{b,s,p,e/i,y,x,d} \Big/ \sum_{d=1}^{n} cImps_{b,s,p,e/i,y,x,d}, \quad \text{(Equation 17)}$$

The duration scaling factor generator 360 obtains the census durations $SCDuration_{b,s,p,e/i,y,x,d}$ and receives the coverage adjusted durations $cDuration_{b,s,p,e/i,y,x,d}$ from the duration coverage adjuster 358. The duration scaling factor generator 360 determines a duration scaling factor (block 1024). The duration scaling factor generator 360 calculates, for the selected combination of brand b, sub-brand s, asset p, episode e/segment z, platform y, device type x, and demographic d, a duration scaling factor $DSF_{b,s,p,e/i,y,x,d}$ by dividing a corresponding census duration $SCDuration_{b,s,p,e/i,y,x,d}$ by a sum of corresponding coverage adjusted durations across all demographic groups d. Equation 18 below may be used to implement block 1024.

$$DSF_{b,s,p,e/i,y,x,d} = SCDuration_{b,s,p,e/i,y,x,d} \Big/ \sum_{d=1}^{n} cDuration_{b,s,p,e/i,y,x,d} \quad \text{(Equation 18)}$$

The impression scaler 361 applies the impression scaling factor to the coverage adjusted impressions to determine scaled impressions (block 1026). In examples disclosed herein, the impressions scaler 361 receives the coverage adjusted impressions $cImps_{b,s,p,e/i,y,x,d}$ from the impressions coverage adjuster 357 and the impression scaling factor $ISF_{b,s,p,e/i,y,x,d}$ from the impression scaling factor generator 359. For each combination of brand b, sub-brand s, asset p, episode e/segment z, platform y, device type x, and demographic d, the impression scaler 361 applies (e.g., multiplies), corresponding coverage adjusted impressions by the impression scaling factor to determine scaled impressions $sImp_{b,s,p,e/i,y,x,d}$. Equation 19 below may be used to implement block 1026.

$$sImps_{b,s,p,e/i,y,x,d} = cImps_{b,s,p,e/i,y,x,d} * ISF_{b,s,p,e/i,y,x,d} \quad \text{(Equation 19)}$$

The duration scaler 362 applies the duration scaling factor to the coverage adjusted durations to determine scaled durations (block 1028). In examples disclosed herein, the duration scaler 362 receives the coverage adjusted durations $cDuration_{b,s,p,e/i,y,x,d}$ from the duration coverage adjuster 358 and the duration scaling factor $DSF_{b,s,p,e/i,y,x,d}$ from the duration scaling factor generator 360. For each combination of brand b, sub-brand s, asset p, episode e/segment z, platform y, device type x, and demographic d, the duration scaler 362 applies (e.g., multiplies), corresponding coverage adjusted durations by the duration scaling factor to determine scaled durations $sDuration_{b,s,p,e/i,y,x,d}$. Equation 20 below may be used to implement block 1028.

$$sDuration_{b,s,p,e/i,y,x,d} = cDuration_{b,s,p,e/i,y,x,d} * DSF_{b,s,p,e/i,y,x,d} \quad \text{(Equation 20)}$$

The E-S adjuster 324 determines whether there are additional combinations of brand b, sub-brand s, asset p, episode e/segment z, platform y, device type x, and demographic d (block 1030). If there are additional combinations, the example instructions return to block 1020. When the E-S adjuster 324 determines there are no additional combinations of brand b, sub-brand s, asset p, episode e/segment z, platform y, device type x, and demographic d (block 1030), the example instructions 1000 of FIG. 10 end.

Figure 11:
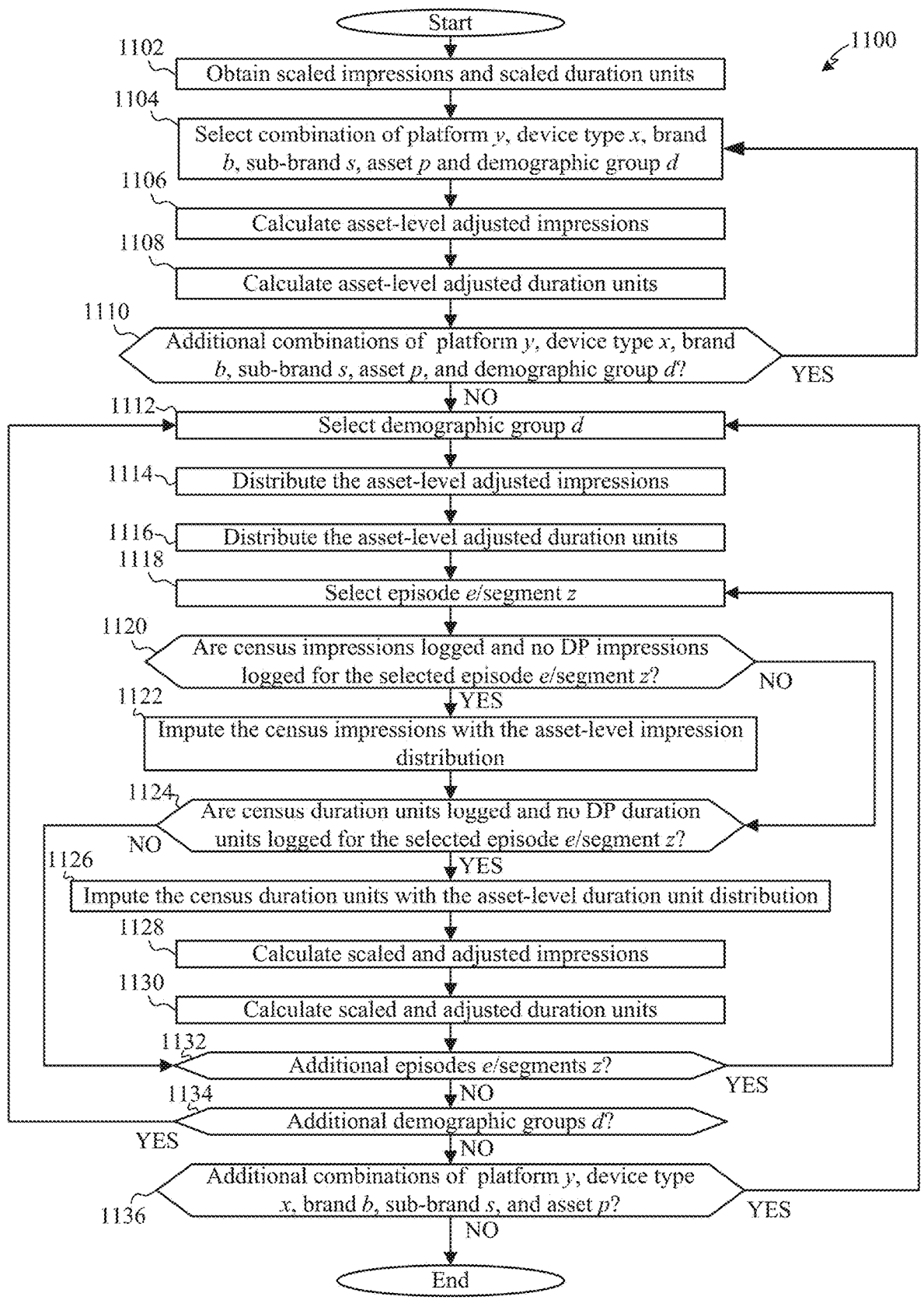
FIG. 11 is a flowchart representative of example machine readable instructions which may be executed to implement the audience data generator of FIGS. 1-3 to adjust database proprietor demographic data for demographic misattribution and database proprietor non-coverage at the episode level and the time segment level.

Adjusting, Scaling, and Imputation at the Episode Level and the First Time Segment Level FIG. 11 is a flow chart representative of example machine readable instructions 1100 which may be executed to implement the audience data generator 120 of FIGS. 1, 2, and/or 3 to adjust database proprietor demographic data and to impute cite census impression information. The example census imputer 326 of FIG. 3 may perform the instructions 1100 of FIG. 11 to adjust the scaled impressions $sImp_{b,s,p,e/i,y,x,d}$ and the scaled durations $sDuration_{b,s,p,e/i,y,x,d}$ at the asset-level and to impute cite census impressions $SCImps_{b,s,p,e/i,y,x,d}$ and cite census durations $SCDuration_{b,s,p,e/i,y,x,d}$.

Because the census imputer 326 may execute similar instructions to perform the example instructions 1100 at any of the episode-level and the first time segment level, the example instructions 1100 of FIG. 11 are described below using the episode level and the first time segment level in the alternative (e.g., episode/segment).

The census imputer 326 obtains the scaled impressions $sImp_{b,s,p,e/i,y,x,d}$ and the scaled durations $sDuration_{b,s,p,e/i,y,x,d}$ from the E-S adjuster 324 (block 1102). In examples disclosed herein, the impressions adder 363 obtains the scaled impressions $sImp_{b,s,p,e/i,y,x,d}$ and the duration adder 364 obtains the scaled durations $sDuration_{b,s,p,e/i,y,x,d}$. The census imputer 326 selects a combination of brand b, sub-brand s, asset p, platform y, device type x, and demographic d (block 1104).

The impressions adder 363 calculates asset-level adjusted impressions (block 1106). In examples disclosed herein, the impressions adder 363 adds, or sums, for each combination of brand b, sub-brand s, asset p, platform y, device type x, and demographic d, corresponding scaled impressions $sImp_{b,s,p,e/i,y,x,d}$ across all episodes e or segments i included in the selected asset p. For example, the impressions adder 363 scales, or rolls up, the scaled impressions across all episodes e/segments i of the selected asset p to generate asset-level adjusted impressions $as_{e/i}Imps_{b,s,p,y,x,d}$. Equation 21 below may be used to implement block 1106. In Equation 21, n is the total number of episode/segment components.

$$as_{e/i}Imps_{b,s,p,y,x,d} = \Sigma_{e/i=1}^{n} sImps_{b,s,p,e/i,y,x,d} \quad \text{(Equation 21)}$$

The duration adder 364 calculates asset-level adjusted durations (block 1108). In examples disclosed herein, the duration adder 364 adds, or sums, for each combination of brand b, sub-brand s, asset p, platform y, device type x, and demographic d, corresponding scaled durations $sDurations_{b,s,p,e/i,y,x,d}$ across all episodes e/segments i included in the selected asset p. For example, the duration adder 364 scales, or rolls up, the scaled durations across all episodes e/segments i of the selected asset p to generate asset-level adjusted durations $as_{e/i}Duration_{b,s,p,y,x,d}$. Equation 22 below may be used to implement block 1108. In Equation 22, n is the total number of episode/segment components.

$$as_{e/i}Duration_{b,s,p,y,x,d} = \Sigma_{e/i=1}^{n} sDuration_{b,s,p,e/i,y,x,d} \quad \text{(Equation 22)}$$

The census imputer 326 determines whether there are any additional combinations of brand b, sub-brand s, asset p, episode e/segment z, platform y, device type x, and demographic d (block 1110). If there are additional combinations (block 1110), the example instructions 1100 return to block 1104.

When the census imputer 326 determines there are no additional combinations of brand b, sub-brand s, asset p, episode e/segment z, platform y, device type x, and demographic d (block 1110), the census imputer 326 selects a demographic d (block 1112). The impressions distribution deriver 367 receives the asset-level adjusted impressions $as_{e/i}Imps_{b,s,p,y,x,d}$ and the sum of the asset-level adjusted impressions across all demographic groups d ($\Sigma_{d=1}^{n} as_{e/i}Imps_{b,s,p,y,x,d}$) from the impressions adder 363 and the impressions imputation adder 365, respectively.

The impressions distribution deriver 367 distributes the asset-level adjusted impressions (block 1114). In examples disclosed herein, the impressions distribution deriver 367 distributes the asset-level adjusted impressions $as_{e/i}Imps_{b,s,p,y,x,d}$ by dividing, for each combination of brand b, sub-brand s, asset p, platform y, device type x, and demographic d, a corresponding asset-level adjusted impression by a corresponding sum of asset-level adjusted impressions across all demographics d. The resulting distribution is referred to herein as an adjusted and scaled impression demographic distribution $as_{e/i}ImpDemoDistr_{b,s,p,y,x,d}$. Equation 23 below may be used to implement block 1114.

$$as_{e/i}ImpDemoDistr_{b,s,p,y,x,d} = as_{e/i}Imps_{b,s,p,y,x,d} / (\Sigma_{d=1}^{n} as_{e/i}Imps_{b,s,p,y,x,d}) \quad \text{(Equation 23)}$$

The duration distribution deriver 368 receives the asset-level adjusted durations $as_{e/i}Duration_{b,s,p,y,x,d}$ and the sum of the asset-level adjusted durations across all demographic groups d ($\Sigma_{d=1}^{n} as_{e/i}Duration_{b,s,p,y,x,d}$) from the duration adder 364 and the duration imputation adder 365, respectively. The duration distribution deriver 368 distributes the asset-level adjusted durations (block 1116). In examples disclosed herein, the duration distribution deriver 368 distributes the asset-level adjusted durations $as_{e/i}Duration_{b,s,p,y,x,d}$ by dividing, for each combination of brand b, sub-brand s, asset p, platform y, device type x, and demographic d, a corresponding asset-level adjusted duration by a corresponding sum of asset-level adjusted durations across all demographics d. The resulting distribution is referred to herein as an adjusted and scaled duration demographic distribution $as_{e/i}DurationDemoDistr_{b,s,p,y,x,d}$. Equation 24 below may be used to implement block 1116.

$$as_{e/i}DurationDemoDistr_{b,s,p,y,x,d} = as_{e/i}Durations_{b,s,p,y,x,d} / (\Sigma_{d=1}^{n} as_{e/i}Duration_{b,s,p,y,x,d}) \quad \text{(Equation 24)}$$

The census imputer 326 selects an episode e/segment z (block 1118). The impressions imputation director 369 subsequently accesses the site census impressions $SCImps_{b,s,p,e/i,y,x,d}$. The impressions imputation director 369 also receives and/or accesses the adjusted and scaled asset-level impression demographic distribution $as_{e/i}ImpDemoDistr_{b,s,p,y,x,d}$ from the impressions distribution deriver 367. The impressions imputation director 369 determines whether there are site census impressions logged and no DP impressions logged for the selected episode e/segment z (block 1120). For example, there may be some site census impressions $SCImps_{b,s,p,e/i,y,x,d}$ identified by the impressions imputation director 369 for which DP impressions have not been received (e.g., the DP 116 of FIGS. 1 and/or 2 did not recognize any impressions for the episode e/segment z selected at block 1118), but one or more impressions have been received from the site census. When there are site census impressions $SCImps_{b,s,p,e/i,y,x,d}$ logged and no DP impressions for the selected episode e/segment z (block 1120), the impressions imputation director 369 imputes the census impressions with the adjusted and scaled asset-level impression distribution (block 1122). For example, the impressions imputation director 369 may apply (e.g., multiply), for each combination of selected brand b, sub-brand s, asset p, episode e/segment z, platform y, device type x, and demographic d, the adjusted and scaled impression demographic distribution $as_{e/i}\text{ImpDemoDistr}_{b,s,p,y,x,d}$ to the site census impressions $\text{SCImps}_{b,s,p,e/i,y,x,d}$ to generate imputed impressions $i_{e/i}\text{Imp}_{p,b,s,p,y,x,d}$. Equation 25 below may be used to implement block 1122.

$$i_{e/i}\text{Imp}_{p,b,s,p,y,x,d} = as_{e/i}\text{ImpDemoDistr}_{b,s,p,y,x,d} * \text{SCImps}_{b,s,p,e/i,y,x,d} \quad \text{(Equation 25)}$$

After imputing the impressions (block 1122), or when the impressions distribution director 369 determines there are no site census impressions logged and no DP impressions for the selected episode e/segment z (block 1120), the example duration imputation director 370 determines whether there are site census durations logged and no DP durations logged for the selected episode e/segment z (block 1124). For example, there may be some site census durations $\text{SCDuration}_{b,s,p,e/i,y,x,d}$ identified by the duration imputation director 370 for which DP durations have not been received (e.g., the DP 116 of FIGS. 1 and/or 2 did not recognize any durations for the episode e/segment z selected at block 1118), but one or more durations have been received from the site census. The duration imputation director 370 accesses the site census durations $\text{SCDuration}_{b,s,p,e/i,y,x,d}$. The duration imputation director 370 also receives and/or accesses the adjusted and scaled asset-level duration demographic distribution $as_{e/i}\text{DurationDemoDistr}_{b,s,p,y,x,d}$ from the duration distribution deriver 368. When there are site census durations $\text{SCDurations}_{b,s,p,e/i,y,x,d}$ logged and no DP durations for the selected episode e/segment z, (block 1124), the duration imputation director 370 imputes the census durations with the adjusted and scaled asset-level duration distribution (block 1126). For example, the duration imputation director 370 may apply (e.g., multiply), for each combination of selected brand b, sub-brand s, asset p, episode e/segment z, platform y, device type x, and demographic d, the adjusted and scaled duration demographic distribution $as_{e/i}\text{DurationDemoDistr}_{b,s,p,y,x,d}$ to the site census durations $\text{SCDuration}_{b,s,p,e/i,y,x,d}$ to generate imputed durations $i_{e/i}\text{Duration}_{p,b,s,p,y,x,d}$. Equation 26 below may be used to implement block 1126.

$$i_{e/i}\text{Duration}_{p,b,s,p,y,x,d} = as_{e/i}\text{DurationDemoDistr}_{b,s,p,y,x,d} * \text{SCDuration}_{s,p,e/i,y,x,d} \quad \text{(Equation 26)}$$

After imputing the durations (block 1126), or when the duration imputation director 370 determines there are no site census impressions logged and no DP impressions for the selected episode e/segment z (block 1124), the impressions imputation calculator 371 calculates scaled and adjusted impressions (block 1128). The impressions imputation calculator 371 receives and/or access the scaled impressions $\text{sImp}_{b,s,p,e/i,y,x,d}$ from the E-S adjuster 324 and the imputed impressions $i_{e/i}\text{Imp}_{p,b,s,p,y,x,d}$ from the impressions imputation director 369. The impression imputation calculator 371 calculates scaled and adjusted impressions $\text{asImp}_{b,s,p,e/i,y,x,d}$ for each combination of brand b, sub-brand s, asset p, episode e/segment z, platform y, device type x, and demographic d, by applying (e.g., adding) the imputed impressions $i_{e/i}\text{Imp}_{p,b,s,p,y,x,d}$ to the scaled impressions $\text{sImp}_{b,s,p,e/i,y,x,d}$. Equation 27 below may be used to implement block 1128.

$$\text{asImp}_{b,s,p,e/i,y,x,d} = \text{sImp}_{b,s,p,e/i,y,x,d} * i_{e/i}\text{Imp}_{p,b,s,p,y,x,d} \quad \text{(Equation 27)}$$

The duration imputation calculator 372 calculates scaled and adjusted durations (block 1130). The duration imputation calculator 372 receives and/or access the scaled durations $\text{sDuration}_{b,s,p,e/i,y,x,d}$ from the E-S adjuster 324 and the imputed durations $i_{e/i}\text{Duration}_{p,b,s,p,y,x,d}$ from the duration imputation director 370. The duration imputation calculator 372 calculates scaled and adjusted durations $\text{asDuration}_{b,s,p,e/i,y,x,d}$ for each combination of brand b, sub-brand s, asset p, episode e/segment z, platform y, device type x, and demographic d, by applying (e.g., adding) the imputed durations $i_{e/i}\text{Duration}_{p,b,s,p,y,x,d}$ to the scaled durations $\text{sDuration}_{b,s,p,e/i,y,x,d}$. Equation 28 below may be used to implement block 1130.

$$\text{asDuration}_{b,s,p,e/i,y,x,d} = \text{sDuration}_{b,s,p,e/i,y,x,d} * i_{e/i}\text{Duration}_{p,b,s,p,y,x,d} \quad \text{(Equation 28)}$$

The census imputer 326 determines whether there are additional episodes e/segments i (block 1132). If the census imputer 326 determines there are additional episodes e/segments i (block 1132), the example instructions 1100 return to block 1118. In this manner, the census imputer 326 determines scaled and adjusted impressions $\text{asImp}_{b,s,p,e/i,y,x,d}$ and durations $\text{asDuration}_{b,s,p,e/i,y,x,d}$ for each episode e/segment z. When the census imputer 326 determines there are no more episodes e/segments i (block 1132), the census imputer 326 determines whether there are additional demographic groups d (block 1134).

When the census imputer 326 determines there are additional demographics d to select (block 1134), the example instructions 1100 return to block 1112. In this manner, the census imputer 326 determines scaled and adjusted impressions $\text{asImp}_{b,s,p,e/i,y,x,d}$ and durations $\text{asDuration}_{b,s,p,e/i,y,x,d}$ for each demographic group d. When the census imputer 326 determines there are no more demographic groups d to select (block 1134), the census imputer 326 determines whether there are additional combinations of brand b, sub-brand s, asset p, platform y, and device type x (block 1136).

When there are additional combinations of brand b, sub-brand s, asset p, platform y, and device type x (block 1136), the example instructions 1100 of FIG. 11 return to block 1112. In this manner, the census imputer 326 determines scaled and adjusted impressions $\text{asImp}_{b,s,p,e/i,y,x,d}$ and durations $\text{asDuration}_{b,s,p,e/i,y,x,d}$ for each combination of brand b, sub-brand s, asset p, platform y, and device type x. When the census imputer 326 determines there are no additional combinations of brand b, sub-brand s, asset p, platform y, and device type x (block 1136), the example instructions 1100 of FIG. 11 end.

Figure 12:
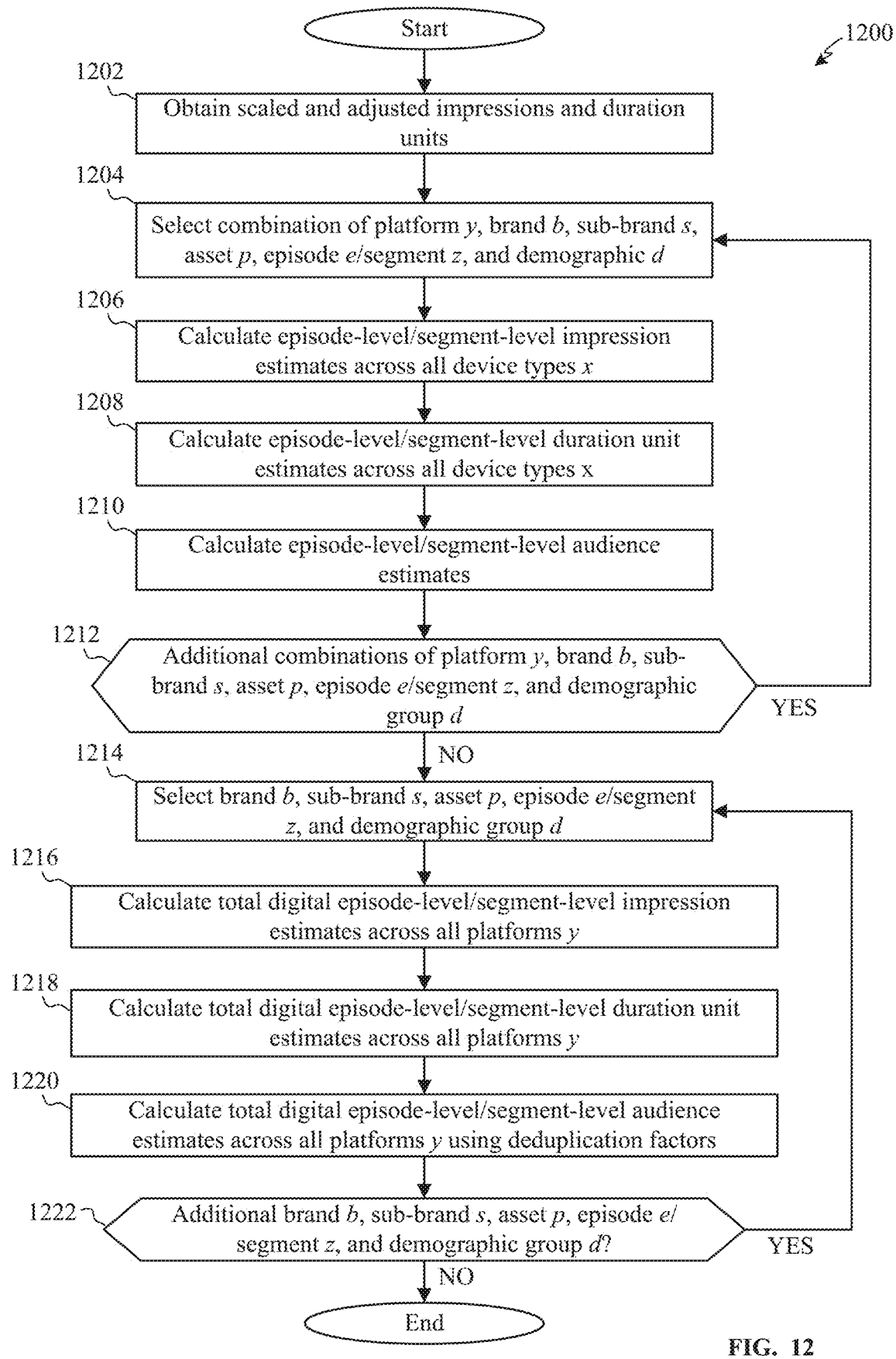
FIG. 12 is a flowchart representative of example machine readable instructions which may be executed to implement the audience data generator of FIGS. 1-3 to calculate ratings information at the episode level and the time segment level.

Calibrating Segment, Episode, Asset, Sub-Brand, Brand, and Cross-Publisher Level Metrics FIG. 12 is a flow chart representative of example machine readable instructions 1200 which may be executed to implement the audience data generator 120 of FIGS. 1, 2, and/or 3 to calculate ratings information at the episode level, the first time segment level, and the second time segment level. The metrics generator 328 FIG. 3 may perform the instructions 1200 of FIG. 12 to estimate impression counts, durations, and unique audiences based on the scaled and adjusted impressions $\text{asImp}_{b,s,p,e/i,y,x,d}$ and durations $\text{asDuration}_{b,s,p,e/i,y,x,d}$ generated by the census imputer 326 and illustrated in FIG. 11.

Because the metrics generator 328 may execute similar instructions to perform the example instructions 1200 at any of the asset level, the sub-brand level, the brand level, the episode-level and/or the second time segment level, the example instructions 1200 of FIG. 12 are described below using the asset level, the sub-brand level, the brand level, the episode-level and/or the second time segment level in the alternative (e.g., episode/segment). In some examples, the metrics generator 328 iterates the instructions 1200 beginning at a lower level (e.g., episode level, time segment level) and moving to higher (e.g., broader) levels (e.g., asset level, sub-brand level, brand level) with successive iterations by using the results from the immediately prior iteration for the next iteration. For example, the metrics generator 328 may use the episode/segment level results to execute the instructions 1200 at the asset level, use the asset level results to execute the instructions 1200 at the sub-brand level, and use the sub-brand level results to execute the instructions 1200 at the brand level. The example instructions 1200 are described with reference to the episode/time segment level.

The metrics generator 328 obtains the scaled and adjusted impressions and the scaled and adjusted durations from the census imputer (block 1202). In examples disclosed herein, the metrics generator 328 obtains the scaled and adjusted impressions asImp$_{b,s,p,e/i,y,x,d}$ from the impressions imputation calculator 371 and the scaled and adjusted durations asDuration$_{b,s,p,e/i,y,x,d}$ from the duration imputation calculator 372. The metrics generator 328 selects a combination of brand b, sub-brand s, asset p, episode e/segment z, platform y, and demographic group d (block 1204). The metrics generator 328 subsequently calculates episode-/segment-level impression estimates estImp$_{b,s,p,e/i,y,d}$ across all device types x (block 1206). In examples disclosed herein, the metrics generator 328 calculates segment-level and episode-level impression estimates by summing, or adding together all adjusted and scaled impressions asImp$_{b,s,p,e/i,y,x,d}$ across all device types x for the selected combination. In some examples, the segment-level impression estimates are performed at the first time segment level. Equation 29 below may be used to implement block 1206. In Equation 29, n represents the total number of device types x.

$$\text{estImp}_{b,s,p,e/i,y,d} = \Sigma_{x=1}^{n} \text{asImps}_{b,s,p,e/i,y,x,d} \quad \text{(Equation 29)}$$

The metrics generator 328 calculates episode-/segment-level duration estimates across all device types x (block 1208). In examples disclosed herein, the metrics generator 328 calculates segment-level and episode-level duration estimates estDuration$_{b,s,p,e/i,y,d}$ by summing, or adding together all adjusted and scaled durations asDuration$_{b,s,p,e/i,y,x,d}$ across all device types x for the selected combination. In some examples, the segment-level duration estimates are performed at the first time segment level. Equation 30 below may be used to implement block 1208. In Equation 30, n represents the total number of device types x.

$$\text{estDuration}_{b,s,p,e/i,y,d} = \Sigma_{x=1}^{n} \text{asDuration}_{b,s,p,e/i,y,x,d} \quad \text{(Equation 30)}$$

The metrics generator 328 accesses and/or receives all frequencies and deduplication factors from the distributed demographic data calculator 320 of FIG. 3. The metrics generator 328 calculates episode-/segment-level unique audience estimates (block 1210). In examples disclosed herein, the metrics generator 328 calculates the episode-level unique audience estimates estUA$_{b,s,p,e,y,d}$ by dividing, for the selected combination, the episode-level impression estimates estImp$_{b,s,p,e,y,d}$ by the episode-level frequency rDPFreq$_{b,s,p,e,y,d}$ of equation 7. Alternatively, the metrics generator 328 calculates the segment-level unique audience estimates estUA$_{b,i,y,d}$ by dividing, for the selected combination, the segment-level impression estimates estImp$_{b,s,p,i,y,d}$ by the segment-level frequency rDPFreq$_{b,i,y,d}$ of equation 10. In some examples, the segment-level unique audience estimates are performed at the second time segment level. Equation 31 below may be used to implement block 1210.

$$\text{estUA}_{b/(b,s,p),e/i,y,d} = \text{estImp}_{b/(b,s,p),e/i,y,d}/\text{rDPFreq}_{b/(b,s,p),i,y,d} \quad \text{(Equation 31)}$$

The metrics generator 328 determines whether there are additional combinations of brand b, sub-brand s, asset p, episode e/segment z, platform y, and demographic d (block 1212). When the metrics generator 328 determines there are additional combinations (block 1212), the example instructions return to block 1204. When the metrics generator 328 determines there are no additional combinations (block 1212), the metrics generator selects a combination of brand b, sub-brand s, asset p, episode e/segment z, and demographic d (block 1214).

The metrics generator 328 calculates total digital episode-/segment-level impression estimates across all platforms y (block 1216). The metrics generator 328 calculates the total digital episode-/segment-level impression estimates estImp$_{TD,b,s,p,e/i,d}$ by adding episode-/segment-level impressions across the non-mobile (e.g., desktop) computing platform estImp$_{Desktop,b,s,p,e/i,d}$ to episode-/segment-level impressions across the mobile computing platform estImp$_{Mobile,b,s,p,e/i,d}$. In some examples, the total digital segment-level impression estimates are performed at the first time segment level. Equation 32 below may be used to implement block 1216.

$$\text{estImp}_{TD,b,s,p,e/i,d} = \text{estIMP}_{Desktop,b,s,p,e/i,d} + \text{estImp}_{Mobile,b,s,p,e/i,d} \quad \text{(Equation 32)}$$

The metrics generator 328 calculates total digital episode-level/segment-level duration estimates across all platforms y (block 1218). The metrics generator 328 calculates the total digital episode-level/segment-level duration estimates estDuration$_{TD,b,s,p,e/i,d}$ by adding episode-level/segment-level durations across the non-mobile (e.g., desktop) computing platform estDuration$_{Desktop,b,s,p,e/i,d}$ to episode-/segment-level durations across the mobile computing platform estDuration$_{Mobile,b,s,p,e/i,d}$. In some examples, the total digital segment-level duration estimates are performed at the first time segment level. Equation 33 below may be used to implement block 1218.

$$\text{estDuration}_{TD,b,s,p,e/i,d} = \text{estDuration}_{Desktop,b,s,p,e/i,d} + \text{estDuration}_{Mobile,b,s,p,e/i,d} \quad \text{(Equation 33)}$$

The metrics generator 328 calculates total digital episode-/segment-level audience estimates across all platforms y using deduplication factors (block 1220). In examples disclosed herein, the metrics generator 328 calculates total digital episode-level audience estimates estUA$_{TDb,s,p,e,d}$ by adding, for the selected combination of brand b, sub-brand s, asset p, episode e, and demographic group d, episode-level audience estimates across the non-mobile (e.g., desktop) computing platform estUA$_{Desktopb,s,p,e,d}$ and episode-level audience estimates across the mobile computing platform estUA$_{Mobile,b,s,p,e,d}$ and multiplying the sum by the episode-level deduplication factor Dedup_F$_{TD,b,s,p,e,d}$ of equation 8. Alternatively, the metrics generator 328 calculates total digital segment-level audience estimates estUA$_{TD,b,i,d}$ by adding, for the selected combination of brand b, sub-brand s, asset p, segment z, and demographic group d, segment-level audience estimates across the non-mobile (e.g., desktop) computing platform estUA$_{Desktop,b,i,d}$ and segment-level audience estimates across the mobile computing platform estUA$_{Mobile,b,i,d}$ and multiplying the sum by the segment-level deduplication factor Dedup_F$_{TD,b,i,d}$ of equation 11. In some examples, the segment-level audience estimates are performed at the second time segment level. Equation 34 below may be used to implement block 1220.

$$\text{estUA}_{TD,b/(b,s,p),e/i,d} = (\text{estUA}_{Desktop,b/(b,s,p),e/i,d} + \text{estUA}_{Mobile,b/(b,s,p),e/i,d}) * \text{Dedup\_F}_{TD,b/(b,s,p),e/i,d} \quad \text{(Equation 34)}$$

The metrics generator 328 determines whether there are additional combinations of brand b, sub-brand s, asset p, episode e/segment z, and demographic d (block 1222). When there are additional combinations (block 1222), the example instructions 1200 return to block 1214. When there are no additional combinations (block 1222), the example instructions 1200 end.

Figure 13:
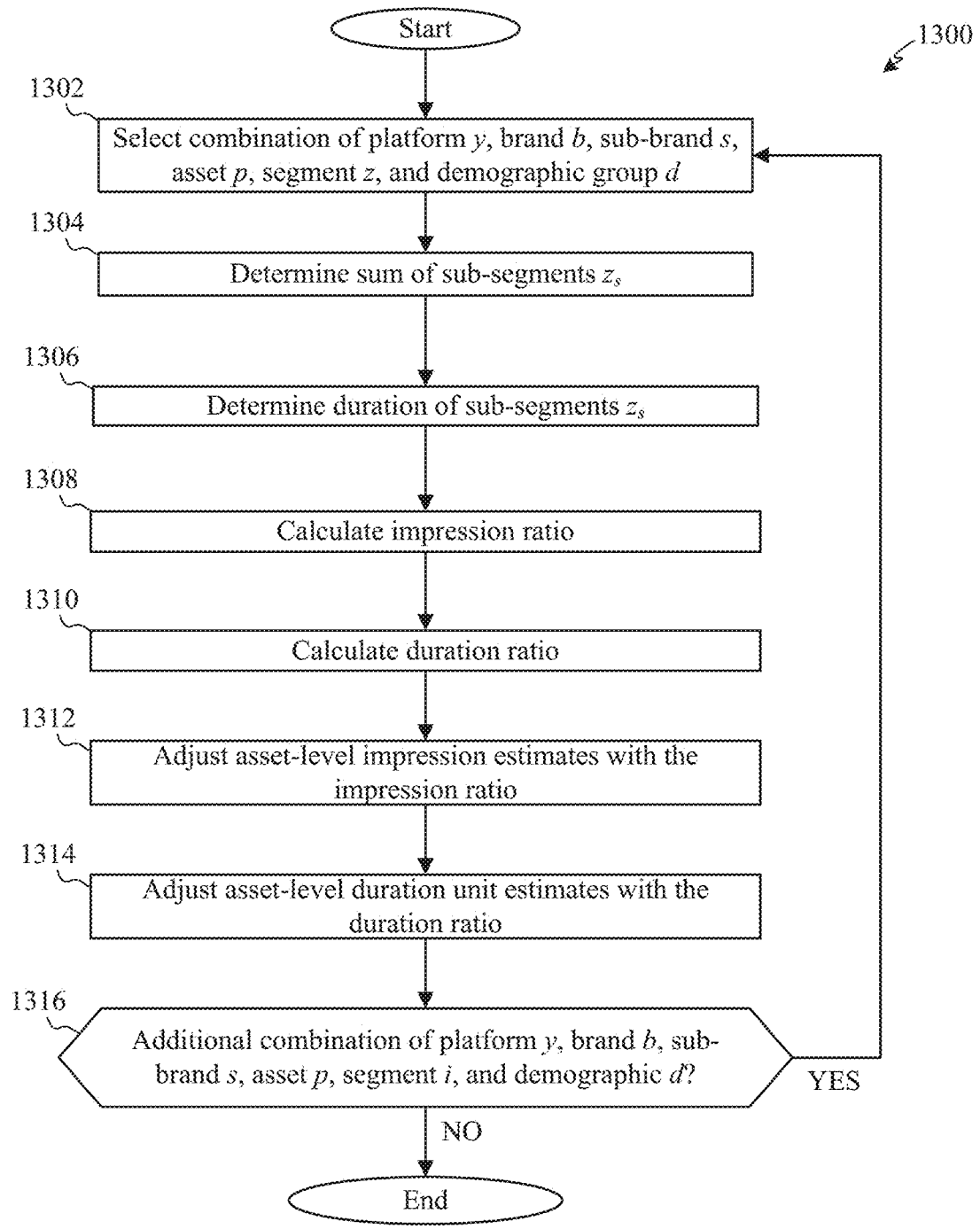
FIG. 13 is a flowchart representative of example machine readable instructions which may be executed to implement the audience data generator of FIGS. 1-3 to adjust the ratings information at the time segment level using impression data of a time sub-segment level.

FIG. 13 is a flow chart representative of example machine readable instructions 1300 which may be executed to implement the audience data generator 120 of FIGS. 1, 2, and/or 3 to adjust the ratings information at the first time segment level using impression data at a time sub-segment level. The segment modifier 330 of FIG. 3 may perform the instructions 1300 of FIG. 13 to determine impression ratios, duration ratios, and to adjust asset-level impression estimates $estImp_{b,s,p,y,d}$ (equation 9) and asset-level duration estimates $estDuration_{b,s,p,y,d}$ (equation 5).

In examples disclosed herein, the segment modifier 330 receives segment-level impression estimates $estImp_{b,s,p,i,y,d}$ (e.g., at the first time segment level) (Equation 29) and segment-level duration estimates $estDuration_{b,s,p,i,y,d}$ (e.g., at the first time segment level) (Equation 30) from the metrics generator 328 of FIG. 3. The segment modifier 330 selects a combination of brand b, sub-brand s, asset p, segment z, platform y, and demographic d (block 1302).

The impression sub-segment adder 373 determines a sum of sub-segments $i_s$ (block 1304). In examples disclosed herein, the impression sub-segment adder 373 accesses the segment-level impression estimates $estImp_{b,s,p,i,y,d}$ and sums, for the selected combination of brand b, sub-brand s, asset p, segment z, platform y, and demographic d, all time sub-segments $i_s$ for a corresponding (e.g., matching the selection) segment-level impression estimate $estImp_{b,s,p,i,y,d}$ (e.g., all time sub-segments $i_s$ included in the selected segment z). The impression sub-segment adder 373 may determine the sum of the segment-level impression estimates across all time sub-segments $i_s$, referred to herein as the impression sub-segment level sum (e.g., $SumEstImp_{b,s,p,i,y,d}$), by analyzing D beacons (e.g., beacon request 226b of FIG. 2) associated with (e.g., used to derive) the segment-level impression estimates $estImp_{b,s,p,i,y,d}$. For example, if a segment level impression estimate $estImp_{b,s,p,i,y,d}$ collected from a first device type x and corresponding to the selected brand b, sub-brand s, asset p, segment z, platform y, and demographic d, is derived from a D beacon of D_2_01010, the impression sub-segment adder 373 identifies the sub-segments $i_s$ (e.g., 01010) and credits the segment as having five sub-segments. Further, if a segment level impression estimate $estImp_{b,s,p,i,y,d}$ collected from a second device type x and corresponding to the selected brand b, sub-brand s, asset p, segment z, platform y, and demographic d, is derived from a D beacon of D_2_00100, the impression sub-segment adder 373 identifies the sub-segments $i_s$ (e.g., 00100) and credits the segment as having five sub-segments. Thus, the impression sub-segment adder 373 may determine the impression sub-segment level sum $SumEstImp_{b,s,p,i,y,d}$ is ten (e.g., five sub-segments of D_2_01010 plus five sub-segments of D_2_00100). Equation 35 below may be used to implement block 1304. In Equation 35 below, z(s) is the first sub-segment $z_s$ of the segment z and n is the total number of sub-segments in the segment z.

$$SumEstImp_{b,s,p,i,y,d} = \Sigma_{i(s)=1}^{n} estImp_{b,s,p,i,y,d} \quad \text{(Equation 35)}$$

The duration sub-segment adder 374 determines a duration of sub-segments $i_s$ (block 1306). In examples disclosed herein, the duration sub-segment adder 374 accesses the segment-level duration estimates $estDuration_{b,s,p,i,y,d}$ and sums, for the selected combination of brand b, sub-brand s, asset p, segment z, platform y, and demographic d, durations of all time sub-segments $i_s$ for a corresponding (e.g., matching the selection) segment-level duration estimate $estDuration_{b,s,p,i,y,d}$ (e.g., summing durations of each time sub-segments $i_s$ included in the selected segment z). The duration sub-segment adder 374 may determine the sum of the segment-level duration estimates across all time sub-segment $z_s$ durations, referred to herein as the duration sub-segment level sum (e.g., $SumEstDuration_{b,s,p,i,y,d}$), by analyzing D beacons (e.g., beacon request 226b of FIG. 2) associated with (e.g., used to derive) the segment-level duration estimates $estDuration_{b,s,p,i,y,d}$. For example, if a segment level duration estimate $estDuration_{b,s,p,i,y,d}$ collected from a first device type x and corresponding to the selected brand b, sub-brand s, asset p, segment z, platform y, and demographic d, is derived from a D beacon of D_2_01010, wherein each time sub-segment $z_s$ represents a duration of one minute, the duration sub-segment adder 374 identifies the durations of the sub-segments $i_s$ (e.g., 01010) and credits the segment as having a duration of five minutes. Further, if a segment level duration estimate $estDuration_{b,s,p,i,y,d}$ collected from a second device type x and corresponding to the selected brand b, sub-brand s, asset p, segment z, platform y, and demographic d, is derived from a D beacon of D_2_00100, wherein each time sub-segment $z_s$ represents a duration of one minute, the duration sub-segment adder 374 identifies the durations of the sub-segments $i_s$ (e.g., 00100) and credits the segment as having a duration of five minutes. Thus, the duration sub-segment adder 374 may determine the duration sub-segment level sum $SumEstDuration_{b,s,p,i,y,d}$ to be ten minutes (e.g., a five minute duration for D_2_01010 plus a five minute duration for D_2_00100). Equation 36 below may be used to implement block 1306. In Equation 36 below, where i(s) is the first sub-segment $z_s$ duration of the segment z and n is the last sub-segment $z_s$ duration of the segment z.

$$SumEstDuration_{b,s,p,i,y,d} = \Sigma_{i(s)=1}^{n} estDuration_{b,s,p,i,y,d} \quad \text{(Equation 36)}$$

The impression ratio calculator 375 receives the impression sub-segment level sum $SumEstImp_{b,s,p,i,y,d}$ from the impression sub-segment adder 373. The impression ratio calculator 375 also receives the segment-level impression estimates $estImp_{b,s,p,i,y,d}$ (e.g., at the first time segment level) (Equation 29) from the metrics generator 328. The impression ratio calculator 375 subsequently calculates an impression ratio (block 1308). In examples disclosed herein, the impression ratio calculator 375 identifies sub-segments $i_s$ of the segment-level impression estimates $estImp_{b,s,p,i,y,d}$ that are credited as impressions (e.g., presented via the client device 102 of FIGS. 1 and/or 2). For example, the impression ratio calculator 375 may analyze D beacons (e.g., beacon request 226b of FIG. 2) associated with (e.g., used to derive) the segment-level impression estimates $estImp_{b,s,p,i,y,d}$ and identify a quantity of time sub-segments $i_s$ that are credited as impressions. For example, if the segment-level impression estimate $estImp_{b,s,p,i,y,d}$ collected from the first device type x (e.g., provided as an example in the aforementioned description of block 1304 (derived from the D beacon D_2_01010)), the impression ratio calculator 375 determines that two time sub-segments were presented (e.g., the $2^{nd}$ time sub-segment and the $4^{th}$ time sub-segment). Thus, the impression ratio calculator 375 determines the quantity of time sub-segments credited as impressions to be two. Further, if the segment-level impression estimate $estImp_{b,s,p,i,y,d}$ collected from the second device type x (e.g., provided as an example in the aforementioned description of block 1304 (derived from the D beacon D_2_00100)), the impression ratio calculator 375 determines that one time sub-segment was presented (e.g., the $3^{rd}$ time sub-segment). Thus, the impression ratio calculator 375 determines the quantity of time sub-segments credited as impressions to be one. Moreover, the impression calculator 375 determines the quantity of time sub-segments credited as impressions for the selected combination (e.g., $est_iImp_{b,s,p,i,y,d}$) to be three (e.g., two time sub-segments presented in D_2_01010 plus one time sub-segment presented in D_2_00100). In examples disclosed herein, the impression ratio calculator 375 calculates the impression ratio $EstImpRatio_{b,s,p,i,y,d}$ for the selected combination by dividing the quantity of time sub-segments credited as impressions $est_iImp_{b,s,p,i,y,d}$ by the impression sub-segment level sum $SumEstImp_{b,s,p,i,y,d}$. As such, the impression ratio calculator 375 calculates an impression ratio of 3/10 or 0.30 by dividing the quantity of time sub-segments credited as impressions $est_iImp_{b,s,p,i,y,d}$ (e.g., 3) by the impression sub-segment level sum $SumEstImp_{b,s,p,i,y,d}$ (e.g., 10). Equation 37 below may be used to implement block 1308.

$$EstImpRatio_{b,s,p,i,y,d} = est_iImp_{b,s,p,i,y,d} / SumEstImp_{b,s,p,i,y,d} \quad \text{(Equation 37)}$$

The duration ratio calculator 376 receives the duration sub-segment level sum $SumEstDuration_{b,s,p,i,y,d}$ from the duration sub-segment adder 374. The duration ratio calculator 376 also receives the segment-level duration estimates $estDuration_{b,s,p,i,y,d}$ (e.g., at the first time segment level) (Equation 30) from the metrics generator 328. The duration ratio calculator 376 subsequently calculates a duration ratio (block 1310). In examples disclosed herein, the duration ratio calculator 376 identifies sub-segments $i_s$ of the segment-level duration estimates $estDuration_{b,s,p,i,y,d}$ that are credited as presented durations (e.g., presented via the client device 102 of FIGS. 1 and/or 2). For example, the duration ratio calculator 376 may analyze D beacons (e.g., the beacon request 226b of FIG. 2) associated with (e.g., used to derive) the segment-level duration estimates $estDuration_{b,s,p,i,y,d}$ and identify a duration of the time sub-segments $i_s$ presented. For example, if the segment-level duration estimate $estDuration_{b,s,p,i,y,d}$ collected from the first device type x (e.g., provided as an example in the aforementioned description of block 1306 (derived from the D beacon D_2_01010)), the duration ratio calculator 376 determines that two time sub-segments were presented (e.g., the $2^{nd}$ time sub-segment and the $4^{th}$ time sub-segment). Thus, the duration ratio calculator 376 determines the duration of the time sub-segments $i_s$ presented to be two minutes. Further, if the segment-level duration estimate $estDuration_{b,s,p,i,y,d}$ collected from the second device type x (e.g., provided as an example in the aforementioned description of block 1306 (derived from the D beacon D_2_00100)), the duration ratio calculator 376 determines that one time sub-segment was presented (e.g., the $3^{rd}$ time sub-segment). Thus, the duration ratio calculator 376 determines the duration of the time sub-segments $i_s$ presented to be one minute. Moreover, the duration calculator 376 determines the duration of time sub-segments presented for the selected combination (e.g., $est_iDuration_{b,s,p,i,y,d}$) to be three minutes (e.g., two minutes for the two time sub-segments presented in D_2_01010 plus one minute for the one time sub-segment presented in D_2_00100). In examples disclosed herein, the duration ratio calculator 376 calculates the duration ratio $EstDurationRatio_{b,s,p,i,y,d}$ for the selected combination by dividing the duration of time sub-segments presented for the selected combination $est_iDuration_{b,s,p,i,y,d}$ by the duration sub-segment level sum $SumEstDuration_{b,s,p,i,y,d}$. As such, the duration ratio calculator 376 calculates a duration ratio of 3/10 or 0.30 by dividing the duration of time sub-segments presented $est_iDuration_{b,s,p,i,y,d}$ (e.g., 3 minutes) by the duration sub-segment level sum $SumEstDuration_{b,s,p,i,y,d}$ (e.g., 10 minutes). Equation 38 below may be used to implement block 1310.

$$EstDurationRatio_{b,s,p,i,y,d} = est_iDuration_{b,s,p,i,y,d} / SumEstDuration_{b,s,p,i,y,d} \quad \text{(Equation 38)}$$

The impression metrics adjuster 377 receives the impression ratio $EstImpRatio_{b,s,p,i,y,d}$ from the impression ratio calculator 375 and the asset-level impression estimates $estImp_{b,s,p,y,d}$ (equation 29) (e.g., first asset-level impressions) from the metrics generator 328. The impression metrics adjuster 377 subsequently adjusts the asset-level impression estimates with the impression ratio (block 1312). In examples disclosed herein, the impression metrics adjuster 377 adjusts the asset-level impression estimates $estImp_{b,s,p,y,d}$ by applying (e.g., multiplying), for the selected combination of brand b, sub-brand s, asset p, segment z, platform y, and demographic d, the impression ratio $EstImpRatio_{b,s,p,i,y,d}$ to the asset-level impression estimates $estImp_{b,s,p,y,d}$. As a result, the impression metrics adjuster 377 generates adjusted segment-level impression estimates $estImps_{b,s,p,i,y,d}$ by applying the impression ratio $EstImpRatio_{b,s,p,i,y,d}$ to the asset-level impression estimates $estImp_{b,s,p,y,d}$. Equation 39 below may be used to implement block 1312.

$$estImps_{b,s,p,i,y,d} = EstImpRatio_{b,s,p,i,y,d} * estImp_{b,s,p,y,d} \quad \text{(Equation 39)}$$

The duration metrics adjuster 378 receives the duration ratio $EstDurationRatio_{b,s,p,i,y,d}$ from the duration ratio calculator 376 and the asset-level duration estimates $estDuration_{b,s,p,y,d}$ (Equation 30) (e.g., first asset-level durations) from the metrics generator 328. The duration metrics adjuster 378 subsequently adjusts the asset-level duration estimates with the duration ratio (block 1314). In examples disclosed herein, the duration metrics adjuster 378 adjusts the asset-level duration estimates $estDuration_{b,s,p,y,d}$ by applying (e.g., multiplying), for the selected combination of brand b, sub-brand s, asset p, segment z, platform y, and demographic d, the duration ratio $EstDurationRatio_{b,s,p,i,y,d}$ to the asset-level duration estimates $estDuration_{b,s,p,y,d}$. As a result, the duration metrics adjuster 378 generates adjusted segment-level duration estimates $estDuration_{b,s,p,i,y,d}$ by applying the duration ratio $EstDurationRatio_{b,s,p,i,y,d}$ to the asset-level duration estimates $estDuration_{b,s,p,y,d}$. Equation 40 below may be used to implement block 1314.

$$estDuration_{b,s,p,i,y,d} = EstDurationRatio_{b,s,p,i,y,d} * estDuration_{b,s,p,y,d} \quad \text{(Equation 40)}$$

The segment modifier 330 determines whether there are additional combinations of brand b, sub-brand s, asset p, segment z, platform y, and demographic d (block 1316). When the segment modifier 330 determines there are additional combinations (block 1316), the example instructions 1300 return to block 1302. In this manner, the segment modifier 330 generates impression ratios, duration ratios, adjusted segment-level impression estimates, and adjusted segment-level duration estimates across all combination of brand b, sub-brand s, asset p, segment z, platform y, and demographic d. When the segment modifier 330 determines there are no additional combinations of brand b, sub-brand s, asset p, segment z, platform y, and demographic d (block 1316), the example instructions 1300 of FIG. 13 end.

Figure 14:
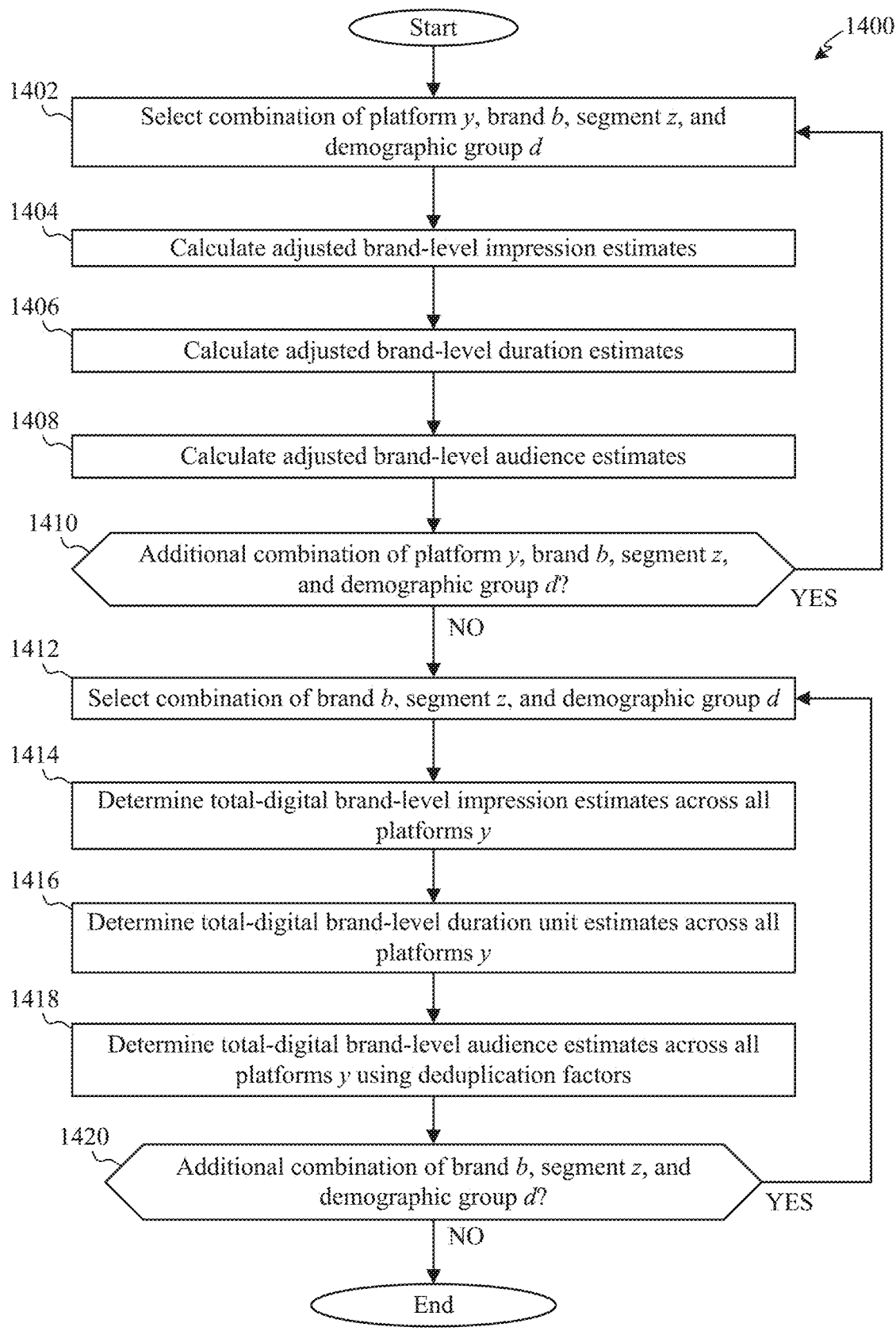
FIG. 14 is a flowchart representative of example machine readable instructions which may be executed to implement the audience data generator of FIGS. 1-3 to adjust the ratings information at the brand level.

FIG. 14 is a flow chart representative of example machine readable instructions 1400 which may be executed to implement the audience data generator 120 of FIGS. 1, 2, and/or 3 to adjust the ratings information at the brand level. The brand/cross-platform adjuster 332 of FIG. 3 may perform the instructions 1400 of FIG. 14 to estimate impression counts and durations using the adjusted asset-level impression estimates estImps$_{b,s,p,i,y,d}$ and the adjusted asset-level duration estimates estDuration$_{b,s,p,i,y,d}$ generated by the segment modifier 330 and illustrated in FIG. 13.

The brand/cross-platform adjuster 332 accesses and/or receives the adjusted asset-level impression estimates estImps$_{b,s,p,i,y,d}$ and the adjusted asset-level durations estDuration$_{b,s,p,i,y,d}$ from the segment modifier 330. In examples disclosed herein, the brand/cross-platform adjuster 332 also accesses and/or receives the segment level frequency rDPFreq$_{b,i,y,d}$ (e.g., at the second time segment level) (Equation 10) from the segment FC 341 of the distributed demographic data calculator 320 of FIG. 3. The brand/cross-platform adjuster 332 further accesses and/or receives the segment level deduplication factor Dedup_F$_{TD,b,i,d}$ (Equation 11) from the segment DFG 342.

The brand/cross-platform adjuster 332 selects a combination of brand b, segment z, platform y, and demographic d (block 1402). The impressions adjuster 379 subsequently calculates adjusted brand-level impression estimates (Block 1404). In examples disclosed herein, the impressions adjuster 379 calculates adjusted brand-level impression estimates estImp$_{b,i,y,d}$ for the selected combination of brand b, segment z, platform y, and demographic d by summing the adjusted asset-level impression estimates estImps$_{b,s,p,i,y,d}$ across all assets p within sub-brands s. Equation 41 below may be used to implement block 1404. In the example Equation 41 below, n represents all assets p within a sub-brand s.

$$\text{estImp}_{b,i,y,d} = \Sigma_{p=1}^{n} \text{aestImps}_{b,s,p,i,y,d} \quad \text{(Equation 41)}$$

The duration adjuster 380 calculates adjusted brand-level duration estimates (Block 1406). In examples disclosed herein, the duration adjuster 380 calculates adjusted brand-level duration estimates estDuration$_{b,i,y,d}$ for the selected combination of brand b, segment z, platform y, and demographic d by summing the adjusted asset-level duration estimates estDuration$_{b,s,p,i,y,d}$ across all assets p within sub-brands s. Equation 42 below may be used to implement block 1406. In the example Equation 42 below, n represents all assets p within a sub-brands.

$$\text{estDuration}_{b,i,y,d} = \Sigma_{p=1}^{n} \text{estDuration}_{b,s,p,i,y,d} \quad \text{(Equation 42)}$$

The audience adjuster 381 calculates adjusted brand-level audience estimates (block 1408). In examples disclosed herein, the audience adjuster 381 calculates adjusted brand-level audience estimates estUA$_{b,i,y,d}$ for the selected combination of brand b, segment z, platform y, and demographic d by dividing a respective, adjusted brand-level impression estimate estImp$_{b,i,y,d}$ by a respective, segment level frequency rDPFreq$_{b,i,y,d}$ (e.g., at the second time segment level) (Equation 10). Equation 43 may be used to implement block 1408.

$$\text{estUA}_{b,i,y,d} = \text{estImp}_{b,i,y,d}/\text{rDPFreq}_{b,i,y,d} \quad \text{(Equation 43)}$$

The brand/cross-platform adjuster 332 determines whether there are additional combinations of brand b, segment z, platform y, and demographic group d (block 1410). When the brand/cross-platform adjuster 332 determines there are additional combinations (block 1410), the example instructions 1400 return to block 1402. When the brand/cross-platform adjuster 332 determines there are no additional combinations (block 1410), the brand/cross-platform adjuster 332 selects a combination of a brand b, segment z, and demographic d (block 1412).

The impressions TD calculator 382 determines adjusted total-digital brand-level impression estimates across all platforms y (block 1414). In examples disclosed herein, the impressions TD calculator 382 calculates the adjusted total digital brand-level impression estimates estImp$_{TD,b,i,d}$ by adding adjusted brand-level impression estimates across the non-mobile (e.g., desktop) computing platform estImp$_{Desktop,b,i,d}$ to adjusted brand-level impression estimates across the mobile computing platform estImp$_{Mobile,b,i,d}$. Equation 44 below may be used to implement block 1414.

$$\text{estImp}_{TD,b,i,d} = \text{estImp}_{Desktop,b,i,d} + \text{estImp}_{Mobile,b,i,d} \quad \text{(Equation 44)}$$

The duration TD calculator 383 determines adjusted total-digital brand-level duration estimates across all platforms y (block 1416). In examples disclosed herein, the duration TD calculator 383 calculates the adjusted total digital brand-level duration estimates estDuration$_{TD,b,i,d}$ by adding adjusted brand-level duration estimates across the non-mobile (e.g., desktop) computing platform estDuration$_{Desktop,b,i,d}$ adjusted brand-level duration estimates across the mobile computing platform estDuration$_{Mobile,b,i,d}$. Equation 45 below may be used to implement block 1416.

$$\text{estDuration}_{TD,b,i,d} = \text{estDuration}_{Desktop,b,i,d} + \text{estDuration}_{Mobile,b,i,d} \quad \text{(Equation 45)}$$

The audience TD calculator 384 calculates adjusted total digital brand-level audience estimates across all platforms y using deduplication factors (block 1418). In examples disclosed herein, the audience TD calculator 384 calculates adjusted total digital brand-level audience estimates estUA$_{TDb,i,d}$ by adding, for the selected combination of brand b, segment z, and demographic group d, adjusted brand-level audience estimates across the non-mobile (e.g., desktop) computing platform estUA$_{Desktopb,i,d}$ and adjusted brand-level audience estimates across the mobile computing platform estUA$_{Mobile,b,i,d}$ and multiplying the sum by the segment level deduplication factor Dedup_F$_{TD,b,i,d}$ (Equation 11). Equation 46 below may be used to implement block 1418.

$$\text{estUA}_{TD,b,i,d} = (\text{estUA}_{Desktop,b,i,d} + \text{estUA}_{Mobile,b,i,d}) * \text{Dedup\_F}_{TD,b,i,d} \quad \text{(Equation 46)}$$

The brand/cross-platform adjuster 332 determines whether there are additional combinations of brand b, segment z, and demographic d (block 1420). When there are additional combinations (block 1420), the example instructions 1400 return to block 1412. When there are no additional combinations (block 1420), the example instructions 1400 end.

Figure 15:
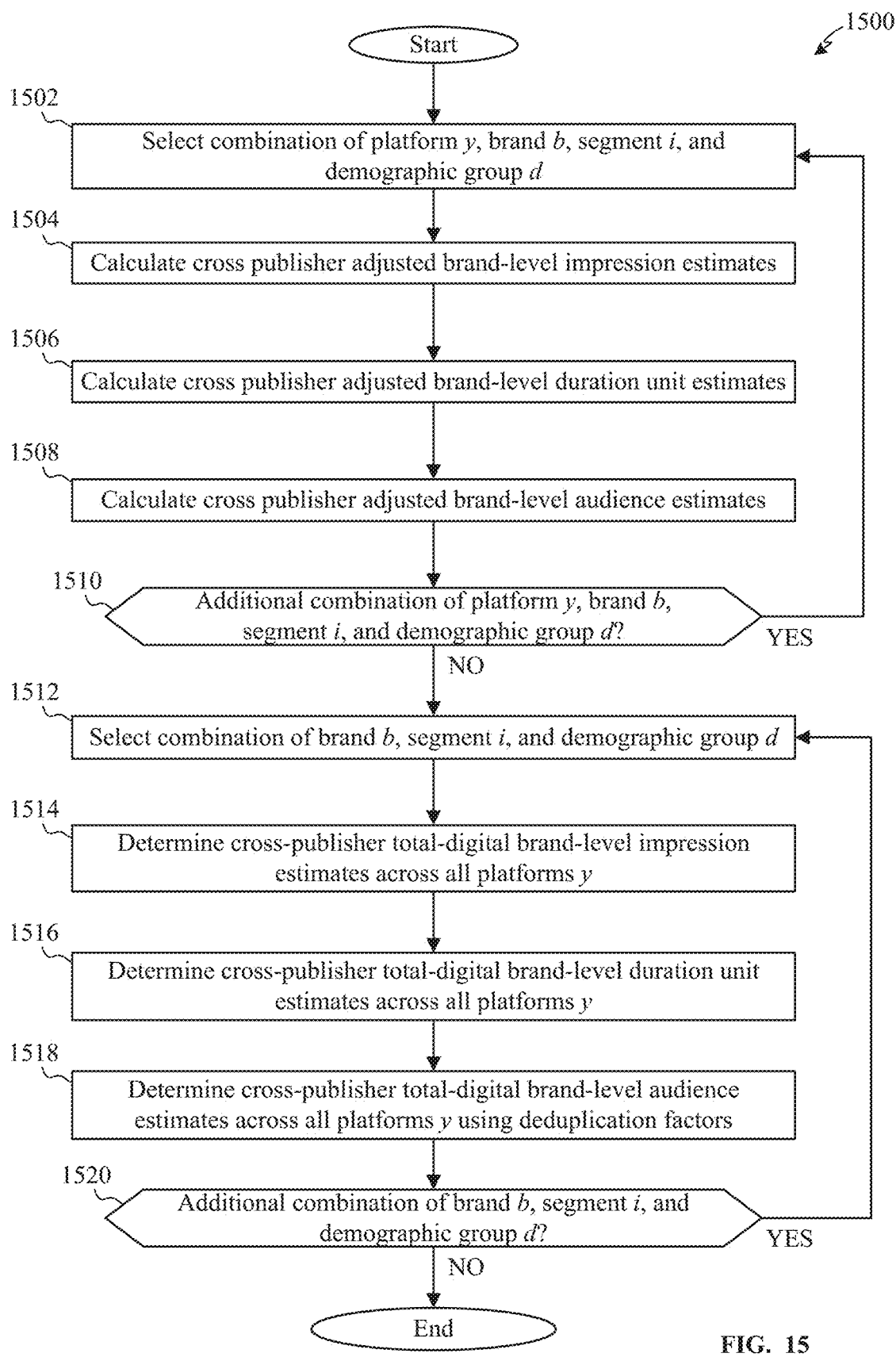
FIG. 15 is a flowchart representative of example machine readable instructions which may be executed to implement the audience data generator of FIGS. 1-3 to calculate ratings information at the cross-publisher level.

FIG. 15 is a flow chart representative of example machine readable instructions 1500 which may be executed to implement the audience data generator 120 of FIGS. 1-3 to calculate ratings information at the cross-publisher level. The brand/cross-platform adjuster 332 of FIG. 3 may perform the instructions 1500 of FIG. 15 to estimate impression counts and durations using the adjusted brand-level impression estimates estImps$_{b,i,y,d}$ and the adjusted brand-level duration estimates estDuration$_{b,i,y,d}$ generated by the brand/cross-platform adjuster 332.

The brand/cross-platform adjuster 332 accesses and/or receives the adjusted brand-level impression estimates estImps$_{b,i,y,d}$ and the adjusted brand-level durations estDuration$_{b,i,y,d}$ from the brand/cross-platform adjuster 332. In examples disclosed herein, the brand/cross-platform adjuster 332 also accesses and/or receives the cross-publisher level frequency (e.g., rDPCPFreq$_{b,i,y,d}$) (Equation 12)

from the CP-FC 351 of the distributed demographic data calculator 320 of FIG. 3. The brand/cross-platform adjuster 332 further accesses and/or receives the cross-publisher level deduplication factor Dedup_F_CP$_{TD,b,i,d}$ (Equation 13) from the CP-DFG 352.

The brand/cross-platform adjuster 332 selects a combination of brand b, segment z, platform y, and demographic d (block 1502). The impressions adjuster 381 subsequently calculates cross-publisher adjusted brand-level impression estimates (Block 1504). In examples disclosed herein, the impressions adjuster 381 calculates cross-publisher adjusted brand-level impression estimates estCPImp$_{b,i,y,d}$ for the selected combination of brand b, segment z, platform y, and demographic d by summing the adjusted brand-level impression estimates estImps$_{b,i,y,d}$ (Equation 29) across all brands b (e.g., across all network affiliates providing a segment z of the media 206 of FIG. 2). Equation 47 below may be used to implement block 1504. In example Equation 47 below, n represents all brands b included within a cross-publisher report.

$$\text{estCPImp}_{b,i,y,d} = \Sigma_{b=1}^{n} \text{estImps}_{b,i,y,d} \quad \text{(Equation 47)}$$

The duration adjuster 380 calculates cross-publisher adjusted brand-level duration estimates (Block 1506). In examples disclosed herein, the duration adjuster 380 calculates cross-publisher adjusted brand-level duration estimates estCPDuration$_{b,i,y,d}$ for the selected combination of brand b, segment z, platform y, and demographic d by summing the adjusted brand-level duration estimates estDuration$_{b,i,y,d}$ (Equation 30) across all brands b (e.g., across all network affiliates providing a segment z of the media 206 of FIG. 2). Equation 48 below may be used to implement block 1506. In example Equation 48 below, n represents all brands b included within a cross-publisher report.

$$\text{estCPDuration}_{b,i,y,d} = \Sigma_{b=1}^{n} \text{estDuration}_{b,i,y,d} \quad \text{(Equation 48)}$$

The audience adjuster 381 calculates cross-publisher adjusted brand-level audience estimates (block 1508). In examples disclosed herein, the audience adjuster 381 calculates cross-publisher adjusted brand-level audience estimates estCPUA$_{b,i,y,d}$ for the selected combination of brand b, segment z, platform y, and demographic d by dividing a respective, cross-publisher adjusted brand-level impression estimate estCPImp$_{b,i,y,d}$ (Equation 47) by a respective, cross-publisher level frequency rDPCPFreq$_{b,i,y,d}$ (Equation 12). Equation 49 may be used to implement block 1508.

$$\text{estCPUA}_{b,i,y,d} = \text{estCPImp}_{b,i,y,d} / \text{rDPCPFreq}_{b,i,y,d} \quad \text{(Equation 49)}$$

The brand/cross-platform adjuster 332 determines whether there are additional combinations of brand b, segment z, platform y, and demographic group d (block 1510). When the brand/cross-platform adjuster 332 determines there are additional combinations (block 1510), the example instructions 1500 return to block 1502. When the brand/cross-platform adjuster 332 determines there are no additional combinations (block 1510), the brand/cross-platform adjuster 332 selects a combination of a brand b, segment z, and demographic d (block 1512).

The impressions TD calculator 382 determines cross-publisher total-digital brand-level impression estimates across all platforms y (block 1514). In examples disclosed herein, the impressions TD calculator 382 calculates the cross-publisher total digital brand-level impression estimates estCPImp$_{TD,b,i,d}$ by adding cross-publisher adjusted brand-level impression estimates across the non-mobile (e.g., desktop) computing platform estCPImp$_{Desktop,b,i,d}$ to cross-publisher adjusted brand-level impression estimates across the mobile computing platform estCPImp$_{Mobile,b,i,d}$. Equation 50 below may be used to implement block 1514.

$$\text{estCPImp}_{TD,b,i,d} = \text{estCPImp}_{Desktop,b,i,d} + \text{estCPImp}_{Mobile,b,i,d} \quad \text{(Equation 50)}$$

The duration TD calculator 383 determines cross-publisher total-digital brand-level duration estimates across all platforms y (block 1516). In examples disclosed herein, the duration TD calculator 383 calculates the cross-publisher total digital brand-level duration estimates estCPDuration$_{TD,b,i,d}$ by adding cross-publisher adjusted brand-level duration estimates across the non-mobile (e.g., desktop) computing platform estCPDuration$_{Desktop,b,i,d}$ to cross-publisher adjusted brand-level duration estimates across the mobile computing platform estCPDuration$_{Mobile,b,i,d}$. Equation 51 below may be used to implement block 1516.

$$\text{estCPDuration}_{TD,b,i,d} = \text{estCPDuration}_{Desktop,b,i,d} + \text{estCPDuration}_{Mobile,b,i,d} \quad \text{(Equation 51)}$$

The audience TD calculator 384 calculates cross-publisher total digital brand-level audience estimates across all platforms y using deduplication factors (block 1518). In examples disclosed herein, the audience TD calculator 384 calculates cross-publisher total digital brand-level audience estimates estCPUA$_{TD,b,i,d}$ by adding, for the selected combination of brand b, segment z, and demographic group d, cross-publisher adjusted brand-level audience estimates across the non-mobile (e.g., desktop) computing platform estCPUA$_{Desktop,b,i,d}$ and cross-publisher adjusted brand-level audience estimates across the mobile computing platform estCPUA$_{Mobile,b,i,d}$ and multiplying the sum by the cross-publisher level deduplication factor Dedup_F_CP$_{TD,b,i,d}$ (Equation 13). Equation 52 below may be used to implement block 1518.

$$\text{estCPUA}_{TD,b,i,d} = (\text{estCPUA}_{Desktop,b,i,d} + \text{estCPUA}_{Mobile,b,i,d}) * \text{Dedup\_F\_CP}_{TD,b,i,d} \quad \text{(Equation 52)}$$

The brand/cross-platform adjuster 332 determines whether there are additional combinations of brand b, segment z, and demographic d (block 1520). When there are additional combinations (block 1520), the example instructions 1500 return to block 1512. When there are no additional combinations (block 1520), the example instructions 1500 end.

Figure 16:
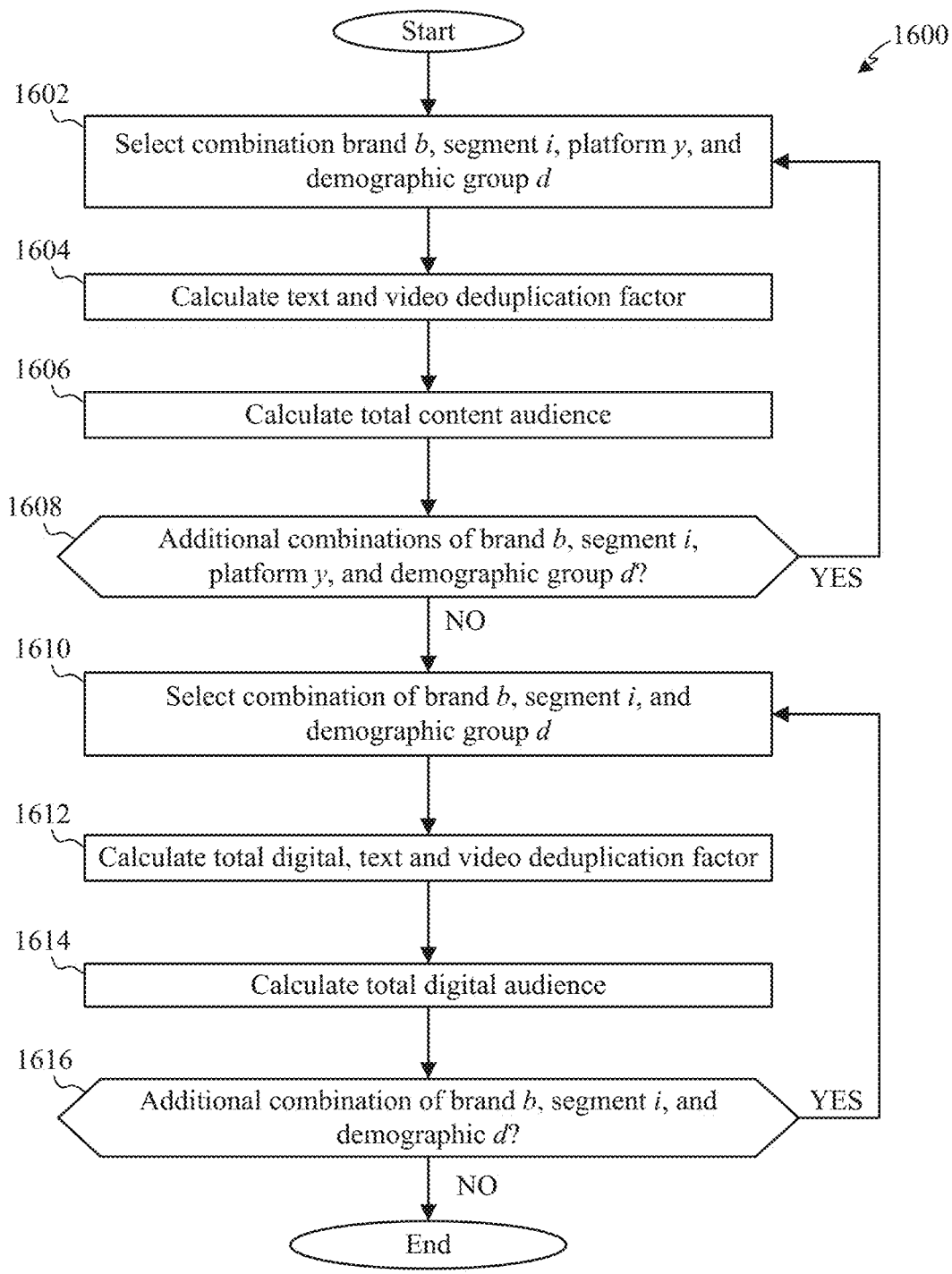
FIG. 16 is a flowchart representative of example machine readable instructions which may be executed to implement the audience data generator of FIGS. 1-3 to generate ratings information for media content types at the time segment level.

FIG. 16 is a flow chart representative of example machine readable instructions 1600 which may be executed to implement the audience data generator 120 of FIGS. 1-3 to generate ratings information by media content type c at the text and video (T/V) segment level. The content calculator 336 of FIG. 3 may perform the instructions 1600 of FIG. 16 to estimate a corrected audience count using the redistributed impression information organized by content type c.

The content calculator 336 accesses and/or receives the redistributed impressions rDPImps$_{c(t,v,w),b,i,y,d}$ (Equation 4), the redistributed durations rDPDuration$_{c(t,v,w),b,i,y,d}$ (Equation 5), and the redistributed audience rDPUA$_{c(t,v,w),b,i,y,d}$ (Equation 6) from the demographic distributor 318. The content calculator 336 also accesses and/or receives the adjusted brand-level impression estimates estImp$_{b,i,y,d}$ (Equation 29) from the brand/cross-platform adjuster 332.

The content calculator 336 selects a combination of brand b, segment z, platform y, and demographic d (block 1602). The T/V DFG 391 subsequently calculates a text and video deduplication factor (block 1604). In examples disclosed herein, the T/V DFG 391 identifies, for the selected combination of brand b, segment z, platform y, and demographic d, the redistributed audience presented both the text content and the video content w, rDPUA$_{w,b,i,y,d}$, the redistributed audience presented the video content v, rDPUA$_{v,b,i,y,d}$, and the redistributed audience presented the text content t, rDPUA$_{t,b,i,y,d}$. In examples disclosed herein, the T/V DFG 391 calculates a text and video (T/V) deduplication factor (e.g., T&V_Dedup_F$_{b,i,y,d}$) by dividing the redistributed audience presented both the text content and the video content w, rDPUA$_{w,b,i,y,d}$, by a sum of the redistributed audience presented the video content v, rDPUA$_{v,b,i,y,d}$, and the redistributed audience presented the text content t, rDPUA$_{t,b,i,y,d}$. Equation 53 below may be used to implement block 1604.

$$T\&V\_Dedup\_F_{b,i,y,d} = rDPUA_{w,b,i,y,d}/(rDPUA_{v,b,i,y,d} + rDPUA_{t,b,i,y,d}) \quad \text{(Equation 53)}$$

The T/V audience calculator 392 subsequently calculates a total content audience (block 1606). In examples disclosed herein, the T/V audience calculator 392 determines the total content audience (e.g., estUA$^{TC}_{b,i,y,d}$), referred to herein as a corrected audience count, using the adjusted brand-level impression estimates estImp$_{b,i,y,d}$ (Equation 29). The T/V audience calculator 392 receives the text and video (T/V) deduplication factor T&V_Dedup_F$_{b,i,y,d}$ from the T/V DFG 391. The T/V audience calculator 392 calculates the total content audience estUA$^{TC}_{b,i,y,d}$, for the selected brand b, segment z, platform y, and demographic d, by summing a video content audience estUA$^{Video}_{b,i,y,d}$ and a text content audience estUA$^{Text}_{b,i,y,d}$ and applying (e.g., multiplying) the sum by the text and video (T/V) deduplication factor T&V_Dedup_F$_{b,i,y,d}$. In examples disclosed herein, the video content audience estUA$^{Video}_{b,i,y,d}$ is representative of a quantity of audience members of a demographic group d (e.g., M13-17, M40-44, F25-29, etc.) that accessed and were presented a segment z of video content v via a particular computing platform y (e.g., non-mobile or mobile) from a brand b (e.g., a network affiliate providing the media 206 of FIG. 2). The text content audience estUA$^{Text}_{b,i,y,d}$ is representative of a quantity of audience members of the same demographic group d that accessed and were concurrently presented text content t when the segment z of the video content v was presented via the same computing platform y from the same brand b. Equation 54 may be used to implement block 1606.

$$estUA^{TC}_{b,i,y,d} = (estUA^{Video}_{b,i,y,d} + estUA^{Text}_{b,i,y,d}) * T\&V\_Dedup\_F_{b,i,y,d} \quad \text{(Equation 54)}$$

In examples disclosed herein, the T/V audience calculator 392 may determine the video content audience estUA$^{Video}_{b,i,y,d}$ and the text content audience estUA$^{Text}_{b,i,y,d}$ using the redistributed impressions indicative of access to text content t and video content v, rDPImps$_{T/V,b,i,y,d}$, the redistributed audiences indicative of access to text content t and video content v, rDPUA$_{T/V,b,i,y,d}$, and the adjusted brand-level impression estimates estImp$_{b,i,y,d}$. For example, the T/V audience calculator 392 may first calculate a video impression frequency rDPFreq$^{Video}_{b,i,y,d}$ by dividing, for the selected combination of brand b, segment z, platform y, and demographic d of block 1602, the redistributed impressions indicative of access to video content v, rDPImps$_{v,b,i,y,d}$, by the redistributed audience indicative of access to the video content v, rDPUA$_{v,b,i,y,d}$. Equation 55 below may be used to calculate the video impression frequency rDPFreq$^{Video}_{b,i,y,d}$.

$$rDPFreq^{Video}_{b,i,y,d} = rDPImps_{v,b,i,y,d}/rDPUA_{v,b,i,y,d} \quad \text{(Equation 55)}$$

Similarly, the T/V audience calculator 392 may also calculate a text impression frequency rDPFreq$^{Text}_{b,i,y,d}$ by dividing, for the selected combination of brand b, segment z, platform y, and demographic d of block 1602, the redistributed impressions indicative of access to text content t, rDPImps$_{t,b,i,y,d}$, by the redistributed audience indicative of access to the text content t, rDPUA$_{t,b,i,y,d}$. Equation 56 below may be used to calculate the text impression frequency rDPFreq$^{Text}_{b,i,y,d}$.

$$rDPFreq^{Text}_{b,i,y,d} = rDPImps_{t,b,i,y,d}/rDPUA_{t,b,i,y,d} \quad \text{(Equation 56)}$$

To determine the video content audience estUA$^{Video}_{b,i,y,d}$, the T/V audience calculator 392 divides, for the selected combination of brand b, segment z, platform y, and demographic d of block 1602, the adjusted brand-level impression estimates estImp$_{b,i,y,d}$ by the video impression frequency rDPFreq$^{Video}_{b,i,y,d}$. Equation 57 below may be used to calculate the video content audience used in equation 54 and implemented in block 1606.

$$estUA^{Video}_{b,i,y,d} = estImp_{b,i,y,d}/rDPFreq^{Video}_{b,i,y,d} \quad \text{(Equation 57)}$$

Similarly, to determine the text content audience estUA$^{Text}_{b,i,y,d}$, the T/V audience calculator 392 divides, for the selected combination of brand b, segment z, platform y, and demographic d of block 1602, the adjusted brand-level impression estimates estImp$_{b,i,y,d}$ by the text impression frequency rDPFreq$^{Text}_{b,i,y,d}$. Equation 58 below may be used to calculate the text content audience used in equation 54 and implemented in block 1606.

$$estUA^{Text}_{b,i,y,d} = estImp_{b,i,y,d}/rDPFreq^{Text}_{b,i,y,d} \quad \text{(Equation 58)}$$

The content calculator 336 determines whether there are additional combinations of brand b, segment z, platform y, and demographic d (block 1608). When the content calculator 336 determines there are additional combinations (block 1608), the example instructions 1600 return to block 1602. In this manner, the content calculator 336 determines a T/V deduplication factor and corrected audience counts for each combination of brand b, segment z, platform y, and demographic group d. When the content calculator 336 determines there are no additional combinations (block 1608), the content calculator 336 selects a combination of brand b, segment z, and demographic d (block 1610).

The TD DFG 393 then calculates a total digital, text and video deduplication factor (block 1612). In examples disclosed herein, the TD DFG 393 calculates the total digital, text and video deduplication factor T&V_Dedup_F$_{TD,b,i,d}$ for text and video (T/V) segment level demographic data provided to the audience data generator 120a by the DP 116. The TD DFG 393 calculates the total digital, text and video deduplication factor T&V_Dedup_F$_{TD,b,i,d}$ by dividing, for the selected combination of brand b, segment z, and demographic d, a redistributed audience across all content types c (e.g., text t, video v, and both text and video w) that is attributed to the total digital platform r$_c$DPUA$_{TD,b,i,d}$ by a sum of a redistributed audience across all content types c (e.g., text t, video v, and both text and video w) that is attributed to the non-mobile (e.g., desktop) computing platform r$_c$DPUA$_{Desktop,b,i,d}$ and a redistributed audience across all content types (e.g., text t, video v, and both text and video w) that is attributed to the mobile computing platform r$_c$DPUA$_{Mobile,b,i,d}$. Equation 59 below may be used to implement block 1612.

$$T\&V\_Dedup\_F_{TD,b,i,d} = r_cDPUA_{TD,b,i,d}/(r_cDPUA_{Desktop,b,i,d} + r_cDPUA_{Mobile,b,i,d}) \quad \text{(Equation 59)}$$

The TD audience calculator 394 calculates a total digital audience (block 1614). In examples disclosed herein, the TD audience calculator 394 receives the total digital, text and video deduplication factor T&V_Dedup_F$_{TD,b,i,d}$ from the TD DFG 393. The TD audience calculator 394 also accesses and/or receives the adjusted brand-level impression estimates estImp$_{b,i,y,d}$ (Equation 29). The TD audience calculator 394 calculates the total digital, total content audience estUA$^{TC}_{TD,b,i,d}$, for the selected brand b, segment z, and demographic d, by summing a total digital video content audience estUA$^{Video}_{TD,b,i,d}$ and a total digital text content audience estUA$^{Text}_{TD,b,i,d}$ and applying (e.g., multiplying) the sum by the total digital, text and video (T/V) deduplication factor T&V_Dedup_F$_{TD,b,i,d}$. In examples disclosed herein, the total digital video content audience estUA$^{Video}_{TD,b,i,d}$ is representative of a quantity of audience members of a demographic group d (e.g., M13-17, M40-44, F25-29, etc.) that accessed and were presented a segment z of video content v via both the non-mobile computing platform and the mobile computing platform from a brand b (e.g., a network affiliate providing the media 206 of FIG. 2). The total digital text content audience estUA$^{Text}_{TD,b,i,d}$ is representative of a quantity of audience members of the same demographic group d that accessed and were concurrently presented text content t when the segment z of the video content v was presented via the mobile computing platform and the non-mobile computing platform from the same brand b. Equation 60 may be used to implement block 1616.

$$\text{estUA}^{TC}_{TD,b,i,d} = (\text{estUA}^{Video}_{TD,b,i,d} + \text{estUA}^{Text}_{TD,b,i,d}) * T\&V\_Dedup\_F_{TD,b,i,d} \quad \text{(Equation 60)}$$

In examples disclosed herein, the TD audience calculator 394 may determine the total digital video content audience estUA$^{Video}_{TD,b,i,d}$ and the total digital text content audience estUA$^{Text}_{TD,b,i,d}$ using the redistributed impressions indicative of access to text content t and video content v across all platforms y, rDPImps$_{T/V,b,i,d}$, the redistributed audiences indicative of access to text content t and video content v across all platforms y, rDPUA$_{T/V,b,i,d}$, and the adjusted brand-level impression estimates across all platforms y estImp$_{b,i,d}$. For example, the TD audience calculator 394 may first calculate a total digital video impression frequency rDPFreq$^{Video}_{TD,b,i,d}$ by dividing, for the selected combination of brand b, segment z, and demographic d of block 1610, the redistributed impressions indicative of access to video content v across all platforms y, rDPImps$_{v,b,i,d}$, by the redistributed audience indicative of access to the video content v across all platforms y, rDPUA$_{v,b,i,d}$. Equation 61 below may be used to calculate the total digital video impression frequency rDPFreq$^{Video}_{TD,b,i,d}$.

$$\text{rDPFreq}^{Video}_{TD,b,i,d} = \text{rDPImps}_{v,b,i,d} / \text{rDPUA}_{v,b,i,d} \quad \text{(Equation 61)}$$

Similarly, the TD audience calculator 394 may also calculate a total digital text impression frequency rDPFreq$^{Text}_{TD,b,i,d}$ by dividing, for the selected combination of brand b, segment z, and demographic d of block 1610, the redistributed impressions indicative of access to text content t across all platforms y, rDPImps$_{t,b,i,d}$, by the redistributed audience indicative of access to the text content t across all platforms y, rDPUA$_{t,b,i,d}$. Equation 62 below may be used to calculate the total digital text impression frequency rDPFreq$^{Text}_{TD,b,i,d}$.

$$\text{rDPFreq}^{Text}_{TD,b,i,d} = \text{rDPImps}_{t,b,i,d} / \text{rDPUA}_{t,b,i,d} \quad \text{(Equation 62)}$$

To determine the total digital video content audience estUA$^{Video}_{TD,b,i,d}$, the TD audience calculator 394 divides, for the selected combination of brand b, segment z, and demographic d of block 1610, the adjusted brand-level impression estimates across all platforms estImp$_{b,i,d}$ by the total digital video impression frequency rDPFreq$^{Video}_{TD,b,i,d}$. Equation 63 below may be used to calculate the total digital video content audience used in equation 63 and implemented in block 1614.

$$\text{estUA}^{Video}_{TD,b,i,d} = \text{estImp}_{b,i,d} / \text{rDPFreq}^{Video}_{TD,b,i,d} \quad \text{(Equation 63)}$$

Similarly, to determine the total digital text content audience estUA$^{Text}_{TD,b,i,d}$, the TD audience calculator 394 divides, for the selected combination of brand b, segment z, and demographic d of block 1610, the adjusted brand-level impression estimates across all platforms y estImp$_{b,i,d}$ by the total digital text impression frequency rDPFreq$^{Text}_{TD,b,i,d}$. Equation 64 below may be used to calculate the total digital text content audience used in equation 60 and implemented in block 1614.

$$\text{estUA}^{Text}_{TD,b,i,d} = \text{estImp}_{b,i,d} / \text{rDPFreq}^{Text}_{TD,b,i,d} \quad \text{(Equation 64)}$$

The content calculator 336 determines whether there are additional combinations of brand b, segment z, and demographic d (block 1616). When the content calculator 336 determines there are additional combinations (block 1616), the example instructions 1600 return to block 1610. When the content calculator 336 determines there are no additional combinations (block 1616), the example instructions 1600 of FIG. 16 end.

In some examples, the corrected audience counts calculated by the T/V audience calculator 392 in the illustrated example of FIG. 16 may be used to generating ratings information for the video. For example, the ratings data generator 338 may generate ratings information for the video by subtracting the corrected audience counts estUA$^{TC}_{b,i,y,d}$ from the text and video (T/V) segment level demographic data provided to the audience data generator 120a by the DP 116 (e.g., the audience counts provided by the DP 116 before redistribution by the demographic distributor 318). In this manner, the audience data generator 120 may determine a DP duplicated audience count (e.g., an overcompensating number of unique audience members identified by the DP 116 that were credited as being presented text content t and video content v).

Figure 17:
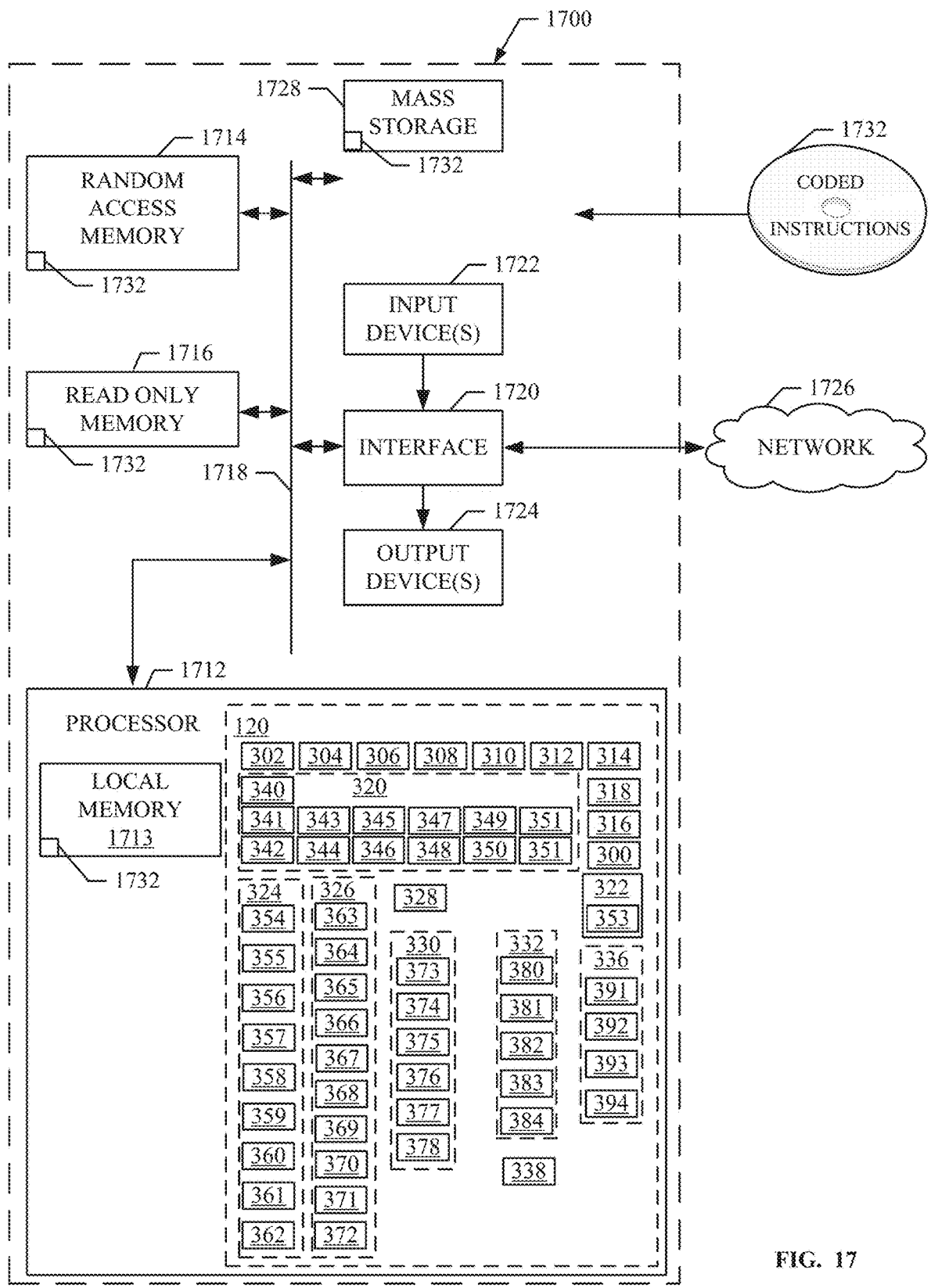
FIG. 17 is a block diagram of an example processor platform capable of executing the instructions of FIGS. 4-7 and 9-16 to implement the audience data generator of FIGS. 1, 2, and/or 3.

FIG. 17 is a block diagram of an example processor platform 1700 capable of executing the instructions of FIGS. 4-7 and 9-16 to implement the audience data generator 120 of FIGS. 1, 2, and/or 3. The processor platform 1700 can be, for example, a server, a personal computer, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer.

The example processor 1712 of FIG. 17 may implement the example calibration data collector 300, the example platform data manager 302, the example device data manager 304, the example segment data manager 306, the example episode data manager 308, the example asset data manager 310, the example sub-brand data manager 312, the example brand data manager 314, the example database proprietor (DP) data manager 316, the example demographic distributor 318, the example distributed demographic data calculator 320, the example matrix generator 322, the example episode-segment (E-S) adjuster 324, the example census imputer 326, the example metrics generator 328, the example segment modifier 330, the example brand/cross-platform adjuster 332, the example content calculator 336, the example ratings data generator 338, the example duration-per-impression (DPI) calculator 340, the example segment frequency calculator (FC) 341, the example segment deduplication factor generator (DFG) 342, the example episode frequency calculator (FC) 343, the example episode deduplication factor generator (DFG) 344, the example asset frequency calculator (FC) 345, the example asset deduplication factor generator (DFG) 346, the example sub-brand frequency calculator (FC) 347, the example sub-brand deduplication factor generator (DFG) 348, the example brand frequency calculator (FC) 349, the example brand deduplication factor generator (DFG) 350, the example cross publisher frequency calculator (CP-FC) 351, the example cross publisher deduplication factor generator (CP-DFG) 352, the example matrix converter 353, the example impressions sharing adjuster 354, the example duration sharing adjuster 355, the example coverage vector calculator 356, the example impressions coverage adjuster 357, the example duration coverage adjuster 358, the example impression scaling factor generator 359, the example duration scaling factor generator 360, the example impressions scaler 361, the example duration scaler 362, the example impressions adder 363, the example duration adder 364, the example impressions imputation adder 365, the example duration imputation adder 366, the example impressions distribution deriver 367, the example duration distribution deriver 368, the example impressions imputation director 369, the example duration imputation director 370, the example impressions imputation calculator 371, the example duration imputation calculator 372, the example impression sub-segment adder 373, the example duration sub-segment adder 374, the example impression ratio calculator 375, the example duration ratio calculator 376, the example impression metrics adjuster 377, the example duration metrics adjuster 378, the example impressions adjuster 379, the example duration adjuster 380, the example audience adjuster 381, the example impressions total digital (TD) calculator 382, the example duration total digital (TD) calculator 383, the example audience total digital (TD) calculator 384, the example text and video (T/V) deduplication factor generator (DFG) 391, the example text and video (T/V) audience calculator 392, the example total digital (TD) deduplication factor generator 393, the example total digital (TD) audience calculator 394 and/or, more generally, the example audience data generator 120 of FIGS. 1, 2, and/or 3.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), and/or a PCI express interface.

In the illustrated example, one or more input devices 1722 are connected to the interface circuit 1720. The input device(s) 1722 permit(s) a user to enter data and commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1720 of the illustrated example, thus, typically includes a graphics driver card, a graphics driver chip or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.).

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, RAID systems, and digital versatile disk (DVD) drives.

The coded instructions 1732 of FIGS. 4-7 and 9-16 may be stored in the mass storage device 1728, in the volatile memory 1714, in the non-volatile memory 1716, and/or on a removable tangible computer readable storage medium such as a CD or DVD.

From the foregoing, it will appreciate that the above disclosed methods, apparatus and articles of manufacture provide a solution to the problem of inaccuracies due to techniques used in online audience measurement. Benefits to online audience measurement, which is an inherently network-based technology, obtained from disclosed example methods, apparatus, and articles of manufacture include a reduction in required network communications that would be necessary to attribute to demographic groups those impressions that are not identifiable by one or more database proprietors. For example, disclosed examples avoid transmitting queries to secondary database proprietors and/or reduce processing and network resources used by the mobile devices as part of the online audience measurement techniques. At the same time, the improved accuracy of ratings information that can be generated using disclosed examples permits a more efficient and more beneficial distribution of advertising resources to viewers of online media by providing rapid, and, more importantly, accurate online audience measurement that enables advertisers to change distributions of advertising resources in response to audience measurement information.

Disclosed examples also improve the accuracy of audience measurement for Internet-delivered media such as streaming videos by correcting for measurement errors arising from problems inherent to computer networks. For example, beacon requests and/or other messages described herein can be dropped or otherwise not delivered to the intended destination (e.g., audience measurement entity, a database proprietor, etc.), which in at least some instances can lead to non-negligible measurement bias.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:
memory;
programmable circuitry; and
instructions to cause the programmable circuitry to at least:
receive, from a server of a database proprietor, a first audience count, a second audience count, and a third audience count, the first audience count indicative of a first number of impressions corresponding to first network communications, the first network communications from first computing devices, the first network communications attributed to a first media category for a first demographic group, the first number of impressions attributed to a first network affiliate, the second audience count indicative of a second number of impressions corresponding to second network communications, the second network communications from second computing devices, the first and second computing devices corresponding to a same computing platform, the second network communications attributed to a second media category accessed by the first demographic group, the second number of impressions attributed to a second network affiliate, the first and second media categories corresponding to online media accesses, and the third audience count indicative of a third number of impressions corresponding to ones of the first network communications and ones of the second network communications attributed to the first media category and the second media category accessed by the first demographic group, the first audience count including a server-generated duplicated audience count generated by the server of the database proprietor;
calculate a deduplication factor for the first demographic group using the first audience count, the second audience count, and the third audience count;
determine a corrected audience count of the first media category for the first demographic group based on the deduplication factor, the corrected audience count to improve functionality of the programmable circuitry by correcting the server-generated duplicated audience count generated by the server of the database proprietor;
generate ratings information for the first media category based on subtracting the corrected audience count from the first audience count; and
convert a misattribution matrix to an impressions matrix, the misattribution matrix including a probability that an impression is attributable to a second demographic group, the impressions matrix indicative of numbers of impressions determined by the database proprietor to correspond to respective ones of demographic groups.

2. The system of claim 1, wherein the programmable circuitry is to determine the corrected audience count by:
estimating a fourth audience count for the first demographic group, the fourth audience count indicative of a first number of people who accessed the first media category;
estimating a fifth audience count for the first demographic group, the fifth audience count indicative of a second number of people who accessed the second media category; and
applying the deduplication factor to a sum of the fourth audience count and the fifth audience count.

3. The system of claim 1, wherein the first media category corresponds to streaming media and the second media category corresponds to text.

4. The system of claim 1, wherein the programmable circuitry is to estimate a fourth audience count based on a first impressions count and a first frequency of impressions detected by the database proprietor, the first impressions count indicating presentation of a time segment of the first media category.

5. The system of claim 4, wherein the programmable circuitry is to determine the first impressions count by applying a first ratio to a second impressions count, the first ratio indicating a quantity of time sub-segments of the first media category presented at the first computing devices during the time segment, the second impressions count indicating a fourth number of impressions of the second media category.

6. The system of claim 5, wherein the programmable circuitry is to:
apply the impressions matrix to a redistributed impressions count to generate the second impressions count, the redistributed impressions count compensating for demographic information being unavailable to the database proprietor.

7. The system of claim 1, wherein the first network communications include an identifier relating the first number of impressions to respective time segments of the first media category, the first network affiliate distributing the first media category, a network affiliate distributor providing the first media category to ones of the first computing devices as permitted by the first network affiliate, a program distributed by the first network affiliate and provided to ones of the first computing devices via the network affiliate distributor, the first media category a part of the program, and an episode of the program corresponding to the first media category.

8. The system of claim 1, wherein the first network communications identify at least one of time segments of the first media category presented at the first computing devices or the second number of impressions corresponding to the second media category at the second computing devices.

9. A tangible computer readable storage medium comprising instructions that, when executed, cause a processor to at least:
receive, from a server of a database proprietor, a first audience count, a second audience count, and a third audience count, the first audience count indicative of a first number of impressions corresponding to first network communications, the first network communications from first computing devices, the first network communications attributed to a first media category for a first demographic group, the first number of impressions attributed to a first network affiliate, the second audience count indicative of a second number of impressions corresponding to second network communications, the second network communications from second computing devices, the first and second computing devices corresponding to a same computing platform, the second network communications attributed to a second media category accessed by the first demographic group, the second number of impressions attributed to a second network affiliate, the first and second media categories corresponding to online media accesses, and the third audience count indicative of a third number of impressions corresponding to ones of the first network communications and ones of the second network communications attributed to the first media category and the second media category accessed by the first demographic group, the first audience count including a server-generated duplicated audience count introduced by the server of the database proprietor;

calculate a deduplication factor for the first demographic group using the first audience count, the second audience count, and the third audience count;

determine a corrected audience count of the first media category for the first demographic group based on the deduplication factor, the corrected audience count to improve functionality of the processor by correcting the server-generated duplicated audience count introduced by the server of the database proprietor;

generate ratings information for the first media category based on subtracting the corrected audience count from the first audience count; and convert a misattribution matrix to an impressions matrix, the misattribution matrix including a probability that an impression is attributable to a second demographic group, the impressions matrix indicative of numbers of impressions determined by the database proprietor to correspond to respective ones of demographic groups.

10. The tangible computer readable storage medium of claim 9, wherein the instructions, when executed, cause the processor to determine the corrected audience count by:

estimating a fourth audience count for the first demographic group, the fourth audience count indicative of a first number of people who accessed the first media category;

estimating a fifth audience count for the first demographic group, the fifth audience count indicative of a second number of people who accessed the second media category; and applying the deduplication factor to a sum of the fourth audience count and the fifth audience count.

11. The tangible computer readable storage medium of claim 9, wherein the instructions, when executed, cause the processor to estimate a fourth audience count based on a first impressions count and a first frequency of impressions detected by the database proprietor, the first impressions count indicating presentation of a time segment of the first media category.

12. The tangible computer readable storage medium of claim 11, wherein the instructions, when executed, cause the processor to determine the first impressions count by applying a first ratio to a second impressions count, the first ratio indicating a quantity of time sub-segments of the first media category presented at the first computing devices during the time segment, the second impressions count indicating a fourth number of impressions of the second media category.

13. The tangible computer readable storage medium of claim 12, wherein the instructions, when executed, cause the processor to:

apply the impressions matrix to a redistributed impressions count to generate the second impressions count, the redistributed impressions count compensating for demographic information being unavailable to the database proprietor.

14. The tangible computer readable storage medium of claim 9, wherein the instructions, when executed, cause the processor to determine an identifier of the first network communications relating the first number of impressions to respective time segments of the first media category, the first network affiliate distributing the first media category, a network affiliate distributor providing the first media category to ones of the first computing devices as permitted by the first network affiliate, a program distributed by the first network affiliate and provided to ones of the first computing devices via the network affiliate distributor, the first media category a part of the program, and an episode of the program corresponding to the first media category.

15. The tangible computer readable storage medium of claim 9, wherein the instructions, when executed, cause the processor to identify at least one of time segments of the first media category presented at the first computing devices or the second number of impressions corresponding to the second media category at the second computing devices.

16. A method comprising:

receiving, from a server of a database proprietor, a first audience count, a second audience count, and a third audience count, the first audience count indicative of a first number of impressions corresponding to first network communications, the first network communications from first computing devices, the first network communications attributed to a first media category for a first demographic group, the first number of impressions attributed to a first network affiliate, the second audience count indicative of a second number of impressions corresponding to second network communications, the second network communications from second computing devices, the first and second computing devices corresponding to a same computing platform, the second network communications attributed to a second media category accessed by the first demographic group, the second number of impressions attributed to a second network affiliate, the first and second media categories corresponding to online media accesses, and the third audience count indicative of a third number of impressions corresponding to ones of the first network communications and ones of the second network communications attributed to the first media category and the second media category accessed by the first demographic group, the first audience count including a server-generated duplicated audience count generated by the server of the database proprietor;

calculating, by executing an instruction with a processor, a deduplication factor for the first demographic group using the first audience count, the second audience count, and the third audience count;

determining, by executing an instruction with the processor, a corrected audience count of the first media category for the first demographic group based on the deduplication factor, the corrected audience count to improve functionality of the processor by correcting the server-generated duplicated audience count generated by the server of the database proprietor;

generating, by executing an instruction with the processor, ratings information for the first media category based on subtracting the corrected audience count from the first audience count; and converting, by executing an instruction with the processor, a misattribution matrix to an impressions matrix, the misattribution matrix including a probability that an impression is attributable to a second demographic group, the impressions matrix indicative of numbers of impressions determined by the database proprietor to correspond to respective ones of demographic groups.

17. The method of claim 16, wherein the determining of the corrected audience count includes:
- estimating a fourth audience count for the first demographic group, the fourth audience count indicative of a first number of people who accessed the first media category;
- estimating a fifth audience count for the first demographic group, the fifth audience count indicative of a second number of people who accessed the second media category; and
- applying the deduplication factor to a sum of the fourth audience count and the fifth audience count.

18. The method of claim 16, further including estimating a fourth audience count based on a first impressions count and a first frequency of impressions detected by the database proprietor, first impressions count indicating presentation of a time segment of the first media category.

19. The method of claim 18, further including determining the first impressions count by applying a first ratio to a second impressions count, the first ratio indicating a quantity of time sub-segments of the first media category presented at the first computing devices during the time segment, the second impressions count indicating a fourth number of impressions of the second media category.

20. The method of claim 19, further including applying the impressions matrix to a redistributed impressions count to generate the second impressions count, the redistributed impressions count compensating for demographic information being unavailable to the database proprietor.

21. The method of claim 16 further including determining an identifier of the first network communications relating the first number of impressions to respective time segments of the first media category, the first network affiliate distributing the first media category, a network affiliate distributor providing the first media category to ones of the first computing devices as permitted by the first network affiliate, a program distributed by the first network affiliate and provided to ones of the first computing devices via the network affiliate distributor, the first media category a part of the program, and an episode of the program corresponding to the first media category.

22. The method of claim 16, further including identifying at least one of time segments of the first media category presented at the first computing devices or the second number of impressions corresponding to the second media category at the second computing devices.

* * * * *